US012228427B2

(12) United States Patent
Muenz

(10) Patent No.: US 12,228,427 B2
(45) Date of Patent: Feb. 18, 2025

(54) RESISTIVE DIFFERENTIAL ALIGNMENT MONITOR

(71) Applicant: Texas Instruments Incorporated, Dallas, TX (US)

(72) Inventor: Josef Muenz, Munich (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 286 days.

(21) Appl. No.: 17/731,506

(22) Filed: Apr. 28, 2022

(65) Prior Publication Data

US 2023/0349729 A1    Nov. 2, 2023

(51) Int. Cl.
  *G01D 5/165* (2006.01)
  *H01C 10/46* (2006.01)

(52) U.S. Cl.
  CPC .......... *G01D 5/1655* (2013.01); *H01C 10/46* (2013.01)

(58) Field of Classification Search
  CPC ........ H01C 10/46; H01C 10/28; H01C 10/36; G01D 5/1655
  See application file for complete search history.

(56) References Cited

U.S. PATENT DOCUMENTS

| | | | |
|---|---|---|---|
| 4,386,459 A * | 6/1983 | Boulin | G01R 31/2884 438/18 |
| 4,571,538 A | 2/1986 | Chow | |
| 5,770,995 A | 6/1998 | Kamiya | |
| 6,559,475 B1 * | 5/2003 | Kim | H01L 22/34 438/18 |
| 6,684,520 B1 * | 2/2004 | Look | H01L 22/34 33/645 |
| 8,546,952 B2 * | 10/2013 | Chen | H01L 22/34 438/455 |
| 2001/0049881 A1 | 12/2001 | Look et al. | |

FOREIGN PATENT DOCUMENTS

| | | |
|---|---|---|
| CN | 113764381 A | 12/2021 |
| JP | 2005-223227 A | 8/2005 |
| JP | 2019-207280 A | 12/2019 |

OTHER PUBLICATIONS

International Search Report dated Aug. 4, 2023.

* cited by examiner

*Primary Examiner* — Kyung S Lee
(74) *Attorney, Agent, or Firm* — Yudong Kim; Frank D. Cimino

(57) ABSTRACT

A microelectronic device includes a resistive differential alignment monitor (RDAM), including a first variable-width resistor and a second variable-width resistor, which are members of a conductor level. Each of the resistors include a wide portion and a narrow portion. The RDAM further includes a vertical connector to each of the wide portion and the narrow portion of the first variable-width resistor, and to the wide portion and the narrow portion of the second variable-width resistor. The vertical connectors are members of a vertical connector level. Test terminals are coupled to the vertical connectors. The vertical connectors to the first variable-width resistor and the vertical connectors to the second variable-width resistor are separated by equal distances and are oriented anti-parallel to each other. The RDAM may be used to estimate a misalignment distance between the members of the vertical connector level and the members of the conductor level.

28 Claims, 26 Drawing Sheets

RESISTIVE DIFFERENTIAL ALIGNMENT MONITOR

TECHNICAL FIELD

This disclosure relates to the field of microelectronic devices. More particularly, but not exclusively, this disclosure relates to test structures in microelectronic devices.

BACKGROUND

Microelectronic devices are formed in patterned layers, such as dielectric layers, metal layers, and semiconductor layers, which are patterned using photolithographic processes. Unwanted effects during fabrication of the microelectronic devices may cause some of the patterned layers to be misaligned with respect to each other. Misalignment may degrade device performance and reliability.

SUMMARY

The present disclosure introduces a microelectronic device including a resistive differential alignment monitor (RDAM), including a first variable-width resistor and a second variable-width resistor. The variable-width resistors are members of a conductor level of the microelectronic device. Each of the first variable-width resistor and the second variable-width resistor include a wide portion and a narrow portion. The RDAM further includes a vertical connector contacting each of the wide portion of the first variable-width resistor, the narrow portion of the first variable-width resistor, the wide portion of the second variable-width resistor, and the narrow portion of the second variable-width resistor. The vertical connectors are members of a vertical connector level of the microelectronic device. The vertical connectors to the first variable-width resistor and the vertical connectors to the second variable-width resistor are separated by equal distances. The first variable-width resistor and the second variable-width resistor are oriented anti-parallel to each other.

DETAILED DESCRIPTION

The present disclosure is described with reference to the attached figures. The figures are not drawn to scale and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

In addition, although some of the embodiments illustrated herein are shown in two dimensional views with various regions having depth and width, it should be clearly understood that these regions are illustrations of only a portion of a device that is actually a three dimensional structure. Accordingly, these regions will have three dimensions, including length, width, and depth, when fabricated on an actual device. Moreover, while the present invention is illustrated by embodiments directed to active devices, it is not intended that these illustrations be a limitation on the scope or applicability of the present invention. It is not intended that the active devices of the present invention be limited to the physical structures illustrated. These structures are included to demonstrate the utility and application of the present invention to presently preferred embodiments.

For the purposes of this disclosure, the term "conductive" is to be interpreted as "electrically conductive". The term "conductive" refers to materials and structures capable of supporting a steady electrical current, that is, direct current (DC).

Features of elements, such as widths and lengths, described as being equal are considered equal within fabrication tolerances encountered during fabrication of the respective elements. The fabrication tolerances include tolerances due to unwanted variations in geometries of photomasks used in photolithographic processes to form the respective elements, as well as tolerances due to unwanted variations in deposition and etch processes.

For the purposes of this disclosure, the terms "vertical" and "vertically" refer to directions perpendicular to a face of a resistor in a resistive differential alignment monitor (RDAM). The terms "lateral" and "laterally" refer to directions parallel to the face of the resistor.

Figure 1A:
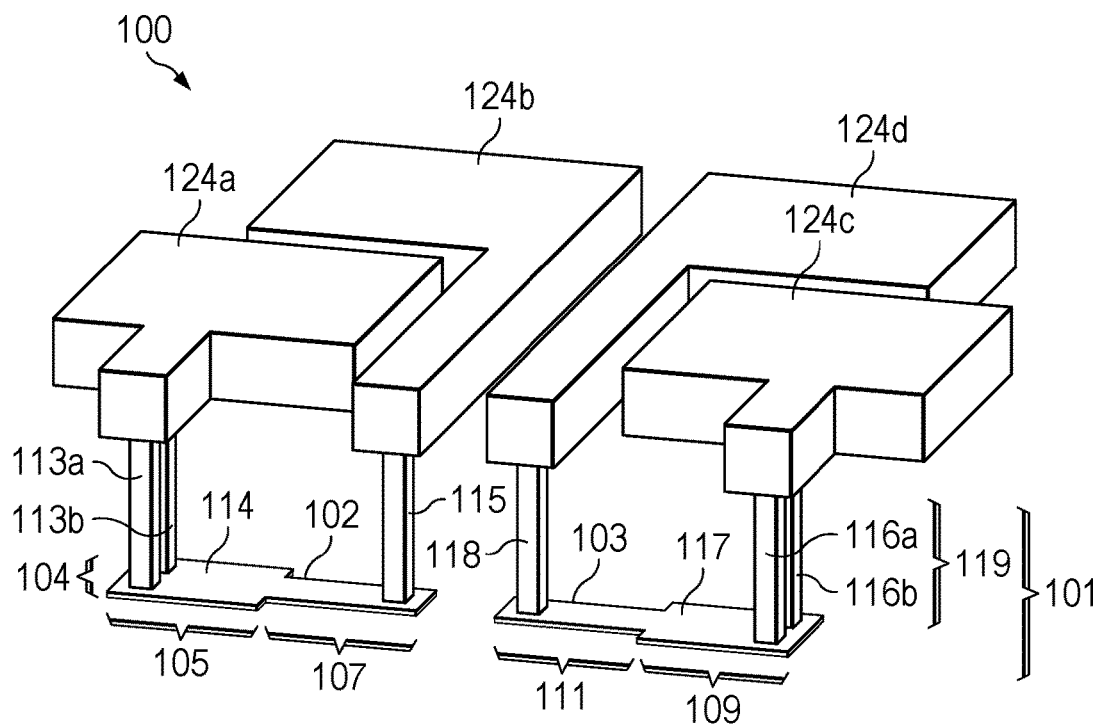
FIG. 1A is a perspective view and FIG. 1B is a top view of an example microelectronic device that includes an RDAM.
Figure 1B:
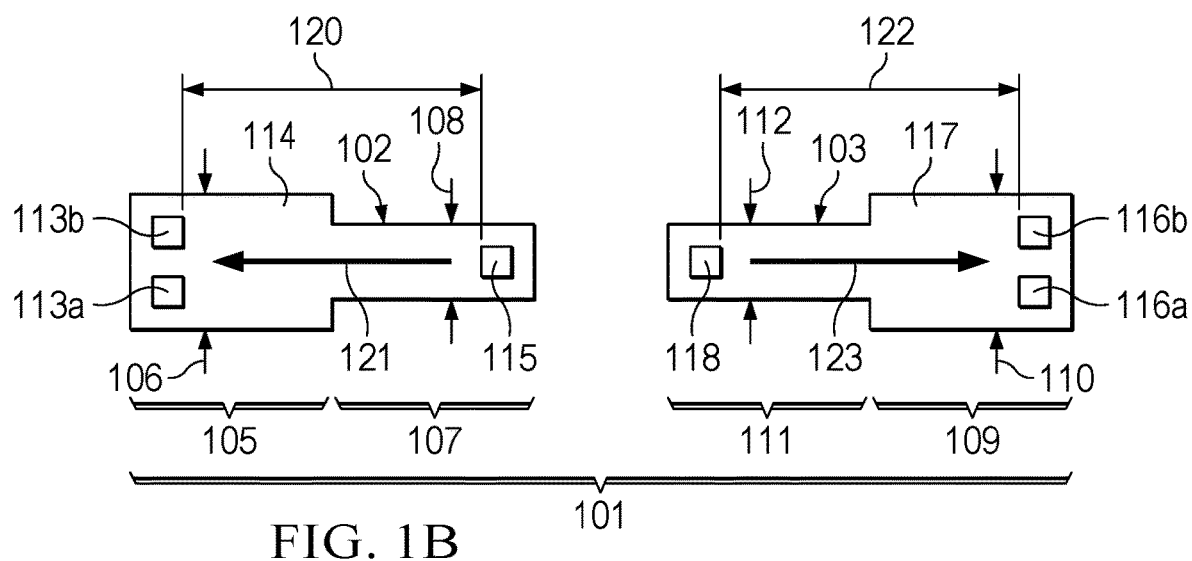

FIG. 1A is a perspective view and FIG. 1B is a top view of an example microelectronic device that includes an RDAM. The microelectronic device 100 may be manifested as an integrated circuit, a microelectrical mechanical system (MEMS) device, an electro-optical device, or a microfluidic device, by way of example. The RDAM 101 includes a first variable-width resistor 102, hereinafter the "first resistor" and a second variable-width resistor 103, hereinafter the "second resistor", formed in a conductor level 104. The conductor level 104 may be, for example, an interconnect level containing aluminum or copper interconnects, a gate level containing polycrystalline silicon and metal silicide gates, a diffused layer level in a semiconductor substrate, a resistor level in an interconnect region, a capacitor plate level, a bond pad level, redistribution layer (RDL) level, a buried layer level in a semiconductor substrate, or a two-dimensional electron gas (2DEG) level in a III-V semiconductor material. Other manifestations of the conductor level 104 are within the scope of this disclosure.

The first resistor 102 and the second resistor 103 have same sublayers with same compositions, as a result of being formed concurrently. The term "formed concurrently" includes elements formed using a scanning lithography process, in which a scanning exposure step exposes the pattern for one of the elements before exposing the pattern for another of the elements in the same scan. The term "formed concurrently" includes elements formed using etch processes used to define the elements, in which the etch process may complete one of the elements before completing another of the elements, due to variations in the etch process. The term "formed concurrently" includes elements formed by other processes, such as wet etch or clean processes, and deposition or growth process, in which the process may complete one of the elements before completing another of the elements, due to variations in the process.

The first resistor 102 has a first wide portion 105 and a first narrow portion 107 separate from the first wide portion 105. The second resistor 103 has a second wide portion 109 and a second narrow portion 111 separate from the second wide portion 109.

The RDAM 101 includes first wide portion vertical connectors 113a and 113b contacting a first face 114 of the first resistor 102 in the first wide portion 105. The RDAM 101 further includes a first narrow portion vertical connector 115 contacting the first face 114 of the first resistor 102 in the first narrow portion 107. The first wide portion 105 has a first width 106 adjacent to the first wide portion vertical connectors 113a and 113b, on a side of the first wide portion vertical connectors 113a and 113b facing the first narrow portion 107. The first narrow portion 107 has a second width 108 adjacent to the first narrow portion vertical connector 115, on a side of the first narrow portion vertical connector 115 facing the first wide portion 105. The first width 106 is greater than the second width 108. The first wide portion 105 may have a uniform width, equal to the first width 106, along its length, as depicted in FIG. 1B, which may advantageously provide more uniform current flow in the first wide portion 105 during operation of the RDAM 101. Similarly, the first narrow portion 107 may have a uniform width, equal to the second width 108, along its length, as depicted in FIG. 1B, which may advantageously provide more uniform current flow in the first narrow portion 107 during operation of the RDAM 101.

Similarly, the RDAM 101 includes second wide portion vertical connectors 116a and 116b contacting a second face 117 of the second resistor 103 in the second wide portion 109. The RDAM 101 further includes a second narrow portion vertical connector 118 contacting the second face 117 of the second resistor 103 in the second narrow portion 111. The second wide portion 109 has a third width 110 adjacent to the second wide portion vertical connectors 116a and 116b, on a side of the second wide portion vertical connectors 116a and 116b facing the second narrow portion 111. The second narrow portion 111 has a fourth width 112 adjacent to the second narrow portion vertical connector 118, on a side of the second narrow portion vertical connector 118 facing the second wide portion 109. The third width 110 is greater than the fourth width 112.

The first wide portion vertical connectors 113a and 113b, the first narrow portion vertical connector 115, the second wide portion vertical connectors 116a and 116b, and the second narrow portion vertical connector 118 are members of a vertical connector level 119 of the microelectronic device 100, such as a contact level to components of the microelectronic device 100, a via level between interconnect levels, a bond pad via level, an RDL via level, a deep trench connector level, or source/drain contacts to a 2DEG level in a III-V semiconductor material, by way of example. Other manifestations of the vertical connector level 119 are within the scope of this disclosure. Members of a vertical connector level 119 are formed concurrently. In some versions of this example, the RDAM 101 may include only a single first wide portion vertical connector contacting the first wide portion 105 and a single second wide portion vertical connector contacting the second wide portion 109. In other versions, the RDAM 101 may include three or more first wide portion vertical connectors contacting the first wide portion 105 and three or more second wide portion vertical connectors contacting the second wide portion 109. In further versions, the RDAM 101 may include two or more first narrow portion vertical connectors contacting the first narrow portion 107 and two or more second narrow portion vertical connectors contacting the second narrow portion 111.

The second face 117 of the second resistor 103 is coplanar with the first face 114 of the first resistor 102, as a result of the first resistor 102 and the second resistor 103 being in the conductor level 104. The first wide portion vertical connectors 113a and 113b are separated from the first narrow portion vertical connector 115 by a first resistor length 120 that extends in a first direction 121 from the first narrow portion vertical connector 115 to the first wide portion vertical connectors 113a and 113b. The second wide portion vertical connectors 116a and 116b are separated from the second narrow portion vertical connector 118 by a second resistor length 122 that extends in a second direction 123 from the second narrow portion vertical connector 118 to the second wide portion vertical connectors 116a and 116b. The first resistor length 120 and the second resistor length 122 are equal. The second direction 123 is anti-parallel to the first direction 121, that is, the second direction 123 and the first direction 121 point in opposite directions on parallel lines, or on the same line.

The microelectronic device 100 includes first through fourth test terminals 124a, 124b, 124c, and 124d, respectively. The test terminals 124a through 124d are sometimes referred to as probe pads, as the RDAM 101 may be tested by connecting test instruments to the test terminals 124a through 124d by probes. The first test terminal 124a is coupled to the first wide portion vertical connectors 113a and 113b. The second test terminal 124b is coupled to the first narrow portion vertical connector 115. The third test terminal 124c is coupled to the second wide portion vertical connectors 116a and 116b. The fourth test terminal 124d is coupled to the second narrow portion vertical connector 118. The test terminals 124a, 124b, 124c, and 124d are electrically conductive, and may be in an interconnect level or bond pad level, suitable for probing. The test terminals 124a, 124b, 124c, and 124d may be directly coupled to the vertical connectors 113a and 113b, 115, 116a and 116b, and 118, as depicted in FIG. 1A, or may be coupled to the vertical connectors 113a and 113b, 115, 116a and 116b, and 118 through intermediate conductive structures such as interconnects and vias. The test terminals 124a, 124b, 124c, and 124d are omitted from FIG. 1B in order to show the placement of the vertical connectors 113a and 113b, 115, 116a and 116b, and 118 more clearly.

The RDAM 101 enables estimation of a misalignment distance between members of the conductor level 104 and members of the vertical connector level 119. The misalignment distance may be along the first direction 121 or the second direction 123.

Figure 2:
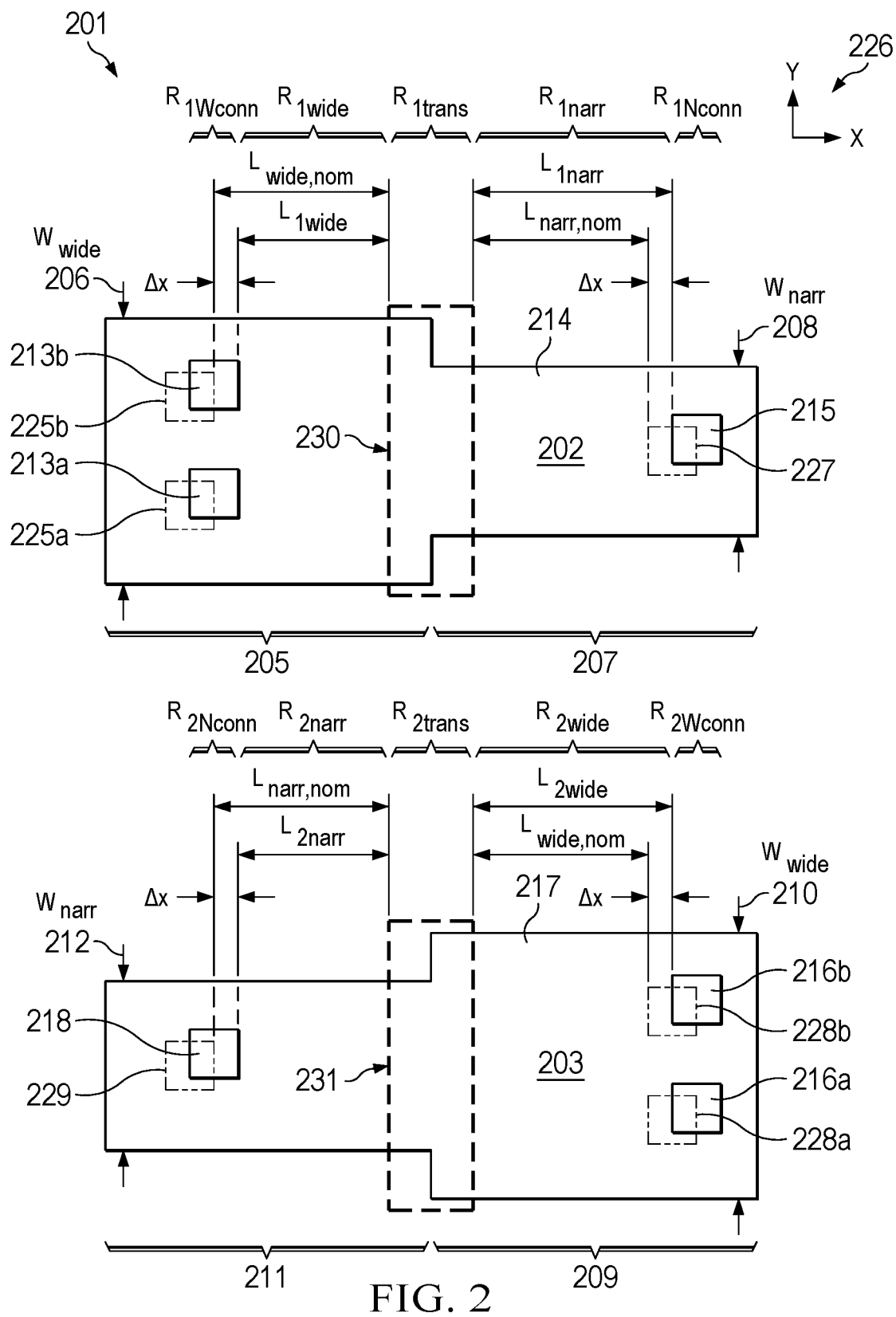
FIG. 2 is a top view of an example first resistor and second resistor of an RDAM.

FIG. 2 is a top view of an example first resistor and second resistor of an RDAM. The first resistor 202 has a first wide portion 205 and a first narrow portion 207 adjacent to the first wide portion 205. The RDAM 201 includes first wide portion vertical connectors 213a and 213b on a first face 214 of the first resistor 202 in the first wide portion 205, and includes a first narrow portion vertical connector 215 contacting the first face 214 of the first resistor 202 in the first narrow portion 207. The second resistor 203 has a second wide portion 209 and a second narrow portion 211 adjacent to the second wide portion 209. The RDAM 201 includes second wide portion vertical connectors 216a and 216b on a second face 217 of the second resistor 203 in the second wide portion 209, and includes a second narrow portion vertical connector 218 contacting the second face 217 of the second resistor 203 in the second narrow portion 211.

The first wide portion 205 has a first width 206 adjacent to the first wide portion vertical connectors 213a and 213b, on a side of the first wide portion vertical connectors 213a and 213b facing the first narrow portion 207. The first narrow portion 207 has a second width 208 adjacent to the first narrow portion vertical connector 215, on a side of the first narrow portion vertical connector 215 facing the first wide portion 205. The first width 206 is greater than the second width 208.

The second wide portion 209 has a third width 210 adjacent to the second wide portion vertical connectors 216a and 216b, on a side of the second wide portion vertical connectors 216a and 216b facing the second narrow portion 211. The second narrow portion 211 has a fourth width 212 adjacent to the second narrow portion vertical connector 218, on a side of the second narrow portion vertical connector 218 facing the second wide portion 209. The third width 210 is greater than the fourth width 212.

The first resistor 202 and the second resistor 203 are designed so that the first width 206 of the first wide portion 205 is equal to the third width 210 of the second wide portion 209, and both have a value $W_{wide}$, as noted in FIG. 2. Similarly, the first resistor 202 and the second resistor 203 are designed so that the second width 208 of the first narrow portion 207 is equal to the fourth width 212 of the second narrow portion 211, and both have a value $W_{narr}$, as noted in FIG. 2.

In this example, the vertical connectors 213a and 213b, 215, 216a and 216b, and 218 are misaligned with respect to the first resistor 202 and the second resistor 203. That is, locations of the first wide portion vertical connectors 213a and 213b, are shifted from first wide portion nominal positions 225a and 225b by a misalignment distance $\Delta x$ in the x direction. The x direction extends from the first wide portion vertical connectors 213a and 213b toward the first narrow portion vertical connector 215, as indicated by the coordinate system 226. A location of the first narrow portion vertical connector 215 is shifted from a first narrow portion nominal position 227 in the x direction by the misalignment distance $\Delta x$. Locations of the second wide portion vertical connectors 216a and 216b, are shifted from second wide portion nominal positions 228a and 228b in the x direction by the misalignment distance $\Delta x$. A location of the second narrow portion vertical connector 218 is shifted from a second narrow portion nominal position 229 in the x direction by the misalignment distance $\Delta x$. The nominal positions 225a and 225b, 227, 228a and 228b, and 229 are the positions the vertical connectors 213a and 213b, 215, 216a and 216b, and 218 would have if no misalignment had occurred. The vertical connectors 213a and 213b, 215, 216a and 216b, and 218 may also be misaligned in the y direction, as indicated in FIG. 2.

The RDAM 201 enables estimation of a misalignment distance between members of a conductor level containing the first resistor 202 and the second resistor 203 and members of a vertical connector level containing the vertical connectors 213a, 213b, 215, 216a, 216b, and 218. During operation of the RDAM 201, a first resistance $R_1$ of the first resistor 202 is measured, and a second resistance $R_2$ of the second resistor 203 is measured. The first resistance $R_1$ may include extraneous resistance contributions from the first wide portion vertical connectors 213a and 213b and the first narrow portion vertical connector 215, and may further include resistance contributions from test terminals coupled to the vertical connectors 213a and 213b and 215. Similarly, the second resistance $R_2$ may include extraneous resistance contributions from the second wide portion vertical connectors 216a and 216b and the second narrow portion vertical connector 218, and may further include resistance contributions from test terminals coupled to the vertical connectors 216a and 216b and 218.

Functionality of the RDAM 201 may be understood by examining components of the first resistance $R_1$ from portions of the first resistor 202, and similarly for components of the second resistance $R_2$ from portions of the second resistor 203. Considering the first resistor 202, a first component $R_{1\,Wconn}$ of the first resistance $R_1$ is from an area of the first wide portion 205 under and around the first wide portion vertical connectors 213a and 213b. The first component $R_{1\,Wconn}$ is sometimes referred to as a head resistance at the first wide portion vertical connectors 213a and 213b. The first component $R_{1\,Wconn}$ may be affected by the size and number of first wide portion vertical connectors 213a and 213b and spacing between the first wide portion vertical connectors 213a and 213b.

A second component $R_{1wide}$ of the first resistance $R_1$ is from an area of the first wide portion 205, extending a first wide length $L_{1wide}$ from the first wide portion vertical connectors 213a and 213b to a first transition region 230 at a boundary between the first wide portion 205 and the first narrow portion 207. The second component $R_{1wide}$ has a value of $R_{sheet} \times (L_{1wide}/W_{wide})$, where $R_{sheet}$ is a sheet resistance of the first resistor 202 and the second resistor 203. The first wide length $L_{1wide}$ may be expressed in terms of a wide nominal length $L_{wide,nom}$, which is a length from the first wide portion nominal positions 225a and 225b to the first transition region 230, and the misalignment distance $\Delta x$: $L_{1wide} = L_{wide,nom} - \Delta x$. Then, the second component $R_{1wide}$ may be expressed as $R_{sheet} \times ((L_{wide,nom} - \Delta x)/W_{wide})$.

A third component $R_{1trans}$ of the first resistance $R_1$ is from the first transition region 230. The third component $R_{1trans}$ may be affected by a shape of the first resistor 202 in the first transition region 230. For example, a sharp transition, as depicted in FIG. 2, may produce a third component $R_{1trans}$ that is different from a resistor having a gentle, distributed transition.

A fourth component $R_{1narr}$ of the first resistance $R_1$ is from an area of the first narrow portion 207, extending a first narrow length $L_{1narr}$ from the first transition region 230 to the first narrow portion vertical connector 215. The fourth component $R_{1narr}$ has a value of $R_{sheet} \times (L_{1narr}/W_{narr})$. The first narrow length $L_{1narr}$ may be expressed in terms of a narrow nominal length $L_{narr,nom}$, which is a length from the first transition region 230 to the first narrow portion nominal position 227, and the misalignment distance $\Delta x$: $L_{1narr} = L_{narr,nom} + \Delta x$. Then, the fourth component $R_{1narr}$ may be expressed as $R_{sheet} \times ((L_{narr,nom} + \Delta x)/W_{narr})$.

A fifth component $R_{1Nconn}$ of the first resistance $R_1$ is from an area of the first narrow portion 207 under and around the first narrow portion vertical connector 215. The fifth component $R_{1Nconn}$ is sometimes referred to as a head resistance at the first narrow portion vertical connector 215. The fifth component $R_{1Nconn}$ may be affected by the size, number, and spacing of the first narrow portion vertical connectors 215.

The first resistance $R_1$ may be expressed as a sum of the five components, in terms of the misalignment distance $\Delta x$.

$$R_1 = R_{1Wconn} + R_{sheet}\left(\frac{L_{wide,nom} - \Delta x}{W_{wide}}\right) + R_{1trans} + R_{sheet}\left(\frac{L_{narr,nom} + \Delta x}{W_{narr}}\right) + R_{1Nconn} \quad \text{Equation 1}$$

The second resistance $R_2$ of the second resistor 203 may be examined in a similar manner, and components of the second resistance $R_2$ may be identified. A first component $R_{2Wconn}$ of the second resistance $R_2$ is from an area of the second wide portion 209 under and around the second wide portion vertical connectors 216a and 216b. The first resistor 202 and the second resistor 203 are designed to have similar layouts, reversed from each other along the x direction, so that the first component $R_{2Wconn}$ of the second resistance $R_2$ is equal to the first component $R_{1wconn}$ of the first resistance $R_1$, within tolerances encountered in fabrication of the first resistor 202 and the second resistor 203.

A second component $R_{2wide}$ of the second resistance $R_2$ is from an area of the second wide portion 209, extending a second wide length $L_{2wide}$ from the second wide portion vertical connectors 216a and 216b to a second transition region 231 at a boundary between the second wide portion 209 and the second narrow portion 211. The second component $R_{2wide}$ has a value of $R_{sheet} \times (L_{2wide}/W_{wide})$. The second wide length $L_{2wide}$ may be expressed in terms of the wide nominal length $L_{wide,nom}$, which is a length from the second wide portion nominal positions 228a and 228b to the second transition region 231, and the misalignment distance $\Delta x$: $L_{2wide} = L_{wide,nom} + \Delta x$. Then, the second component $R_{2wide}$ may be expressed as $R_{sheet} \times ((L_{wide,nom} + \Delta x)/W_{wide})$. The first resistor 202 and the second resistor 203 are designed to have the respective distances from the nominal positions 225a and 225b, and 228a and 228b, of the wide portion vertical connectors 213a and 213b, and 216a and 216b, to the transition regions 230 and 231, to both be equal to $L_{wide,nom}$.

A third component $R_{2trans}$ of the second resistance $R_2$ is from the second transition region 231. The first resistor 202 and the second resistor 203 are designed to have the respective transition regions 230 and 231 with equal shapes, so that $R_{2trans}$ equals $R_{1trans}$.

A fourth component $R_{2narr}$ of the second resistance $R_2$ is from an area of the second narrow portion 211, extending a second narrow length $L_{2narr}$ from the second transition region 231 to the second narrow portion vertical connector 218. The fourth component $R_{2narr}$ has a value of $R_{sheet} \times (L_{2narr}/W_{narr})$. The second narrow length $L_{2narr}$ may be expressed in terms of the narrow nominal length $L_{narr,nom}$, which is a length from the second transition region 231 to the second narrow portion nominal position 229, and the misalignment distance $\Delta x$: $L_{2narr} = L_{narr,nom} - \Delta x$. Then, the fourth component $R_{2narr}$ may be expressed as $R_{sheet} \times ((L_{narr,nom} - \Delta x)/W_{narr})$. The first resistor 202 and the second resistor 203 are designed to have the respective distances from the transition regions 230 and 231, to the nominal positions 227, and 229, of the narrow portion vertical connectors 215, and 218, to both be equal to $L_{narr,nom}$.

A fifth component $R_{2Nconn}$ of the second resistance $R_2$ is from an area of the second narrow portion 211 under and around the second narrow portion vertical connector 218. The first resistor 202 and the second resistor 203 are designed to have similar layouts, reversed from each other along the x direction, so that the fifth component $R_{2Nconn}$ of the second resistance $R_2$ is equal to the fifth component $R_{1Nconn}$ of the first resistance $R_1$, within tolerances encountered in fabrication of the first resistor 202 and the second resistor 203.

The second resistance $R_2$ may be expressed as a sum of the five components, in terms of the misalignment distance $\Delta x$.

$$R_2 = R_{2Wconn} + R_{sheet}\left(\frac{L_{wide,nom} + \Delta x}{W_{wide}}\right) + R_{2trans} + R_{sheet}\left(\frac{L_{narr,nom} - \Delta x}{W_{narr}}\right) + R_{2Nconn} \quad \text{Equation 2}$$

A difference between the first resistance $R_1$ and the second resistance $R_2$ may be expressed by subtracting Equation 1 from Equation 2, noting that $R_{2Wconn}$ equals $R_{1Wconn}$, that $R_{2Nconn}$ equals $R_{1Nconn}$, and that $R_{2trans}$ equals $R_{1trans}$, as expressed in Equation 3.

$$R_1 - R_2 = 2R_{sheet}\left(\frac{1}{W_{narr}} - \frac{1}{W_{wide}}\right)\Delta x \quad \text{Equation 3}$$

The misalignment distance Δx may be estimated from Equation 3 by dividing both sides by 2 $R_{sheet}$ ($1/W_{narr}-1/W_{wide}$), as expressed in Equation 4.

$$\Delta x = \frac{R_1 - R_2}{2R_{sheet}\left(\dfrac{1}{W_{narr}} - \dfrac{1}{W_{wide}}\right)} \quad \text{Equation 4}$$

The value of the sheet resistance $R_{sheet}$ may be obtained from process monitor measurements. The values of the first and third widths 206 and 210 of the wide portions 205 and 209 of the first resistor 202 and the second resistor 203 may be obtained from design data, and may be corrected using linewidth monitor measurements. The values of the second and fourth widths 208 and 212 of the narrow portions 207 and 211 of the first resistor 202 and the second resistor 203 may be obtained by similar means. Thus, the misalignment distance Δx may be estimated in absolute units using Equation 4, which may advantageously be used to monitor misalignment. Misalignment values may be used to correct photolithography processes used in forming conductor levels corresponding to the conductor level containing the resistors 202 and 203, or may be used to correct photolithography processes used in forming vertical connector levels corresponding to the vertical connector level containing the vertical connectors 213a, 213b, 215, 216a, 216b, and 218.

Figure 3:
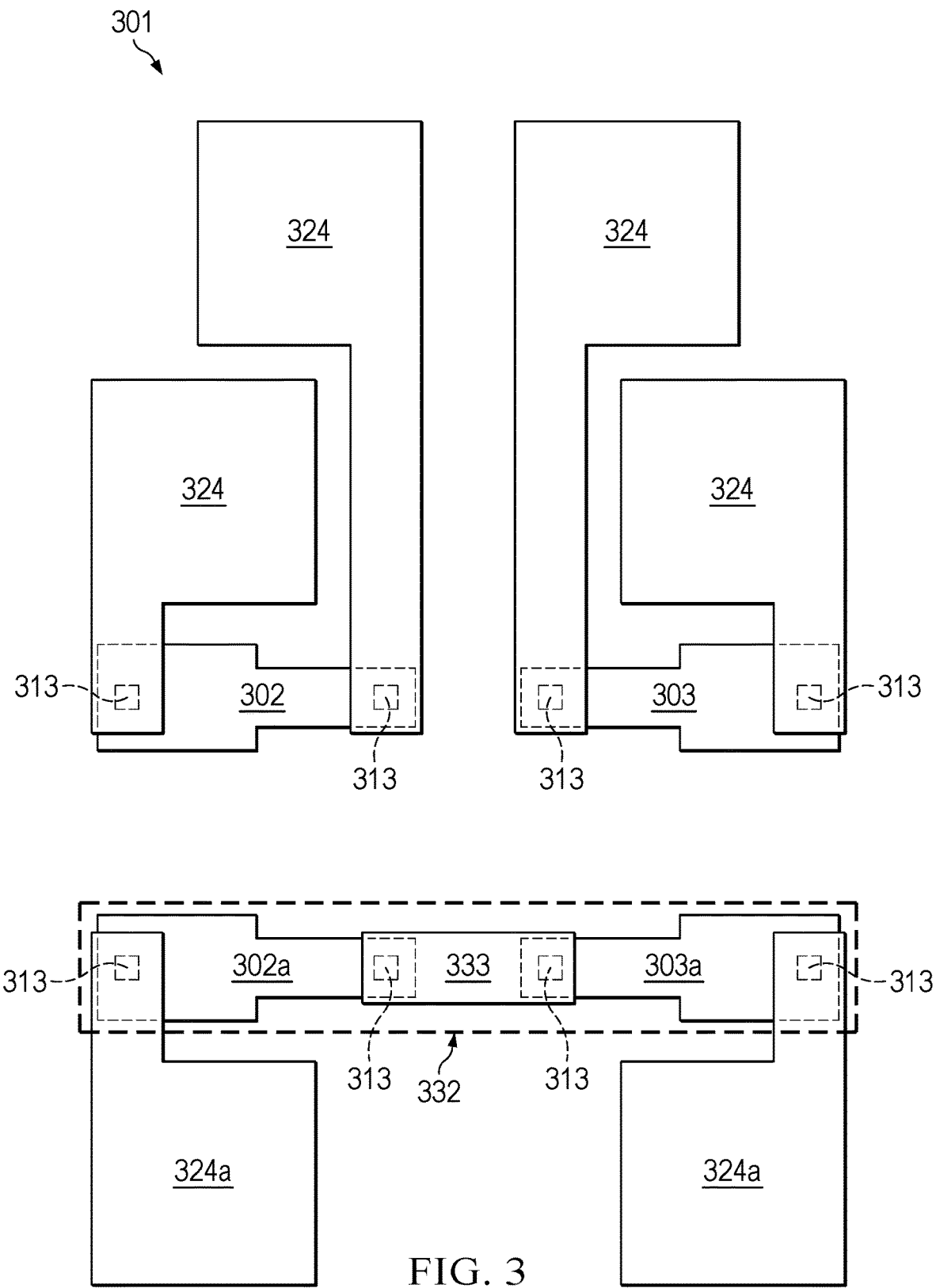
FIG. 3 is a top view of another example RDAM including a reference resistor pair.

FIG. 3 is a top view of another example RDAM including a reference resistor pair. The RDAM 301 includes a first resistor 302, a second resistor 303 and a reference resistor pair 332. The first resistor 302 and the second resistor 303 have the properties disclosed in reference to any of the examples herein, including wide portions and narrow portions. The reference resistor pair 332 includes a first duplicate resistor 302a and a second duplicate resistor 303a. The first resistor 302 and the first duplicate resistor 302a have equal dimensions and a same first orientation. The second resistor 303 and the second duplicate resistor 303a have equal dimensions and a same second orientation, antiparallel to the first orientation. The RDAM 301 further includes vertical connectors 313 on the wide portions and the narrow portions of the first resistor 302, the second resistor 303, the first duplicate resistor 302a, and the second duplicate resistor 303a, as disclosed in reference to the RDAM 101 of FIG. 1A and FIG. 1B and the RDAM 201 of FIG. 2. The first duplicate resistor 302a and the second duplicate resistor 303a are coupled in series through the vertical connectors 313 by a conductive link 333. The conductive link 333 makes contact to ends of the vertical connectors 313 opposite from the first duplicate resistor 302a and the second duplicate resistor 303a. The first duplicate resistor 302a and the second duplicate resistor 303a may be coupled in series through the vertical connectors 313 on the narrow portions of the duplicate resistors 302a and 303a, as depicted in FIG. 3. Alternatively, the first duplicate resistor 302a and the second duplicate resistor 303a may be coupled in series through the vertical connectors 313 on the wide portions of the duplicate resistors 302a and 303a. In a further version of this example, the first duplicate resistor 302a and the second duplicate resistor 303a may be coupled from wide portion to narrow portion.

Test terminals 324 are coupled to the vertical connectors 313 on the first resistor 302 and the second resistor 303, as disclosed in reference to the RDAM 101 of FIG. 1A. Additional test terminals 324a are coupled to the vertical connectors 313 on the portions of the first duplicate resistor 302a and the second duplicate resistor 303a which are not coupled together in series. For the version of this example depicted in FIG. 3, the additional test terminals 324a are coupled to the vertical connectors 313 on the wide portions of the first duplicate resistor 302a and the second duplicate resistor 303a. The conductive link 333 may be located in a same conductive level as the test terminals 324 and the additional test terminals 324a. The additional test terminals 324a enable measurement of a resistance of the reference resistor pair 332, which includes a resistance of the first duplicate resistor 302a and a resistance of the second duplicate resistor 303a.

The reference resistor pair 332 may enable a quantitative check on the estimate of the misalignment distance Δx, disclosed in reference to FIG. 2. The resistance $R_{ref}$ of the reference resistor pair 332 is expected to be equal to the sum of the resistances of the first resistor 302 and the second resistor 303, $R_1+R_2$, due to the first duplicate resistor 302a and the second duplicate resistor 303a having equal dimensions and orientations to the first resistor 302 and the second resistor 303. Any difference between the resistance of the reference resistor pair 332 and the sum of the resistances of the first resistor 302 and the second resistor 303, that is $|R_{ref}-(R_1+R_2)|$, may be attributed to unwanted variations in features of the reference resistor pair 332, the first resistor 302, and the second resistor 303, causing extraneous contributions to the resistances. Instances of the RDAM 301 in which a magnitude of the difference between the resistance of the reference resistor pair 332 and the sum of the resistances of the first resistor 302 and the second resistor 303 is significantly less than a magnitude of the difference of the resistances of the first resistor 302 and the second resistor 303, that is, $|R_{ref}-(R_1+R_2)|<<|R_1-R_2|$, may indicate the estimate of the misalignment distance Δx is accurate. Conversely, instances of the RDAM 301 in which the magnitude of the difference between the resistance of the reference resistor pair 332 and the sum of the resistances of the first resistor 302 and the second resistor 303 is comparable to the magnitude of the difference of the resistances of the first resistor 302 and the second resistor 303, that is, $|R_{ref}-(R_1+R_2)|\geq|R_1-R_2|$, may indicate the estimate of the misalignment distance Δx is undependable.

Figure 4:
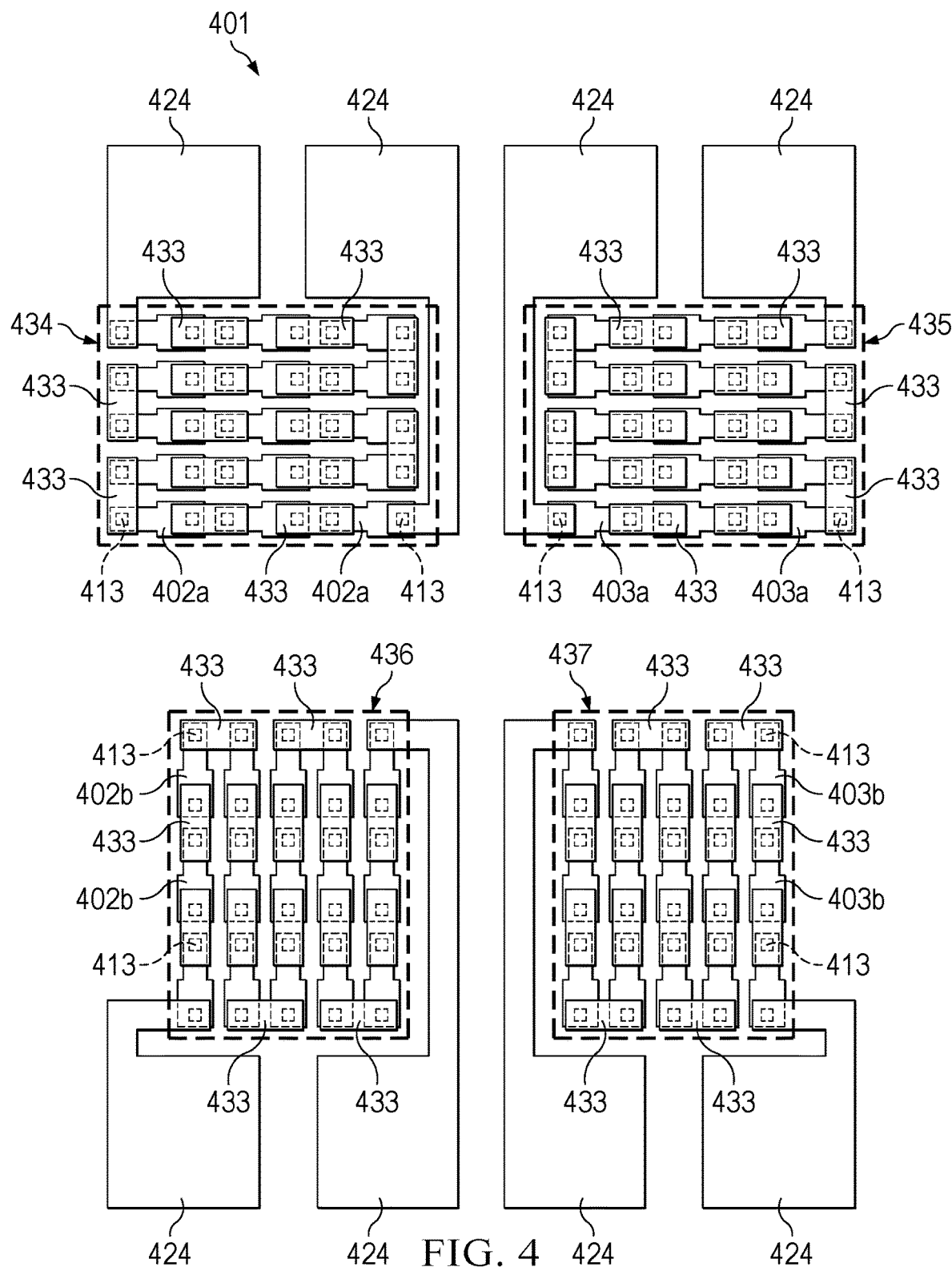
FIG. 4 is a top view of an example RDAM configured to estimate misalignment in two orthogonal directions.

FIG. 4 is a top view of an example RDAM configured to estimate misalignment in two orthogonal directions. The RDAM 401 includes a first horizontal resistor chain 434 with first horizontal resistors 402a and a second horizontal resistor chain 435 with second horizontal resistors 403a. The first horizontal resistors 402a and the second horizontal resistors 403a have the properties disclosed in reference to any of the examples herein, including wide portions and narrow portions.

The first horizontal resistors 402a are duplicates of each other. The first horizontal resistors 402a are connected serially through conductive links 433, wide portion to narrow portion, through vertical connectors 413 on the wide portions and the narrow portions of the first horizontal resistors 402a. The first horizontal resistors 402a are all oriented horizontally, that is, the vertical connectors 413 on the wide portions on each first horizontal resistor 402a are separated from the vertical connectors 413 on the narrow portions along a first horizontal direction. Instances of the first horizontal resistors 402a at ends of the first horizontal resistor chain 434 are coupled to test terminals 424.

The second horizontal resistors 403a are duplicates of each other. The second horizontal resistors 403a are connected serially through the conductive links 433, wide portion to narrow portion, through vertical connectors 413 on the wide portions and the narrow portions of the second horizontal resistors 403a. The second horizontal resistors 403a are all oriented horizontally, that is, the vertical connectors 413 on the wide portions on each second horizontal resistor 403a are separated from the vertical connectors 413 on the narrow portions along a second horizontal direction, anti-parallel to the first horizontal direction. Instances of the second horizontal resistors 403a at ends of the first horizontal resistor chain 434 are coupled to test terminals 424. The conductive links 433 may be coplanar with the test terminals 424.

The first horizontal resistor chain 434 and the second horizontal resistor chain 435 may be used to estimate a horizontal misalignment distance between members of a conductor level containing the first horizontal resistors 402a and the second horizontal resistors 403a and members of a vertical connector level containing the vertical connectors 413. A first horizontal chain resistance, $R_{1chain,horiz}$, may be measured using the test terminals 424 coupled to the first horizontal resistor chain 434. An average first horizontal resistance, $R_{1avg,horiz}$, of the first horizontal resistors 402a may be obtained by dividing the first horizontal chain resistance, $R_{1chain,horiz}$, by the number, $N_{1horiz}$, of the first horizontal resistors 402a in the first horizontal resistor chain 434, as expressed in Equation 5. Equation 5:

$$R_{1avg,horiz} = R_{1chain,horiz}/N_{1horiz}$$

A second horizontal chain resistance, $R_{2chain,horiz}$, may be measured using the test terminals 424 coupled to the second horizontal resistor chain 435. An average second horizontal resistance, $R_{2avg,horiz}$, of the second horizontal resistors 403a may be obtained by dividing the second horizontal chain resistance, $R_{2chain,horiz}$, by the number, $N_{2horiz}$, of the second horizontal resistors 403a in the second horizontal resistor chain 435, as expressed in Equation 6.

$$R_{2avg,horiz} = R_{2chain,horiz}/N_{2horiz} \qquad \text{Equation 6:}$$

The average first horizontal resistance, $R_{1avg,horiz}$, and the average second horizontal resistance, $R_{2avg,horiz}$, may then be subtracted to estimate the horizontal misalignment distance, as disclosed in reference to FIG. 2. The first horizontal resistor chain 434 and the second horizontal resistor chain 435 may include a sufficient number of the first horizontal resistors 402a and the second horizontal resistors 403a, respectively, to provide values of the first horizontal chain resistance, $R_{1chain,horiz}$, and the second horizontal chain resistance, $R_{2chain,horiz}$, that are more easily measured than single resistors. For example, the values of the first horizontal chain resistance, $R_{1chain,horiz}$, and the second horizontal chain resistance, $R_{2chain,horiz}$, may be 10 ohms to 10 kilo-ohms (kohms). The resistor chains 434 and 435 may be particularly advantageous for instances of the resistors 402a and 403a fabricated in conductive levels which have sheet resistance values less than 0.10 ohms/square, such as interconnect levels. Having multiple instances of the resistors 402a and 403a in the resistor chains 434 and 435 may provide more accurate estimates of the average horizontal resistances, $R_{1avg,horiz}$, and $R_{2avg,horiz}$, in the presence of parasitic resistances, such as in the test terminals 424.

The RDAM 401 includes a first vertical resistor chain 436 with first vertical resistors 402b and a second vertical resistor chain 437 with second vertical resistors 403b. The first vertical resistors 402b and the second vertical resistors 403b have the properties disclosed in reference to any of the examples herein, including wide portions and narrow portions. The first vertical resistors 402b are duplicates of each other, and are oriented parallel to each other, and the second vertical resistors 403b are duplicates of each other. The first vertical resistors 402b and the second vertical resistors 403b are oriented perpendicularly to the horizontal resistors 402a and 403a. The first vertical resistors 402b and the second vertical resistors 403b may be duplicates of the first horizontal resistors 402a and the second horizontal resistors 403a.

The first vertical resistors 402b are connected serially through the conductive links 433 through vertical connectors 413, and instances of the first vertical resistors 402b at ends of the first vertical resistor chain 436 are coupled to test terminals 424, as disclosed for the first horizontal resistors 402a. The second vertical resistors 403b are similarly connected serially through the conductive links 433 through vertical connectors 413, and coupled to test terminals 424.

The first vertical resistor chain 436 and the second vertical resistor chain 437 may be used to estimate a vertical misalignment distance, following the procedure disclosed for estimating the horizontal misalignment distance. Using the first vertical resistor chain 436 and the second vertical resistor chain 437, each having multiple instances of the first vertical resistors 402b and the second vertical resistors 403b, respectively, may provide the advantages disclosed in reference to the first horizontal resistor chain 434 and the second horizontal resistor chain 435.

Figure 5:
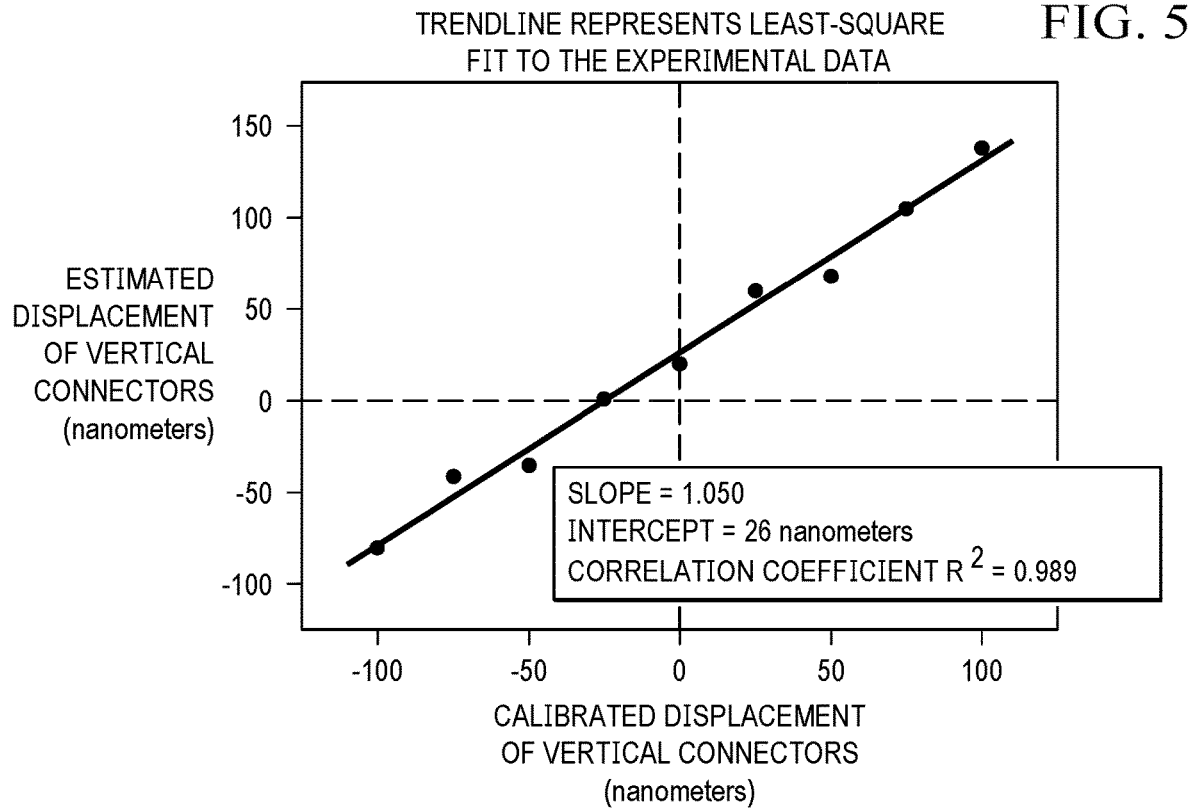
FIG. 5 is a chart of measurements acquired using a calibration RDAM.

FIG. 5 is a chart of measurements acquired using a calibration RDAM. The calibration RDAM, not shown, includes a first resistor chain of first resistors and a second resistor chain of second resistors, and vertical connectors, similar to the resistor chains 434 and 435 of FIG. 4. In the RDAM used in this example, the vertical connectors have a nominal length and width, parallel to a plane of the resistors, of 300 nanometers. The calibration RDAM further includes additional pairs of resistor chains in which the vertical connectors were intentionally displaced in positive and negative increments of 25 nanometers. The resistors were formed in a thin film resistor layer, and the vertical connectors were formed in a via level. Each pair of resistor chains was measured, and the corresponding misalignment distance was estimated. The estimated displacement of the vertical connectors was plotted against the intentional (calibrated) displacement of the vertical connectors in the chart of FIG. 5. A least-squares trendline of the data has a slope of 1.050, and an intercept of 26 nanometers, corresponding to the case of no intentional displacement. The estimated displacements have a correlation $R^2$ of 0.989 to the calibrated displacements. Deviations of the estimated displacements from the trendline are attributed to geometry errors in the photomask used to form the vertical connectors, as well as variations encountered in deposition of the thin film level, patterning the resistors, and etching via holes for the vertical connectors. The data shown in the chart of FIG. 5 indicates the RDAM is capable of estimating misalignment distances for vias on thin film resistor layers within 6 nanometers to 7 nanometers, significantly less than the allowed displacement tolerance of 100 nanometers.

Figure 6:
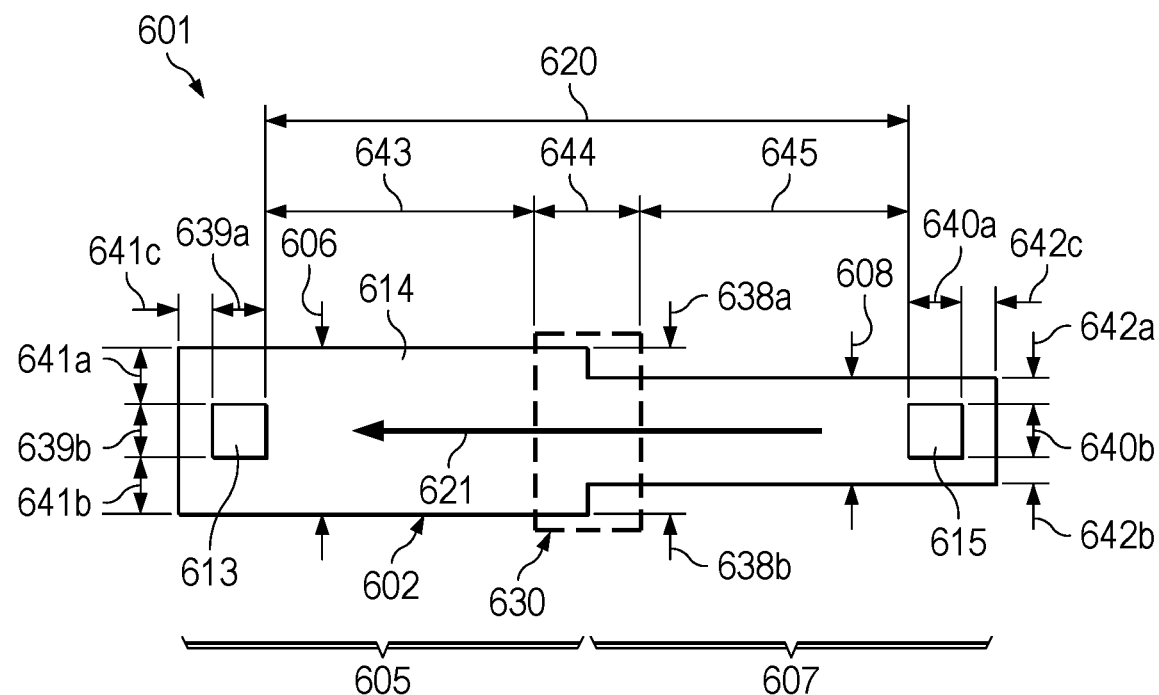
FIG. 6 is a top view of an example resistor of an RDAM, showing placement of vertical connectors.

FIG. 6 is a top view of an example resistor of an RDAM, showing placement of vertical connectors. The RDAM 601 includes a first resistor 602, and a second resistor, not shown in FIG. 6, which is a mirror duplicate of the first resistor 602. The first resistor 602 includes a wide portion 605 and a narrow portion 607 adjacent to the wide portion 605. In this example, the wide portion 605 extends past the narrow portion 607 by a first width increment 638a on a first side of the first resistor 602, and by a second width increment 638b on a second side of the first resistor 602. The first width increment 638a and the second width increment 638b may be equal. The RDAM 601 of this example includes a wide portion vertical connector 613 on a face 614 of the first resistor 602 in the wide portion 605, and includes a narrow portion vertical connector 615 contacting the face 614 of the first resistor 602 in the narrow portion 607. The wide portion vertical connector 613 is separated from the narrow portion vertical connector 615 by a resistor length 620 that extends in a first direction 621 from the narrow portion vertical connector 615 to the wide portion vertical connector 613. The wide portion 605 has a first width 606 adjacent to the wide portion vertical connector 613, on a side of the wide portion vertical connector 613 facing the narrow portion 607. The narrow portion 607 has a second width 608 adjacent to the narrow portion vertical connector 615, on a side of the narrow portion vertical connector 615 facing the wide portion 605. The first width 606 is greater than the second width 608.

The wide portion vertical connector 613 has a first inline dimension 639a parallel to the first direction 621 and a first transverse dimension 639b perpendicular to the first direction 621. The first inline dimension 639a and the first transverse dimension 639b are lateral dimensions of the wide portion vertical connector 613, that is, the first inline dimension 639a and the first transverse dimension 639b are parallel to the face 614, and are taken at the face 614. The first inline dimension 639a may be equal to the first transverse dimension 639b, as depicted in FIG. 6. Alternatively, the first inline dimension 639a may be greater than the first transverse dimension 639b, or the first inline dimension 639a may be less than the first transverse dimension 639b.

The narrow portion vertical connector 615 has a second inline dimension 640a parallel to the first direction 621 and a second transverse dimension 640b perpendicular to the first direction 621. The second inline dimension 640a and the second transverse dimension 640b are lateral dimensions, taken at the face 614. The second inline dimension 640a and the second transverse dimension 640b may be equal, as depicted in FIG. 6, or may be unequal. The second inline dimension 640a and the second transverse dimension 640b may be equal to the first inline dimension 639a and the first transverse dimension 639b, or may be different.

The vertical connectors 613 and 615 may have rounded corners or rounded shapes, due to image deformation in a photolithography process used to form the vertical connectors 613 and 615. The inline dimensions 639a and 640a are taken as maximum dimensions of the vertical connectors 613 and 615, respectively, parallel to the first direction 621. The transverse dimensions 639b and 640b are taken as maximum dimensions of the vertical connectors 613 and 615, respectively, perpendicular to the first direction 621.

Performance of the RDAM 601, with regard to estimating a misalignment distance of the vertical connectors 613 and 615 with respect to the first resistor 602, may be enhanced by forming the first resistor 602 to extend past the vertical connectors 613 and 615 so that the vertical connectors 613 and 615 are completely located on the face 614 of the first resistor 602, that is, the vertical connectors 613 and 615 do not extend over an edge of the first resistor 602. Specifically, the first resistor 602 extends past the wide portion vertical connector 613 to the first side of the first resistor 602 by a first width extension 641a, extends past the wide portion vertical connector 613 to the second side of the first resistor 602 by a second width extension 641b, and extends past the wide portion vertical connector 613 in a direction opposite from the narrow portion vertical connector 615 by a first length extension 641c. The extensions 641a, 641b, and 641c may be equal, or may be different. Similarly, the first resistor 602 extends past the narrow portion vertical connector 615 to the first side of the first resistor 602 by a third width extension 642a, extends past the narrow portion vertical connector 615 to the second side of the first resistor 602 by a fourth width extension 642b, and extends past the narrow portion vertical connector 615 in a direction opposite from the wide portion vertical connector 613 by a second length extension 642tgc. The extensions 642a, 642b, and 642c may be equal, or may be different. The width extensions 641a, 641b, 642a, and 642b may advantageously be larger than an expected misalignment of the vertical connectors 613 and 615 perpendicular to the first direction 621. This advantage may be attained by forming the first resistor 602 so that the width extensions 641a, 641b, 642a, and 642b are at least as large as a minimum of the lateral dimensions of the vertical connectors 613 and 615 at the face 614, referred to herein as the minimum vertical connection dimension, which is a minimum of the inline dimensions 639a and 640a and the transverse dimensions 639b and 640b of the vertical connectors 613 and 615. Similarly, the first resistor 602 may be formed so that the length extensions 641c and 642c are at least as large as the minimum vertical connection dimension.

During operation of the RDAM 601, a resistance of the first resistor 602 is measured. As disclosed in reference to FIG. 2, the resistance of the first resistor 602 may be divided into five components.

A first component is from an area of the wide portion 605 under and around the wide portion vertical connector 613. As noted above, performance of the RDAM 601 may be enhanced when the first resistor 602 extends past the wide portion vertical connector 613 on all sides.

A second component is from an area of the wide portion 605, extending a wide length 643 from the wide portion vertical connector 613 to a transition region 630 at a boundary between the wide portion 605 and the narrow portion 607. The wide length 643 corresponds to the first wide length $L_{1wide}$ of FIG. 2. Performance of the RDAM 601 may further be enhanced by forming the first resistor 602 so that the wide length 643 is 2 to 5 times the minimum vertical connection dimension. If the wide length 643 is less than 2 times the minimum vertical connection dimension, the RDAM 601 may provide an erroneous estimate of the misalignment distance due to reduced linearity in the relationship between the misalignment distance and the difference in resistances of the first resistor 602 and the second resistor. If the wide length 643 is greater than 5 times the minimum vertical connection dimension, extraneous contributions to the resistances, which are expected to increase as the wide length 643 is increased, may reduce accuracy of the estimate of the misalignment distance.

A third component of the first resistance is from the transition region 630. The transition region 630 corresponds to changes in current density between the wide portion 605 and the narrow portion 607. A transition width 644 of the transition region 630 may be taken as twice a maximum of the first width increment 638a and the second width increment 638b.

A fourth component of the resistance is from an area of the narrow portion 607, extending a narrow length 645 from the transition region 630 to the narrow portion vertical connector 615. The narrow length 645 corresponds to the first narrow length $L_{1narr}$ of FIG. 2. Similarly to the wide length 643, performance of the RDAM 601 may further be enhanced by forming the first resistor 602 so that the narrow length 645 is 2 to 5 times the minimum vertical connection dimension.

A fifth component of the resistance is from an area of the narrow portion 607 under and around the narrow portion vertical connector 615. As noted above, performance of the RDAM 601 may be enhanced when the first resistor 602 extends past the narrow portion 607 on all sides.

In this example, the first resistor 602 may have a rectilinear profile in the transition region 630 between the wide portion 605 and the narrow portion 607, in which an edge of the first resistor 602 has a straight segment at the transition from the wide portion 605 to the narrow portion 607, on each side of the first resistor 602; the straight segments are oriented at right angles to the edges of the first resistor 602 in the wide portion 605 and the narrow portion 607. The rectilinear profile may advantageously facilitate automated layout of the RDAM 601.

Figure 7:
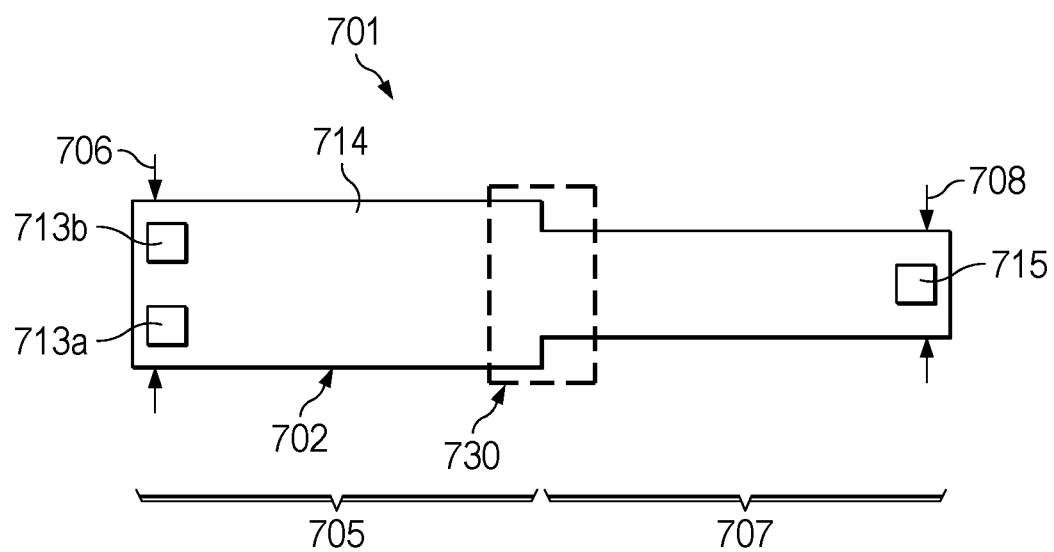
FIG. 7 is a top view of another example resistor of an RDAM, showing placement of vertical connectors.

FIG. 7 is a top view of another example resistor of an RDAM, showing placement of vertical connectors. The RDAM 701 includes a first resistor 702, and a second resistor, not shown in FIG. 7. The first resistor 702 includes a wide portion 705 and a narrow portion 707 adjacent to the wide portion 705.

The RDAM 701 of this example includes two wide portion vertical connectors 713a and 713b, arranged across a width of the first resistor 702 in the wide portion 705. The wide portion vertical connectors 713a and 713b contact a face 714 of the first resistor 702. The two wide portion vertical connectors 713a and 713b may provide a more consistent resistance of the first resistor 702, which may advantageously provide a more accurate estimate of a misalignment distance by the RDAM 701.

The wide portion 705 has a first width 706 adjacent to the wide portion vertical connectors 713a and 713b, on a side of the wide portion vertical connectors 713a and 713b facing the narrow portion 707. The narrow portion 707 has a second width 708 adjacent to the narrow portion vertical connector 715, on a side of the narrow portion vertical connector 715 facing the wide portion 705. The first width 706 is greater than the second width 708.

The RDAM 701 of this example includes a single narrow portion vertical connector 715 contacting the face 714 of the first resistor 702 in the narrow portion 707. The single narrow portion vertical connector 715 may enable a minimum width of the first resistor 702, consistent with the first resistor 702 extending past the narrow portion vertical connector 715 on all sides, which may advantageously reduce a total area of the RDAM 701.

In this example, the first resistor 702 may have a sloped edge profile in a transition region 730 between the wide portion 705 and the narrow portion 707. The sloped profile may provide more consistent patterns by a photolithographic process used to form the first resistor 702, advantageously providing more accurate estimates of misalignment distances by the instances of the RDAM 701.

Figure 8:
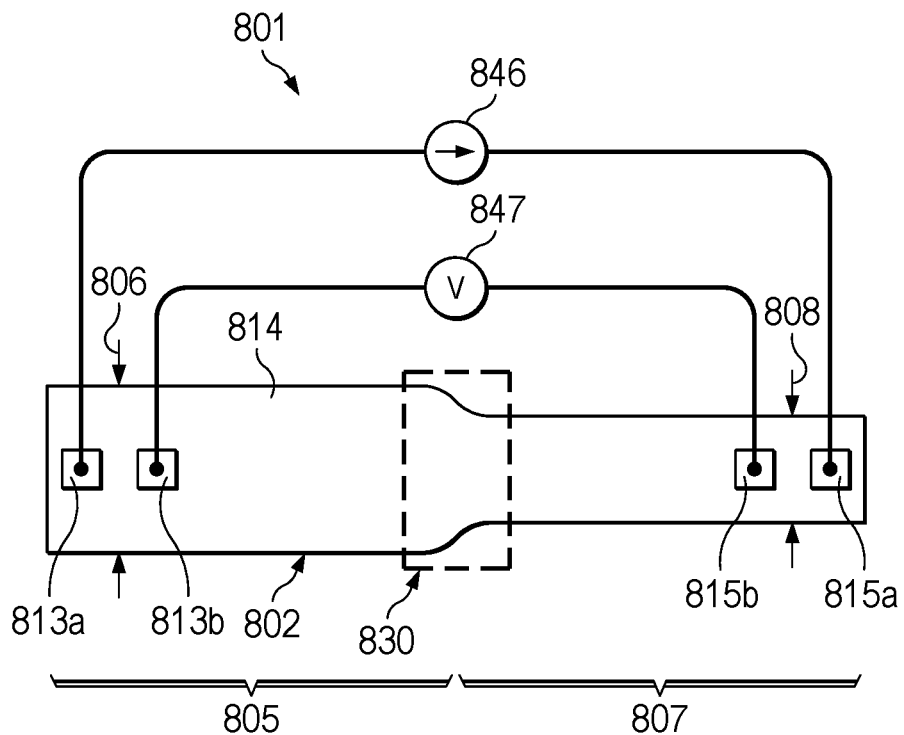
FIG. 8 is a top view of a further example of a resistor of an RDAM, showing placement of vertical connectors.

FIG. 8 is a top view of a further example of a resistor of an RDAM, showing placement of vertical connectors. The RDAM 801 includes a first resistor 802, and a second resistor, not shown in FIG. 8. The first resistor 802 includes a wide portion 805 and a narrow portion 807 adjacent to the wide portion 805.

The RDAM 801 of this example includes a first wide portion vertical connector 813a and a second wide portion vertical connector 813b, contacting a face 814 of the first resistor 802. The first wide portion vertical connector 813a and the second wide portion vertical connector 813b are arranged along a direction of current flow of the first resistor 802 in the wide portion 805. The RDAM 801 of this example includes a first narrow portion vertical connector 815a and a second narrow portion vertical connector 815b, contacting the face 814. The first narrow portion vertical connector 815a and the second narrow portion vertical connector 815b are arranged along a direction of current flow of the first resistor 802 in the narrow portion 807.

The wide portion 805 has a first width 806 adjacent to the second wide portion vertical connector 813b, on a side of the second wide portion vertical connector 813b facing the narrow portion 807. The narrow portion 807 has a second width 808 adjacent to the second narrow portion vertical connector 815b, on a side of the second narrow portion vertical connector 815b facing the wide portion 805. The first width 806 is greater than the second width 808.

During operation of the RDAM 801, the first wide portion vertical connector 813a and the first narrow portion vertical connector 815a may be connected to a current source 846, so that current flows through the first resistor 802 from the first narrow portion vertical connector 815a to the first wide portion vertical connector 813a, as indicated in FIG. 8, or vice versa. The second wide portion vertical connector 813b and the second narrow portion vertical connector 815b may be connected to an electric potential measurement component 847, such as a voltmeter or source-measurement unit (SMU). The electric potential measurement component 847 provides a measurement of the potential across the first resistor 802 from the second narrow portion vertical connector 815b to the second wide portion vertical connector 813b produced by the current from the current source 846. The resistance of the first resistor 802 is estimated by dividing the measurement of the potential from the electric potential measurement component 847 by the current from the current source 846. The measurement technique of FIG. 8 may advantageously reduce unwanted extraneous resistance contributions from test terminals and probe equipment, advantageously providing a more accurate estimate of a misalignment distance by the RDAM 801. The measurement technique of FIG. 8 is commonly referred to as a kelvin measurement.

In this example, the first resistor 802 may have a curved edge profile in a transition region 830 between the wide portion 805 and the narrow portion 807. The curved profile may provide even more consistent patterns by a photolithographic process used to form the first resistor 802, compared to rectilinear or diagonal profiles with sharp corners, advantageously providing more accurate estimates of misalignment distances by the instances of the RDAM 801.

Figure 9:
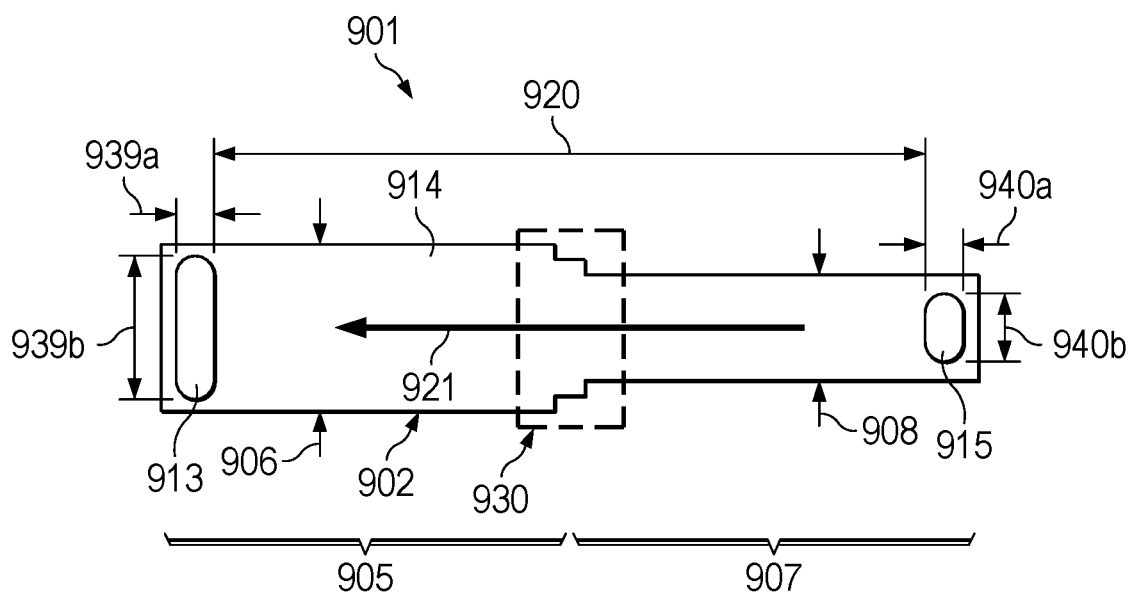
FIG. 9 is a top view of an example of an RDAM, showing stretched vertical connectors.

FIG. 9 is a top view of an example of an RDAM, showing stretched vertical connectors. The RDAM 901 includes a first resistor 902, and a second resistor, not shown in FIG. 9. The first resistor 902 includes a wide portion 905 and a narrow portion 907 adjacent to the wide portion 905.

The RDAM 901 of this example includes a wide portion vertical connector 913 on a face 914 of the first resistor 902 in the wide portion 905, and includes a narrow portion vertical connector 915 contacting the face 914 of the first resistor 902 in the narrow portion 907. The wide portion vertical connector 913 is separated from the narrow portion vertical connector 915 by a resistor length 920 that extends in a first direction 921 from the narrow portion vertical connector 915 to the wide portion vertical connector 913. The wide portion vertical connector 913 of this example is a stretched vertical connector having a first inline dimension 939a parallel to the first direction 921, and a first transverse dimension 939b perpendicular to the first direction 921, in which the first transverse dimension 939b is at least 3 times the first inline dimension 939a. The stretched aspect of the wide portion vertical connector 913 may advantageously reduce unwanted variations in measured resistance of the first resistor 902 during operation of the RDAM 901. The narrow portion vertical connector 915 of this example is also a stretched vertical connector having a second inline dimension 940a parallel to the first direction 921, and a second transverse dimension 940b perpendicular to the first direction 921, in which the second transverse dimension 940b is at least 1.5 times the second inline dimension 940a. The stretched aspect of the narrow portion vertical connector 915 may further reduce unwanted variations in measured resistance of the first resistor 902.

The wide portion 905 has a first width 906 adjacent to the wide portion vertical connector 913, on a side of the wide portion vertical connector 913 facing the narrow portion 907. The narrow portion 907 has a second width 908 adjacent to the narrow portion vertical connector 915, on a side of the narrow portion vertical connector 915 facing the wide portion 905. The first width 906 is greater than the second width 908.

In this example, the first resistor 902 may have a stepped edge profile in a transition region 930 between the wide portion 905 and the narrow portion 907. The stepped profile may provide more process latitude for a photolithographic process used to form the first resistor 902, compared to rectilinear profiles with sharp corners, while being compatible with design rules that do not allow diagonal edges.

Figure 10:
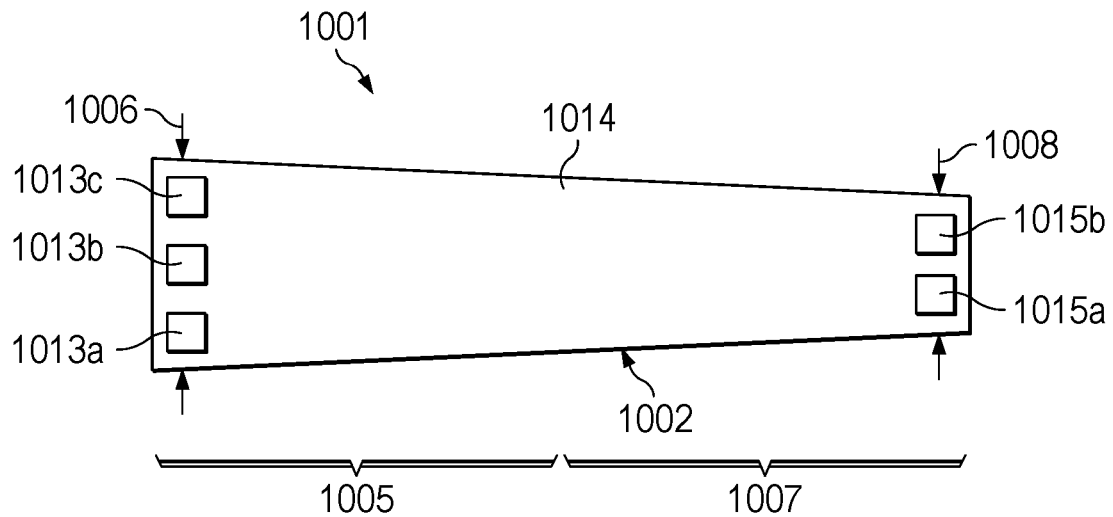
FIG. 10 is a top view of an example of a tapered resistor of an RDAM.

FIG. 10 is a top view of an example of a tapered resistor of an RDAM. The RDAM 1001 includes a first resistor 1002, and a second resistor, not shown in FIG. 10. The first resistor 1002 has a tapered shape, with a wide portion 1005 and a narrow portion 1007 adjacent to the wide portion 1005.

The RDAM 1001 of this example includes wide portion vertical connectors 1013a, 1013b, and 1013c on a face 1014 of the first resistor 1002 in the wide portion 1005, and includes narrow portion vertical connectors 1015a and 1015b contacting the face 1014 of the first resistor 1002 in the narrow portion 1007. The wide portion 1005 has a first width 1006 adjacent to the wide portion vertical connectors 1013a, 1013b, and 1013c, on a side of the wide portion vertical connectors 1013a, 1013b, and 1013c facing the narrow portion 1007. The narrow portion 1007 has a second width 1008 adjacent to the narrow portion vertical connectors 1015a and 1015b, on a side of the narrow portion vertical connectors 1015a and 1015b facing the wide portion 1005. The first width 1006 is greater than the second width 1008.

In this example, the wide portion 1005 and the narrow portion 1007 may be taken to meet at a midpoint between the wide portion vertical connectors 1013a, 1013b, and 1013c and the narrow portion vertical connectors 1015a and 1015b. The wide portion 1005 has a first width 1006 adjacent to the wide portion vertical connectors 1013a through 1013c, on a side of the wide portion vertical connectors 1013a through 1013c facing the narrow portion 1007. The narrow portion 1007 has a second width 1008 adjacent to the narrow portion vertical connectors 1015a and 1015b, on a side of the narrow portion vertical connectors 1015a and 1015b facing the wide portion 1005. The first width 1006 is greater than the second width 1008.

The RDAM 1001 of this example may be used to provide an estimate of a misalignment distance as disclosed in reference to FIG. 2. The tapered shape of first resistor 1002 may provide more uniform current density between the wide portion vertical connectors 1013a, 1013b, and 1013c and the narrow portion vertical connectors 1015a and 1015b, which may advantageously provide a more accurate estimate of the misalignment distance, compared to resistors having abrupt transitions between their wide portions and narrow portions.

The multiple wide portion vertical connectors 1013a, 1013b, and 1013c may provide more uniform current density in the wide portion 1005, and the multiple narrow portion vertical connectors 1015a and 1015b may provide more uniform current density in the narrow portion 1007, further improving the accuracy of the misalignment distance estimate.

Figure 11:
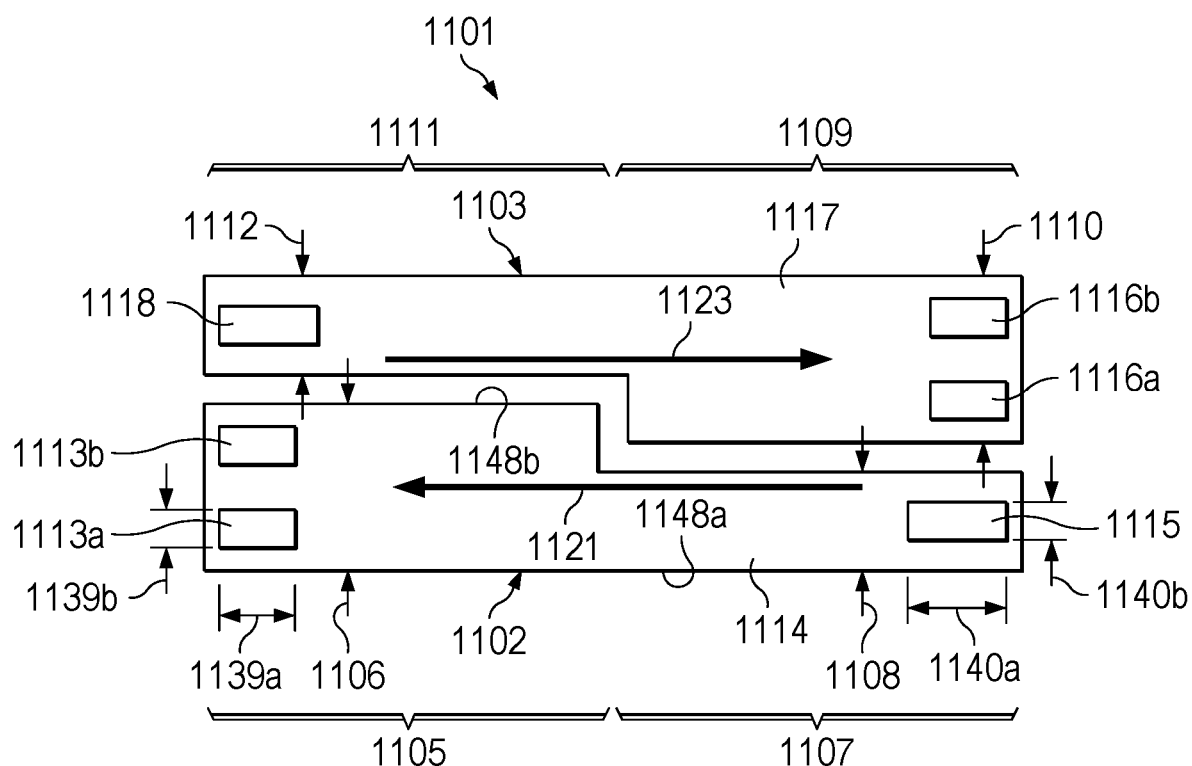
FIG. 11 is a top view of an example of non-symmetric shaped resistors of an RDAM.

FIG. 11 is a top view of an example of non-symmetric shaped resistors of an RDAM. The RDAM 1101 includes a first resistor 1102 and a second resistor 1103. A first face 1114 of the first resistor 1102 is coplanar with a second face 1117 of the second resistor 1103. The first resistor 1102 has a first wide portion 1105 and a first narrow portion 1107 adjacent to the first wide portion 1105. The first resistor 1102 of this example has a straight side 1148a and a staggered side 1148b opposite from the straight side 1148a. The staggered side 1148b may have a rectilinear form, composed of straight edges meeting at right angles, as depicted in FIG. 11, may have a polygonal form, composed of straight edges meeting at acute and obtuse angles, or may have a curvilinear form, composed of straight and curved edges. Thus, first narrow portion 1107 is offset with regard to the first wide portion 1105, so that the first resistor 1102 has a non-symmetric shape.

The RDAM 1101 of this example includes two first wide portion vertical connectors 1113a and 1113b, arranged across a width of the first resistor 1102 in the first wide portion 1105. The first wide portion vertical connectors 1113a and 1113b contact the first face 1114 of the first resistor 1102. The RDAM 1101 of this example includes a single first narrow portion vertical connector 1115 contacting the first face 1114 of the first resistor 1102 in the first narrow portion 1107. The first wide portion vertical connectors 1113a and 1113b have a first inline dimension 1139a along a first direction 1121 that points from the first narrow portion vertical connector 1115 to the first wide portion vertical connectors 1113a and 1113b. The first wide portion vertical connectors 1113a and 1113b have a first transverse dimension 1139b perpendicular to the first direction 1121. The first narrow portion vertical connector 1115 has a second inline dimension 1140a along the first direction 1121 and a second transverse dimension 1140b perpendicular to the first direction 1121. In this example, the first transverse dimension 1139b and the second transverse dimension 1140b may be equal, and may be determined by fabrication guidelines for a vertical connector level of which the first wide portion vertical connectors 1113a and 1113b and the first narrow portion vertical connector 1115 are members. The second inline dimension 1140a may be greater than the first inline dimension 1139a, to provide a closer match between a head resistance at the first narrow portion vertical connector 1115 and a head resistance at the first wide portion vertical connectors 1113a and 1113b. The configuration of the first wide portion vertical connectors 1113a and 1113b and the first narrow portion vertical connector 1115 may be particularly advantageous for instances of the first resistor 1102 having a sheet resistance less than 0.10 ohms/square.

The first wide portion 1105 has a first width 1106 adjacent to the first wide portion vertical connectors 1113a and 1113b, on a side of the first wide portion vertical connectors 1113a and 1113b facing the first narrow portion 1107. The first narrow portion 1107 has a second width 1108 adjacent to the first narrow portion vertical connector 1115, on a side of the first narrow portion vertical connector 1115 facing the first wide portion 1105. The first width 1106 is greater than the second width 1108.

The second resistor 1103 is a duplicate of the first resistor 1102 having a second wide portion 1109 and a second narrow portion 1111 adjacent to, and offset from, the second wide portion 1109. The second resistor 1103 has the same non-symmetric shape as the first resistor 1102, reversed in direction. The RDAM 1101 of this example includes two second wide portion vertical connectors 1116*a* and 1116*b* contacting the second face 1117 in the second wide portion 1109, and a single second narrow portion vertical connector 1118 contacting the second face 1117 in the second narrow portion 1111. The second wide portion vertical connectors 1116*a* and 1116*b* have the same dimensions as the first wide portion vertical connectors 1113*a* and 1113*b*, and the second narrow portion vertical connector 1118 has the same dimensions as the first narrow portion vertical connector 1115.

The second wide portion 1109 has a third width 1110, equal to the first width 1106, adjacent to the second wide portion vertical connectors 1116*a* and 1116*b*, on a side of the second wide portion vertical connectors 1116*a* and 1116*b* facing the second narrow portion 1111. The second narrow portion 1111 has a fourth width 1112, equal to the second width 1108, adjacent to the second narrow portion vertical connector 1118, on a side of the second narrow portion vertical connector 1118 facing the second wide portion 1109.

The second resistor 1103 is reversed in direction from the first resistor 1102, that is, a second direction 1123 that points from the second narrow portion vertical connector 1118 to the second wide portion vertical connectors 1116*a* and 1116*b* is anti-parallel to the first direction 1121. The non-symmetric shapes of the first resistor 1102 and the second resistor 1103 may enable a more compact layout of the RDAM 1101 compared to resistor having symmetric shapes.

Figure 12A:
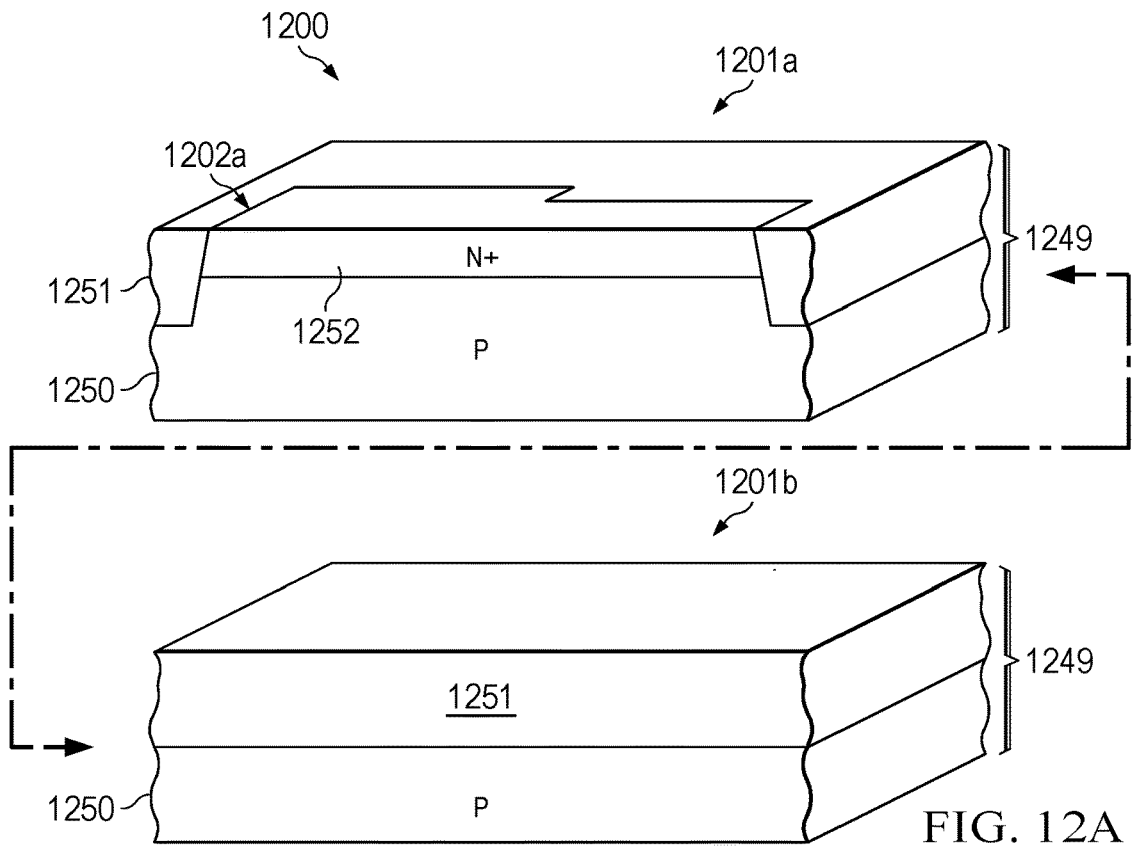
FIG. 12A through FIG. 12E are cross sections of a microelectronic device having two example RDAMs, depicted in stages of an example method of formation.

FIG. 12A through FIG. 12E are cross sections of a microelectronic device having two example RDAMs, depicted in stages of an example method of formation. Referring to FIG. 12A, the microelectronic device 1200 may be manifested as any of the microelectronic device types disclosed in reference to the microelectronic device 100 of FIG. 1A and FIG. 1B. The microelectronic device 1200 of this example is formed in and on a substrate 1249. The substrate 1249 includes a first area for a first RDAM 1201*a* and a second area for a second RDAM 1201*b*.

The substrate 1249 include a semiconductor material 1250 having a first conductivity type. In this example, the first conductivity type may be p-type, as indicated in FIG. 12A. A field relief dielectric layer 1251, commonly referred to as field oxide, is formed in and on the substrate 1249. The field relief dielectric layer 1251 may be formed by a shallow trench isolation (STI) process and have an STI structure in which the field relief dielectric layer 1251 is in a trench in the semiconductor material 1250, as depicted in FIG. 12A. Alternatively, the field relief dielectric layer 1251 may be formed by a local oxidation of silicon (LOCOS) process and have a LOCOS structure, in which the field relief dielectric layer 1251 would have tapered edges, and extend partway into the semiconductor material 1250 and extend partway above the semiconductor material 1250.

The first area for the first RDAM 1201*a* is free of the field relief dielectric layer 1251 in an area for a first resistor 1202*a* and an area for a second resistor, not shown. The first resistor 1202*a* and the second resistor are parts of the first RDAM 1201*a*. A diffused layer 1252 having a second conductivity type, opposite from the first conductivity type, is formed in the semiconductor material 1250 where exposed by the field relief dielectric layer 1251. In this example, the second conductivity type may be n-type, as indicated in FIG. 12A. The diffused layer 1252 is a member of a diffused layer level which may have an average dopant density of $1 \times 10^{18}$ atoms/cm$^3$ to $1 \times 10^{20}$ atoms/cm$^3$, by way of example. The diffused layer 1252 may have a depth less than 1 micron. The diffused layer level may provide source/drain contact regions for n-channel metal oxide semiconductor (NMOS) transistors and contact regions for n-type wells in the microelectronic device 1200. In the first area for the first RDAM 1201*a*, the diffused layer 1252 provides a portion of the first resistor 1202*a* and a portion of the second resistor.

The field relief dielectric layer 1251 may extend over the semiconductor material 1250 in the second area for the second RDAM 1201*b*, as depicted in FIG. 12A. Alternatively, the second area for the second RDAM 1201*b* may be free of the field relief dielectric layer 1251.

Figure 12B:
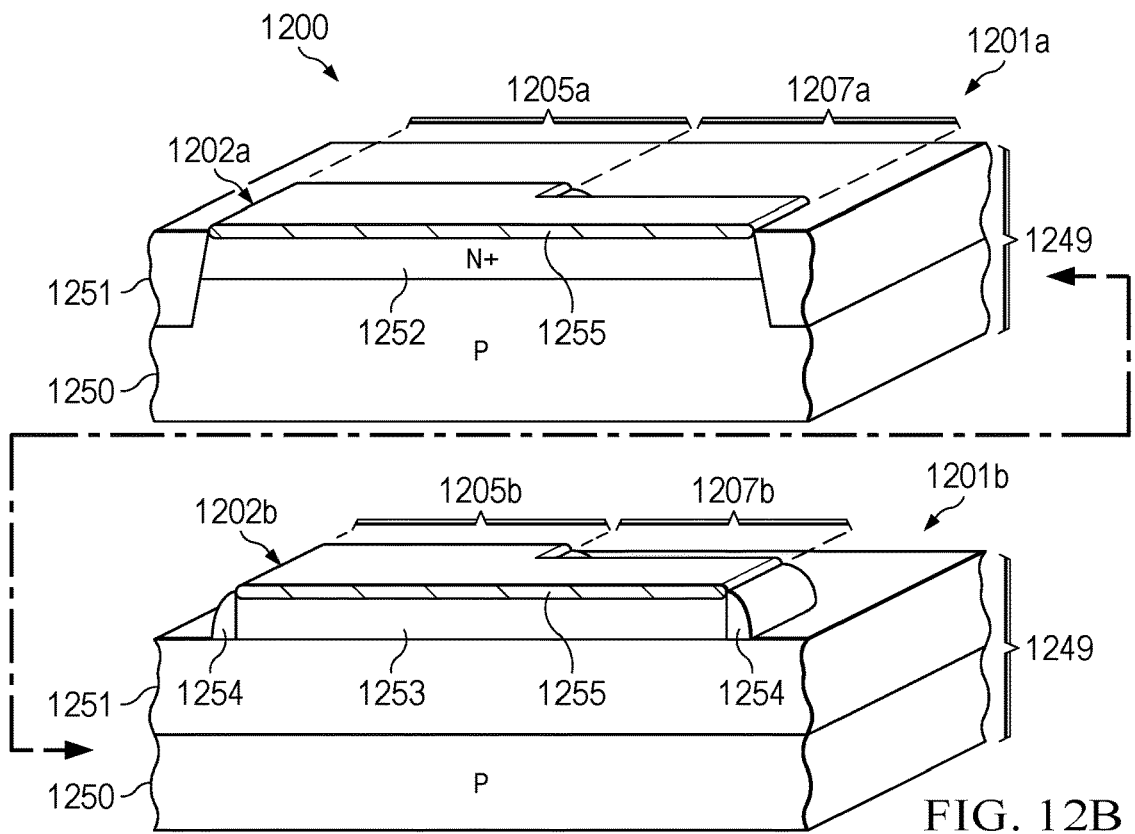

Referring to FIG. 12B, a gate layer 1253 is formed over the substrate 1249 and the field relief dielectric layer 1251. The gate layer 1253 is a member of a gate level whose members may provide gates for NMOS transistors or p-channel metal oxide semiconductor (PMOS) transistors in the microelectronic device 1200. The gate level may provide resistors or capacitor plates in the microelectronic device 1200. The gate layer 1253 may include polycrystalline silicon, commonly referred to as polysilicon. Alternatively, the gate layer 1253 may include titanium nitride, tantalum nitride, fully silicided polysilicon (FUSI), or other conductive material. Sidewall spacers 1254 may be formed on lateral surfaces of the gate layer 1253. The sidewall spacers 1254 may include silicon nitride, silicon dioxide, or silicon oxynitride, by way of example.

In this example, the first area for the first RDAM 1201*a* is free of the gate layer 1253. In the second area for the second RDAM 1201*b*, the gate layer 1253 provides a portion of a third resistor 1202*b* and a fourth resistor, not shown. The third resistor 1202*b* and the fourth resistor are parts of the second RDAM 1201*b*.

A metal silicide layer 1255 is formed on exposed silicon of the substrate 1249 and exposed polysilicon in the gate layer 1253. The metal silicide layer 1255 may include titanium silicide, cobalt silicide, or nickel silicide, by way of example. The metal silicide layer 1255 may be formed by forming a layer of metal on the microelectronic device 1200, contacting the exposed silicon and polysilicon. Subsequently, the layer of metal is heated to react the layer of metal with the exposed silicon and polysilicon to form the metal silicide layer 1255. Unreacted metal is removed from the microelectronic device 1200, leaving the metal silicide layer 1255 in place. The metal silicide layer 1255 may provide electrical connections to the gate layer 1253 and the substrate 1249.

In the first area for the first RDAM 1201*a*, the metal silicide layer 1255 on the diffused layer 1252 provides another portion of the first resistor 1202*a* and another portion of the second resistor. In the second area for the second RDAM 1201*b*, the metal silicide layer 1255 on the gate layer 1253 provides another portion of the third resistor 1202*b* and another portion of the fourth resistor.

The first resistor 1202*a* includes a first wide portion 1205*a* and a first narrow portion 1207*a*, according to any of the examples disclosed in reference to FIG. 1A and FIG. 1B, FIG. 2, and FIG. 6 through FIG. 11. The second resistor is a duplicate of the first resistor 1202*a*, having a second wide portion and a second narrow portion, reversed in direction. The third resistor 1202*b* includes a third wide portion 1205*b* and a third narrow portion 1207b, according to any of the examples disclosed in reference to FIG. 1A and FIG. 1B, FIG. 2, and FIG. 6 through FIG. 11. The fourth resistor is a duplicate of the third resistor 1202b, having a fourth wide portion and a fourth narrow portion, reversed in direction.

Figure 12C:
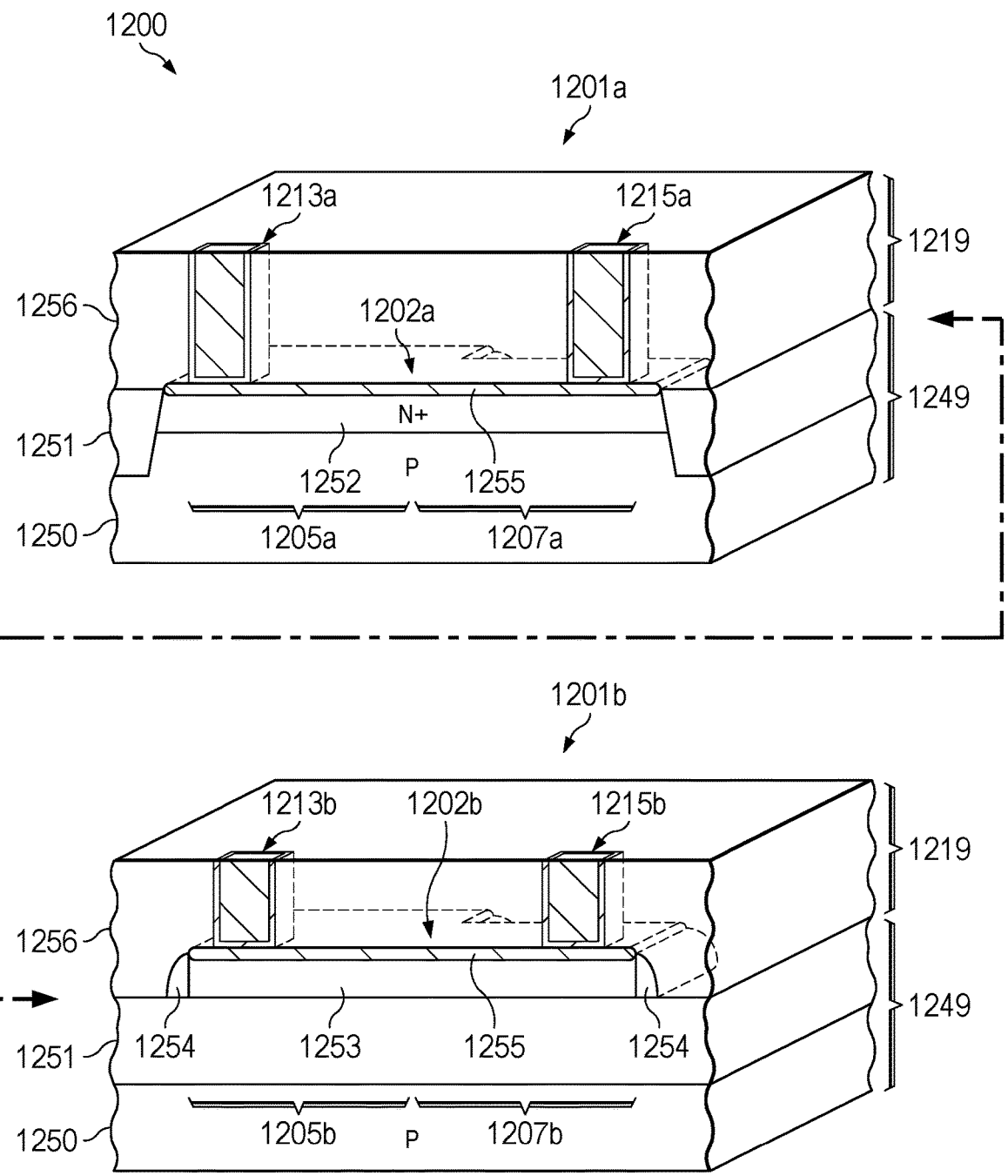

Referring to FIG. 12C, a pre-metal dielectric (PMD) layer 1256 is formed over the existing layers of the microelectronic device 1200, covering the metal silicide layer 1255 and the field relief dielectric layer 1251. The PMD layer 1256 is electrically non-conductive, and may include one or more sublayers of dielectric material. By way of example, the PMD layer 1256 may include a PMD liner, not specifically shown, of silicon nitride, contacting the metal silicide layer 1255 and the field relief dielectric layer 1251. The PMD layer 1256 may also include a planarized layer of silicon dioxide-based dielectric material, not specifically shown, of silicon dioxide, phosphosilicate glass (PSG), fluorinated silicate glass (FSG), or borophosphosilicate glass (BPSG), on the PMD liner. The PMD layer 1256 may further include a PMD cap layer, not specifically shown, of silicon nitride, silicon carbide, or silicon carbonitride, on the planarized layer. Other layer structures and compositions for the PMD layer 1256 are within the scope of this example.

A vertical connector level 1219 is formed in the PMD layer 1256. The vertical connector level 1219 includes a first wide portion vertical connector 1213a of the first RDAM 1201a on the first resistor 1202a in the first wide portion 1205a, and a first narrow portion vertical connector 1215a on the first resistor 1202a in the first narrow portion 1207a. The first wide portion vertical connector 1213a and the first narrow portion vertical connector 1215a are conductive and extend through the PMD layer 1256 to make electrical connections to the first resistor 1202a. The vertical connector level 1219 also includes second wide and narrow vertical connectors, not shown, to the second resistor. The vertical connector level 1219 further includes a third wide portion vertical connector 1213b of the second RDAM 1201b on the third resistor 1202b in the third wide portion 1205b, and a third narrow portion vertical connector 1215b on the third resistor 1202b in the third narrow portion 1207b. The third wide portion vertical connector 1213b and the third narrow portion vertical connector 1215b are conductive and extend through the PMD layer 1256 to make electrical connections to the third resistor 1202b. The vertical connector level 1219 also includes fourth wide and narrow vertical connectors, not shown, to the fourth resistor. The vertical connector level 1219 also includes other vertical connectors, not shown, that provide electrical connections to components such as NMOS transistors and PMOS transistors of the microelectronic device 1200. The vertical connectors of the vertical connector level 1219 are commonly referred to as contacts. The vertical connectors of the vertical connector level 1219 may include a liner/barrier of titanium and titanium nitride and a core metal of tungsten, as indicated in FIG. 12C. Other structures for the vertical connectors of the vertical connector level 1219 are within the scope of this example.

Figure 12D:
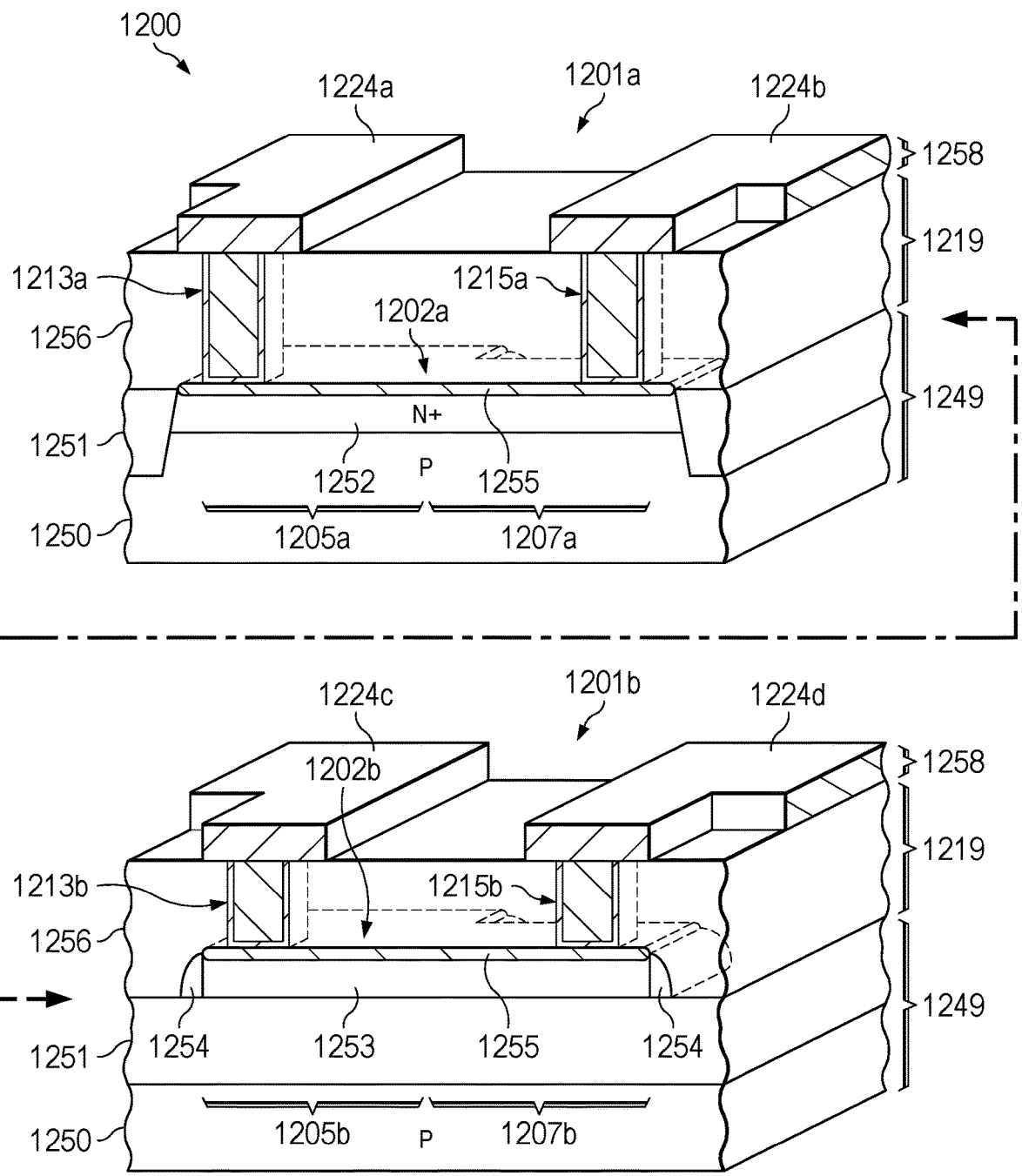
Figure 12E:
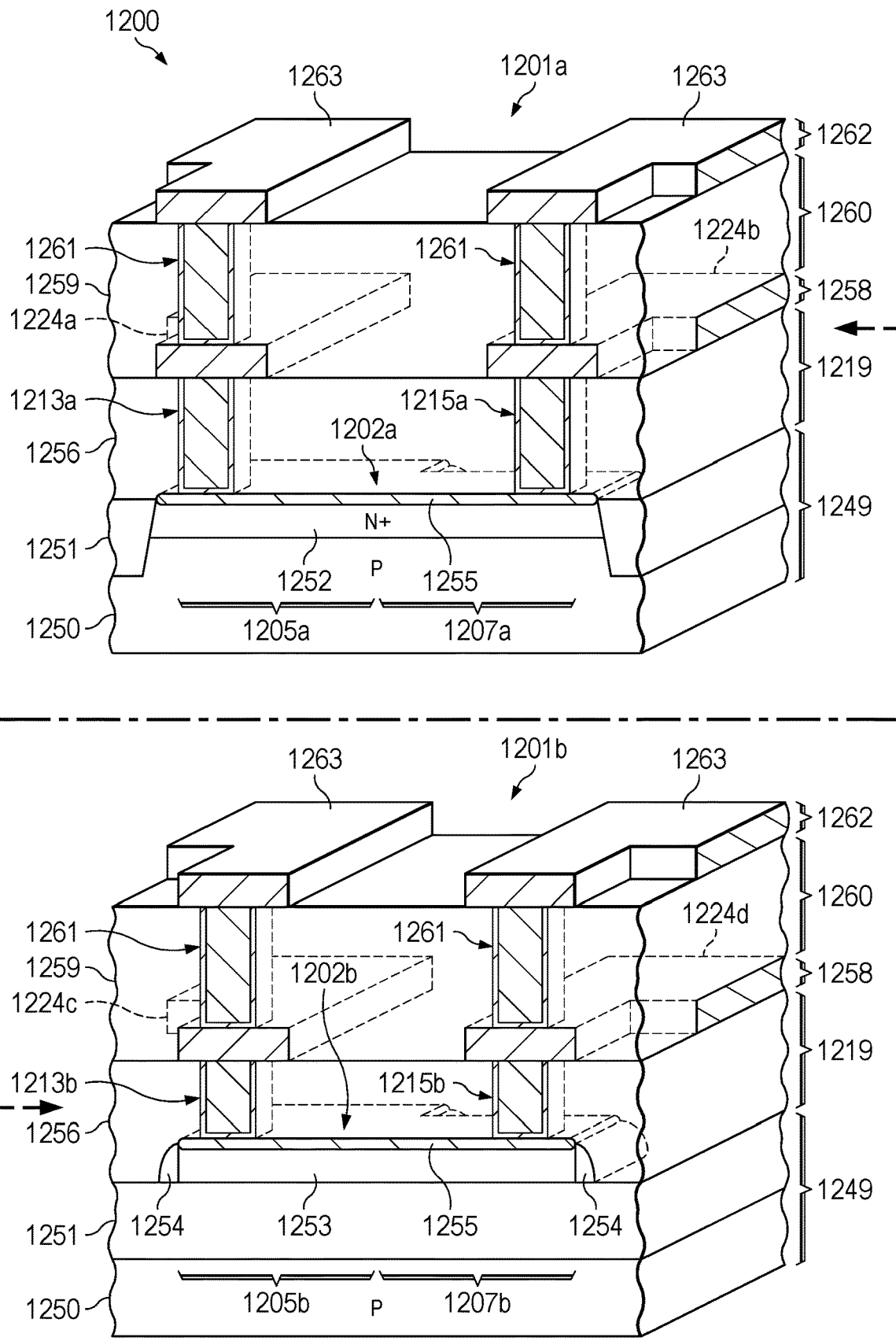

Referring to FIG. 12D, a first interconnect level 1258 is formed on the PMD layer 1256 and the vertical connector level 1219. The first interconnect level 1258 includes a first test terminal 1224a connected to the first wide portion vertical connector 1213a of the first RDAM 1201a and a second test terminal 1224b connected to the first narrow portion vertical connector 1215a of the first RDAM 1201a. The first interconnect level 1258 also includes third and fourth test terminals connected to the vertical connectors on the second resistor. The first interconnect level 1258 further includes a fifth test terminal 1224c connected to the third wide portion vertical connector 1213b of the second RDAM 1201b and a sixth test terminal 1224d connected to the third narrow portion vertical connector 1215b of the second RDAM 1201b. The first interconnect level 1258 also includes seventh and eighth test terminals connected to the vertical connectors on the fourth resistor. Forming the test terminals 1224a through 1224d and the test terminals on the second and fourth resistors enables the first RDAM 1201a and the second RDAM 1201b to be tested after the first interconnect level 1258 is formed, without having to wait for fabrication of the microelectronic device 1200 to be completed.

The first interconnect level 1258 also includes first interconnects, not shown, that provide electrical connections between components of the microelectronic device 1200. The first interconnects of the first interconnect level 1258 are conductive and make electrical connections to the contacts of the vertical connector level 1219. The first interconnects and test terminals of the first interconnect level 1258 may have an etched aluminum structure, with an adhesion layer, not specifically shown, of titanium nitride or titanium tungsten, on the PMD layer 1256, an aluminum layer, not specifically shown, with a few atomic percent of silicon, titanium, or copper, on the adhesion layer, and a barrier layer, not specifically shown, of titanium nitride on the aluminum layer. In another version of this example, the first interconnects and test terminals may have a damascene structure, with a barrier liner of tantalum and tantalum nitride in an interconnect trench in an intra-metal dielectric (IMD) layer, not specifically shown, on the PMD layer 1256, with a copper core metal in the interconnect trench on the barrier liner. Other structures for the first interconnects and test terminals of the first interconnect level 1258 are within the scope of this example Referring to FIG. 12E, an inter-layer dielectric (ILD) layer 1259 may be formed over the first interconnect level 1258. The ILD layer 1259 may include an etch stop layer, not specifically shown, of silicon nitride or silicon carbonitride on the interconnects of the first interconnect level 1258 and the PMD layer 1256. The ILD layer 1259 may also include a planarized layer of silicon dioxide-based dielectric material, not specifically shown, of silicon dioxide, PSG, FSG, BPSG, organosilicate glass (OSG), carbon-doped oxide (CDO), or other low-k dielectric material, on the etch stop layer. The ILD layer 1259 may further include a stop layer of silicon nitride or silicon carbonitride on the planarized layer of silicon dioxide-based dielectric material. The stop layer may provide an etch stop layer for subsequently-formed etch aluminum interconnects, or a chemical mechanical polish (CMP) stop layer for subsequently-formed etch copper damascene interconnects.

A via layer 1260 is formed in the ILD layer 1259. The via layer 1260 includes vias 1261 through the ILD layer 1259, that make electrical connections to the test terminals 1224a through 1224d, as well as additional vias, not shown, that make electrical connections to the test terminals on the second and fourth resistors of the first and second RDAMs 1201a and 1201b and the additional interconnects, not shown, of the first interconnect level 1258. The vertical connectors of the via layer 1260 are commonly referred to as contacts. The vias 1261 may include a liner/barrier of titanium and titanium nitride and a core metal of tungsten. Alternatively, the vias 1261 may include a liner/barrier of tantalum and tantalum nitride and a core metal of copper. Other structures for the vias 1261 are within the scope of this example.

A second interconnect level 1262 is formed on the ILD layer 1259 and the via layer 1260. The second interconnect level 1262 includes upper test terminals 1263 connected to the test terminals 1224a through 1224d and the test terminals on the second and fourth resistors of the first and second RDAMs 1201a and 1201b, through the vias 1261. The second interconnect level 1262 also includes second interconnects, not shown, coupled to components in the microelectronic device 1200. The upper test terminals 1263 and the second interconnects may have an etched aluminum structure, a copper damascene structure, or other structure. In some versions of this example, the via layer 1260 and the second interconnect level 1262 may be formed by a copper dual damascene process, with a common liner of tantalum and tantalum nitride and a common copper core metal in the vias 1261 and the upper test terminals 1263. Forming the upper test terminals 1263 enables the first RDAM 1201a and the second RDAM 1201b to be tested after the second interconnect level 1262 is formed, without having to wait for fabrication of the microelectronic device 1200 to be completed. Additional test terminals may be formed in successive interconnect levels and a bond pad layer, enabling the first RDAM 1201a and the second RDAM 1201b to be tested at various stages of the fabrication process.

The first RDAM 1201a enables estimation of a misalignment distance between members of a conductor level containing the first resistor 1202a and members of the vertical connector level 1219. The second RDAM 1201b enables estimation of a misalignment distance between members of a conductor level containing the third resistor 1202b and members of the vertical connector level 1219.

Figure 13:
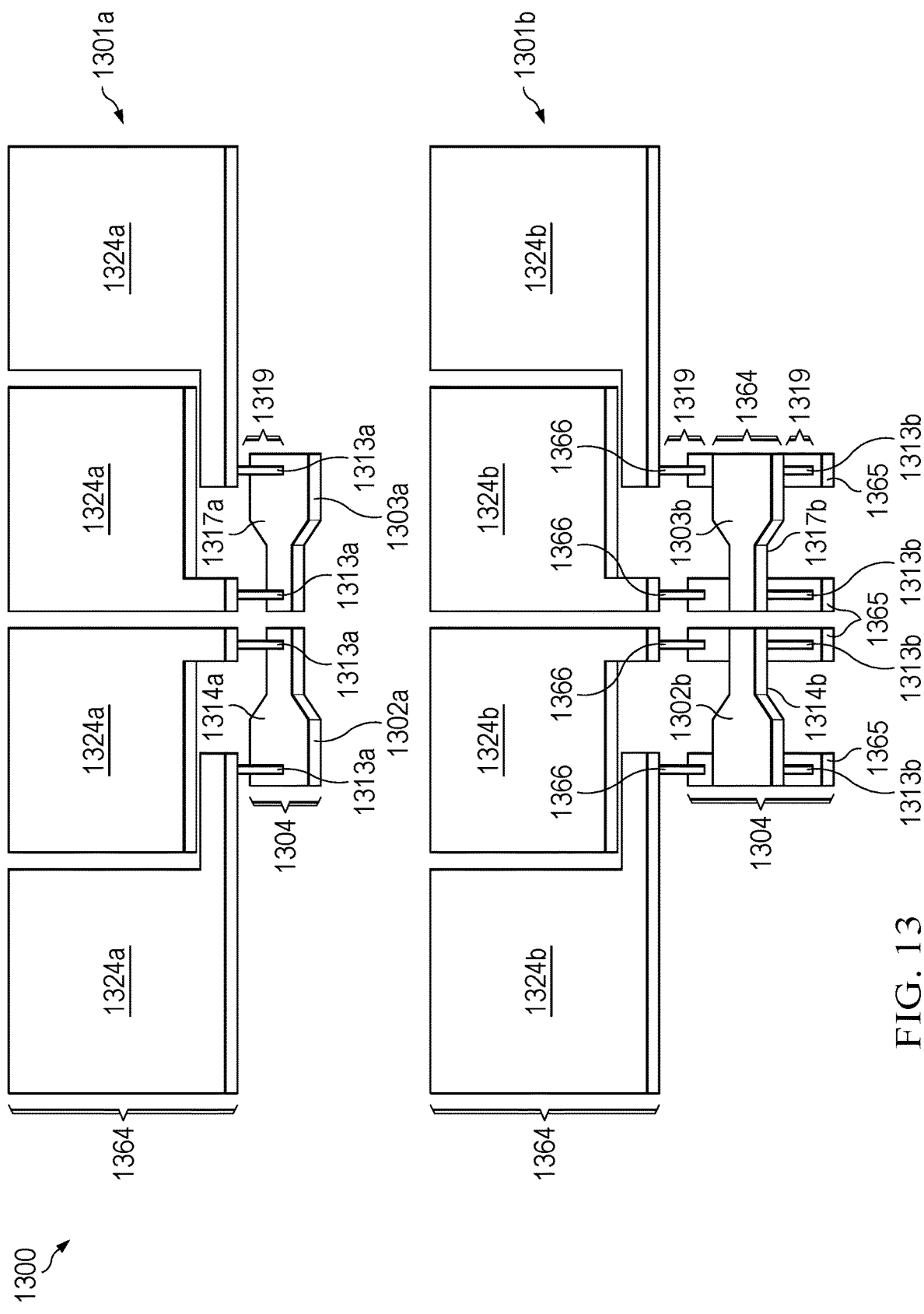
FIG. 13 depicts a microelectronic device having two example RDAMs which may be used to estimate misalignment between members of two successive conductor levels.

FIG. 13 depicts a microelectronic device having two example RDAMs which may be used to estimate misalignment between members of two successive conductor levels. The microelectronic device 1300 includes a first conductor level 1304, a vertical connector level 1319, and a second conductor level 1364. The first conductor level 1304 includes first conductive elements, and may be manifested as any of the examples disclosed in reference to the conductor level 104 of FIG. 1A. The second conductor level 1364 includes second conductive elements, and is successive to the first conductor level 1304, that is, the second conductor level 1364 is formed after the first conductor level 1304. The vertical connector level 1319 includes conductive vertical connectors which extend from the first conductive elements to the second conductive elements.

The first RDAM 1301a includes a first resistor 1302a and a second resistor 1303a, both in the first conductor level 1304. The second resistor 1303a is a duplicate of the first resistor 1302a, reversed in direction. The first resistor 1302a and the second resistor 1303a may have any of the shapes and properties disclosed in reference to the examples of FIG. 1A and FIG. 1B, FIG. 2, and FIG. 6 through FIG. 11. The first RDAM 1301a includes first vertical connectors 1313a of the vertical connector level 1319 on upper faces 1314a and 1317a of the first resistor 1302a and the second resistor 1303a, respectively, as disclosed in reference to the examples of FIG. 1A and FIG. 1B. FIG. 13 shows two instances of the first vertical connectors 1313a on each of the first resistor 1302a and the second resistor 1303a; the first RDAM 1301a may include additional instances of the first vertical connectors 1313a on each of the first resistor 1302a and the second resistor 1303a. The microelectronic device 1300 includes first test terminals 1324a coupled to the first vertical connectors 1313a, as disclosed in reference to FIG. 1A. The first test terminals 1324a may be instances of the second conductive elements of the second conductor level 1364, as indicated in FIG. 13. Alternatively, the first test terminals 1324a may be elements of another conductor level of the microelectronic device 1300. The first RDAM 1301a may be used to estimate a first misalignment distance between the first conductive elements of the first conductor level 1304 and the vertical connectors of the vertical connector level 1319, as disclosed in reference to FIG. 2.

The second RDAM 1301b includes a third resistor 1302b and a fourth resistor 1303b, both in the second conductor level 1364. The fourth resistor 1303b is a duplicate of the third resistor 1302b, reversed in direction. The third resistor 1302b and the fourth resistor 1303b may have any of the shapes and properties disclosed in reference to the examples of FIG. 1A and FIG. 1B, FIG. 2, and FIG. 6 through FIG. 11. The second RDAM 1301b includes second vertical connectors 1313b of the vertical connector level 1319 contacting lower faces 1314b and 1317b of the third resistor 1302b and the fourth resistor 1303b, respectively. FIG. 13 shows two instances of the second vertical connectors 1313b contacting each of the third resistor 1302b and the fourth resistor 1303b; the second RDAM 1301b may include additional instances of the second vertical connectors 1313b contacting each of the third resistor 1302b and the fourth resistor 1303b. The lower faces 1314b and 1317b of the third resistor 1302b and the fourth resistor 1303b are parallel to, but not coplanar with, the upper faces 1314a and 1317a of the first resistor 1302a and the second resistor 1303a. The first vertical connectors 1313a and the second vertical connectors 1313b have upper ends which are coplanar with the lower faces 1314b and 1317b of the third resistor 1302b and the fourth resistor 1303b, and have lower ends which are coplanar with the upper faces 1314a and 1317a of the first resistor 1302a and the second resistor 1303a. In this example, ends of vertical connectors are coplanar with faces of resistors when the ends of the vertical connectors contact the resistors at the faces, recognizing the vertical connectors may extend into the resistors as a result of fabrication processes used to form the vertical connectors and the resistors.

The second RDAM 1301b of this example further includes lateral connectors 1365, which may be members of the first conductor level 1304. The second vertical connectors 1313b contact the lateral connectors 1365. The lateral connectors 1365 extend laterally past the third resistor 1302b and the fourth resistor 1303b. The second RDAM 1301b of this example also includes third vertical connectors 1366 of the vertical connector level 1319 that contact the lateral connectors 1365. The microelectronic device 1300 includes second test terminals 1324b coupled to the third vertical connectors 1366, so that the second test terminals 1324b are coupled to the third resistor 1302b and the fourth resistor 1303b through the second vertical connectors 1313b, the lateral connectors 1365, and the third vertical connectors 1366. The second test terminals 1324b may be instances of the second conductive elements of the second conductor level 1364, as indicated in FIG. 13. Alternatively, the second test terminals 1324b may be elements of another conductor level of the microelectronic device 1300. The second RDAM 1301b may be used to estimate a second misalignment distance between the second conductive elements of the second conductor level 1364 and the vertical connectors of the vertical connector level 1319. The estimate of the first misalignment distance and the estimate of the second misalignment distance may be combined to provide an estimate of misalignment between the second conductive elements of the second conductor level 1364 and the first conductive elements of the first conductor level 1304, which may be useful with regard to components that include instances of both the second conductor level 1364 and the first conductor level 1304, such as capacitors and inductors in an interconnect region of the microelectronic device 1300.

Figure 14A:
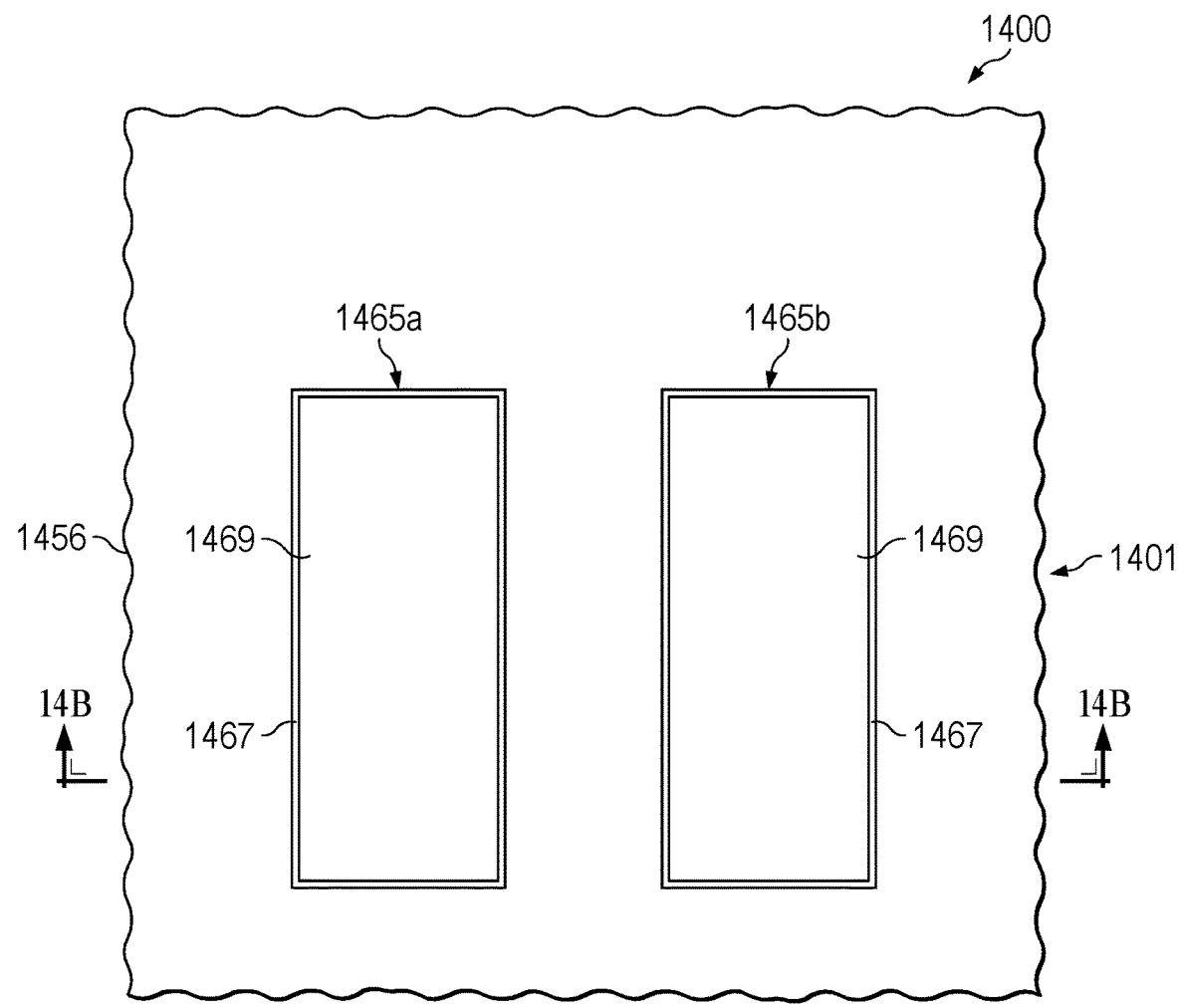
FIG. 14A through FIG. 14H are top views and cross sections of a microelectronic device with an RDAM for estimating a misalignment distance between vias and interconnects of a copper dual damascene structure, depicted in stages of an example method of formation.
Figure 14B:
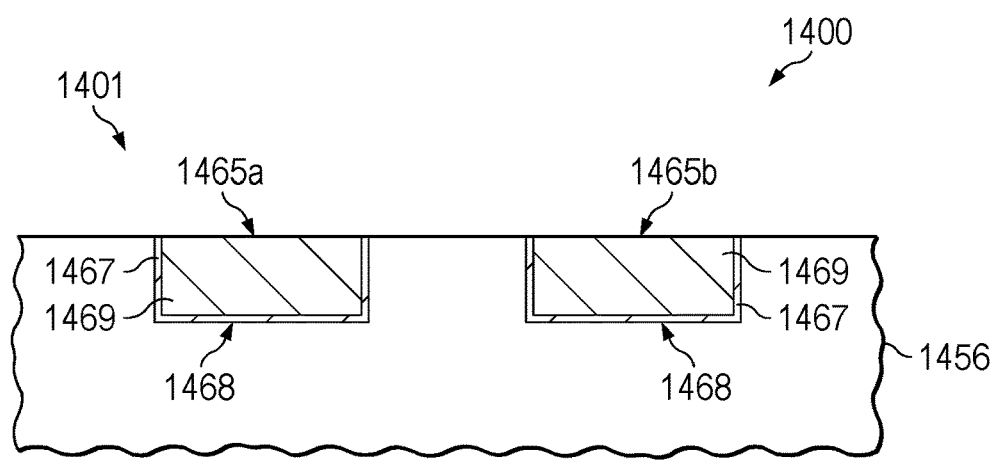

FIG. 14A through FIG. 14H are top views and cross sections of a microelectronic device with an RDAM for estimating a misalignment distance between vias and interconnects of a copper dual damascene structure, depicted in stages of an example method of formation. Referring to FIG. 14A, a top view, and FIG. 14B, a cross section, the microelectronic device 1400 includes a first dielectric layer 1456. By way of example, the first dielectric layer 1456 may be manifested as a PMD layer or an ILD layer of the microelectronic device 1400.

A first lateral connector 1465a and a second lateral connector 1465b of the RDAM 1401 are formed in or on the first dielectric layer 1456. The lateral connectors 1465a and 1465b may have a damascene structure, and may include a first barrier liner 1467 of tantalum and tantalum nitride in interconnect trenches 1468 in the first dielectric layer 1456, with a first copper core metal 1469 in the interconnect trenches 1468 on the first barrier liner 1467. Other structures for the lateral connectors 1465a and 1465b, such as etched aluminum structures, are within the scope of this example. The lateral connectors 1465a and 1465b are formed concurrently with other lateral conductors, such as interconnects, of the microelectronic device 1400.

Figure 14C:
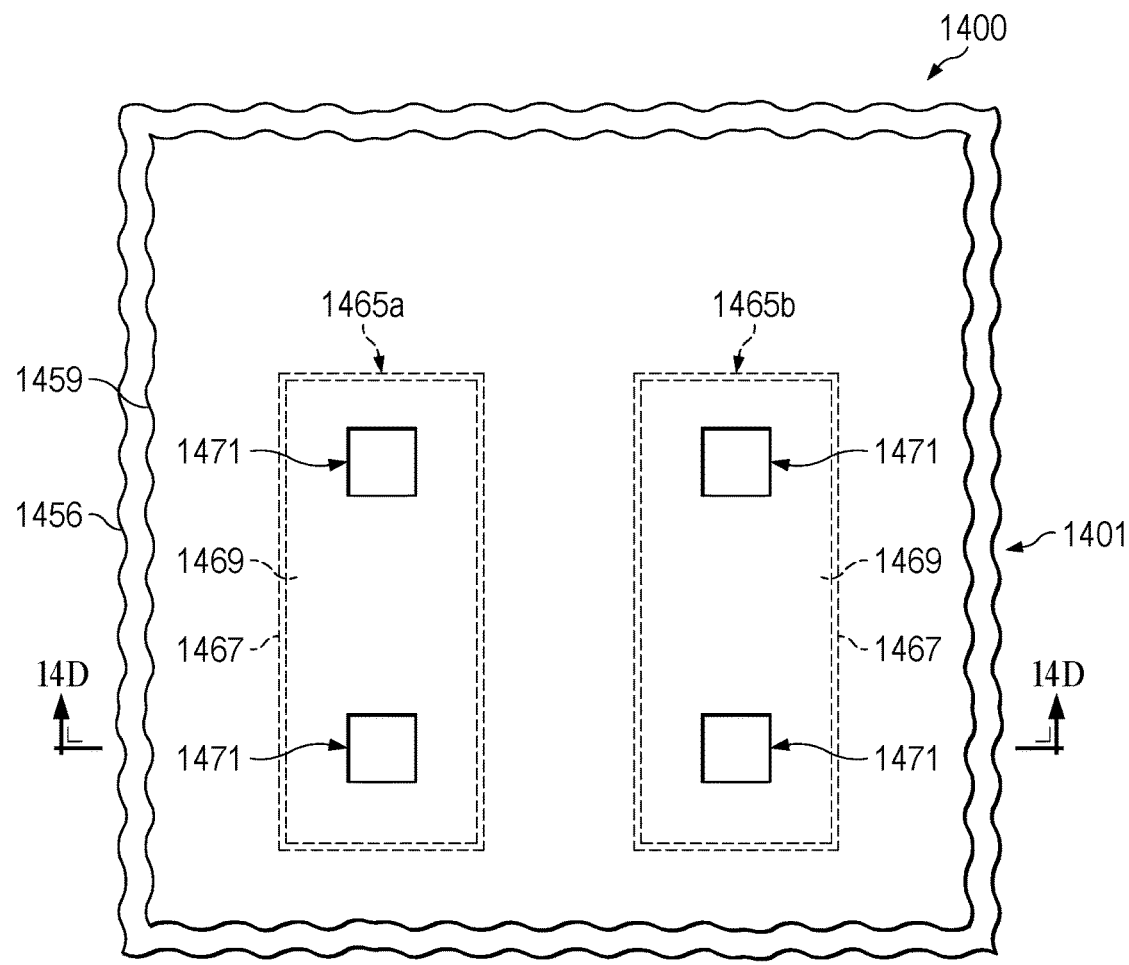
Figure 14D:
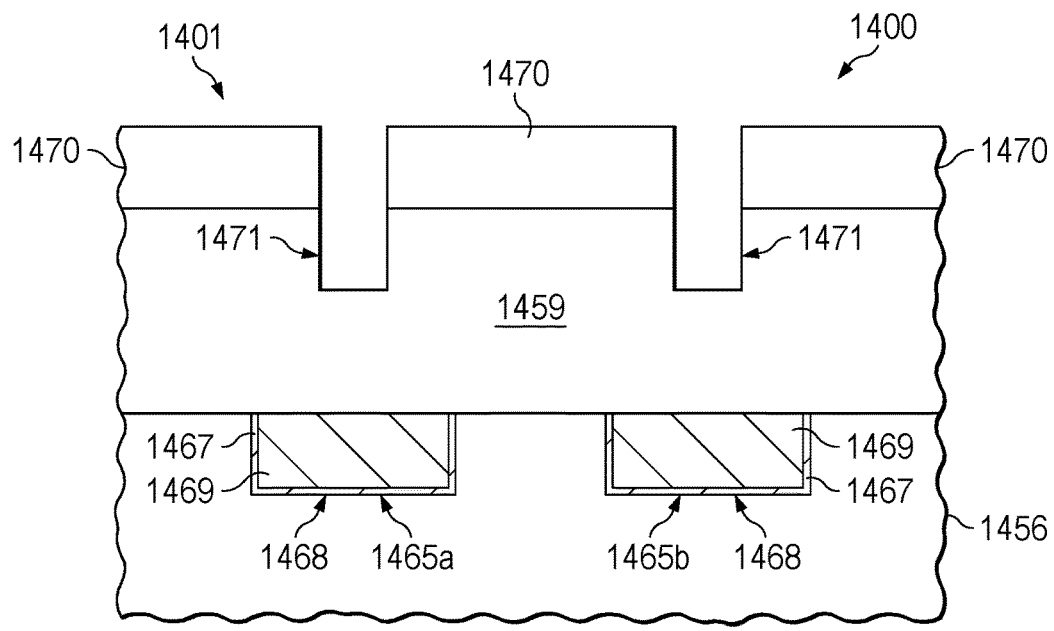

Referring to FIG. 14C, a top view, and FIG. 14D, a cross section, a second dielectric layer 1459 is formed over the first dielectric layer 1456 and the lateral connectors 1465a and 1465b. The second dielectric layer 1459 may be manifested as an ILD layer of the microelectronic device 1400.

A via etch mask 1470 is formed over the second dielectric layer 1459, exposing the second dielectric layer 1459 in areas over the lateral connectors 1465a and 1465b for a first vertical connector 1413, a second vertical connector 1415, a first test terminal connector 1466a, and a second test terminal connector 1466b of the RDAM 1401, as well as vias, not shown, of the microelectronic device 1400. The vertical connectors 1413 and 1415 and the test terminal connectors 1466a and 1466b are shown in FIG. 14G and FIG. 14H. The via etch mask 1470 may include photoresist and may be formed by a photolithographic process. The via etch mask 1470 may include anti-reflection material such as bottom anti-reflection coat (BARC), and may include hard mask material such as amorphous carbon.

A partial via etch process is performed which removes dielectric material from the second dielectric layer 1459 where exposed by the via etch mask 1470, to form via holes 1471 in the second dielectric layer 1459 for the vertical connectors 1413 and 1415 and the test terminal connectors 1466a and 1466b, as well as the vias of the microelectronic device 1400. The via holes 1471 extend partway to the lateral connectors 1465a and 1465b. The partial via etch process may be implemented as a timed reactive ion etch (RIE) process using fluorine radicals.

After the partial via etch process is completed, the via etch mask 1470 is removed. Organic material and amorphous carbon in the via etch mask 1470 may be removed by an oxygen plasma process, followed by a wet clean process, by way of example.

Figure 14E:
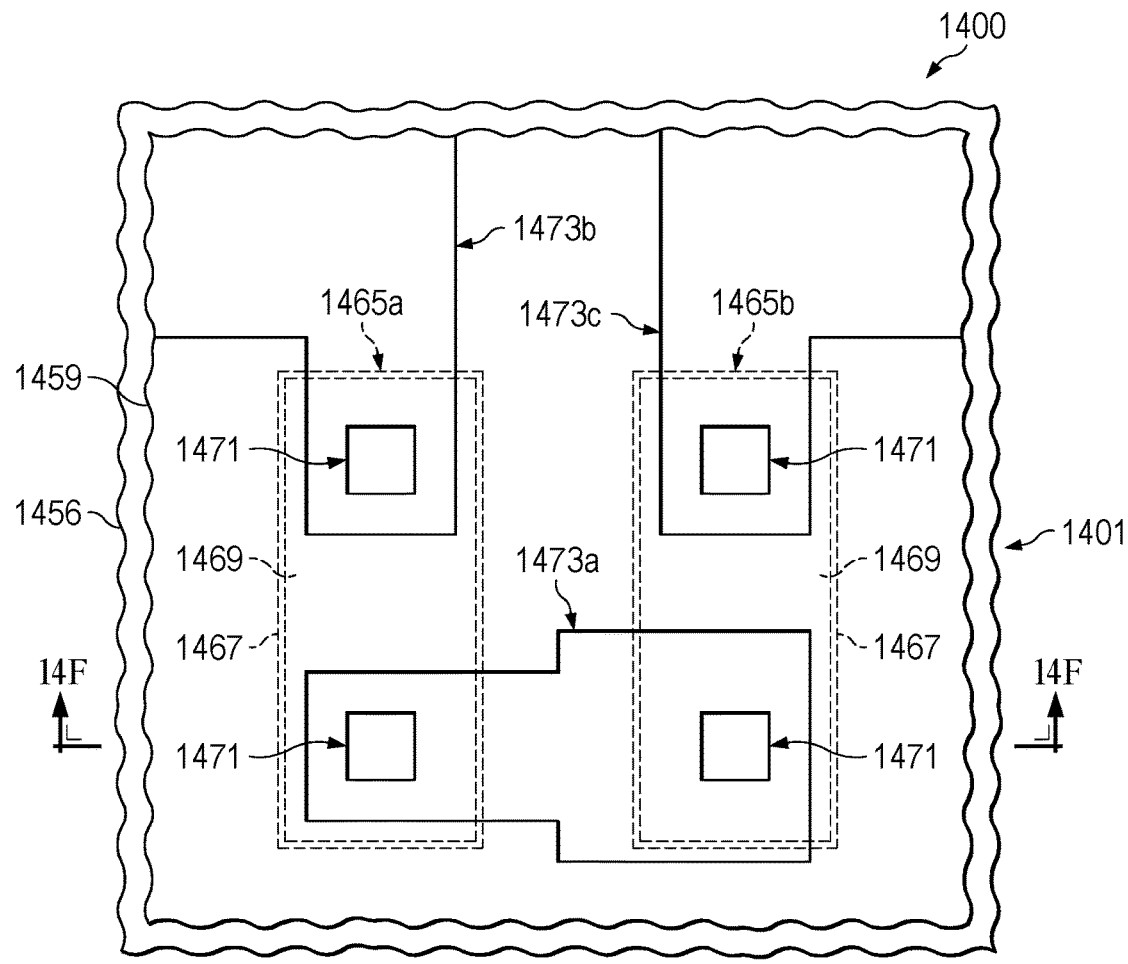
Figure 14F:
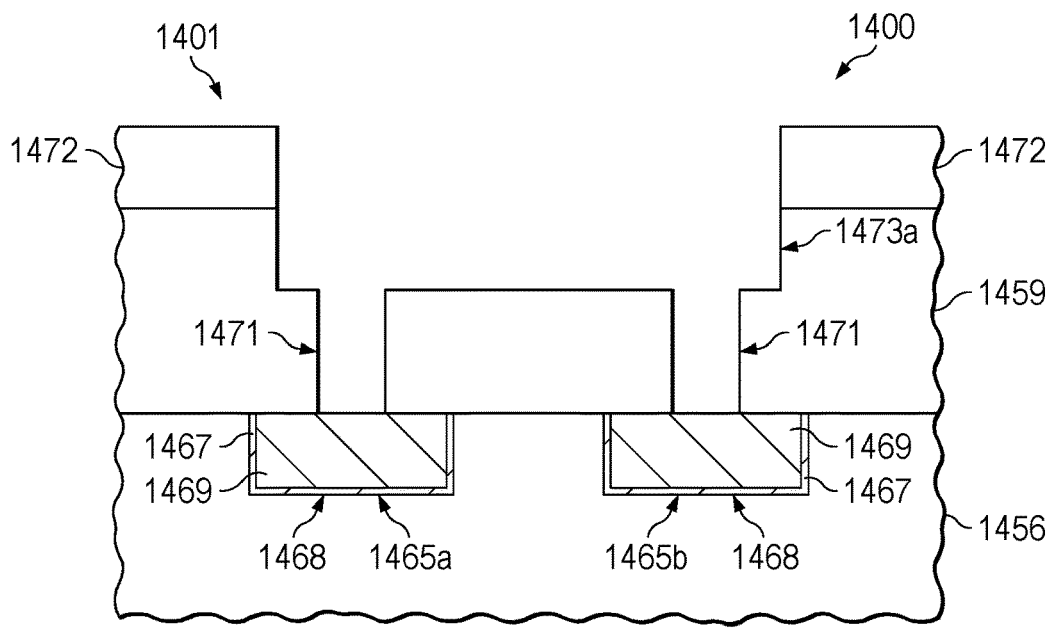
Figure 14G:
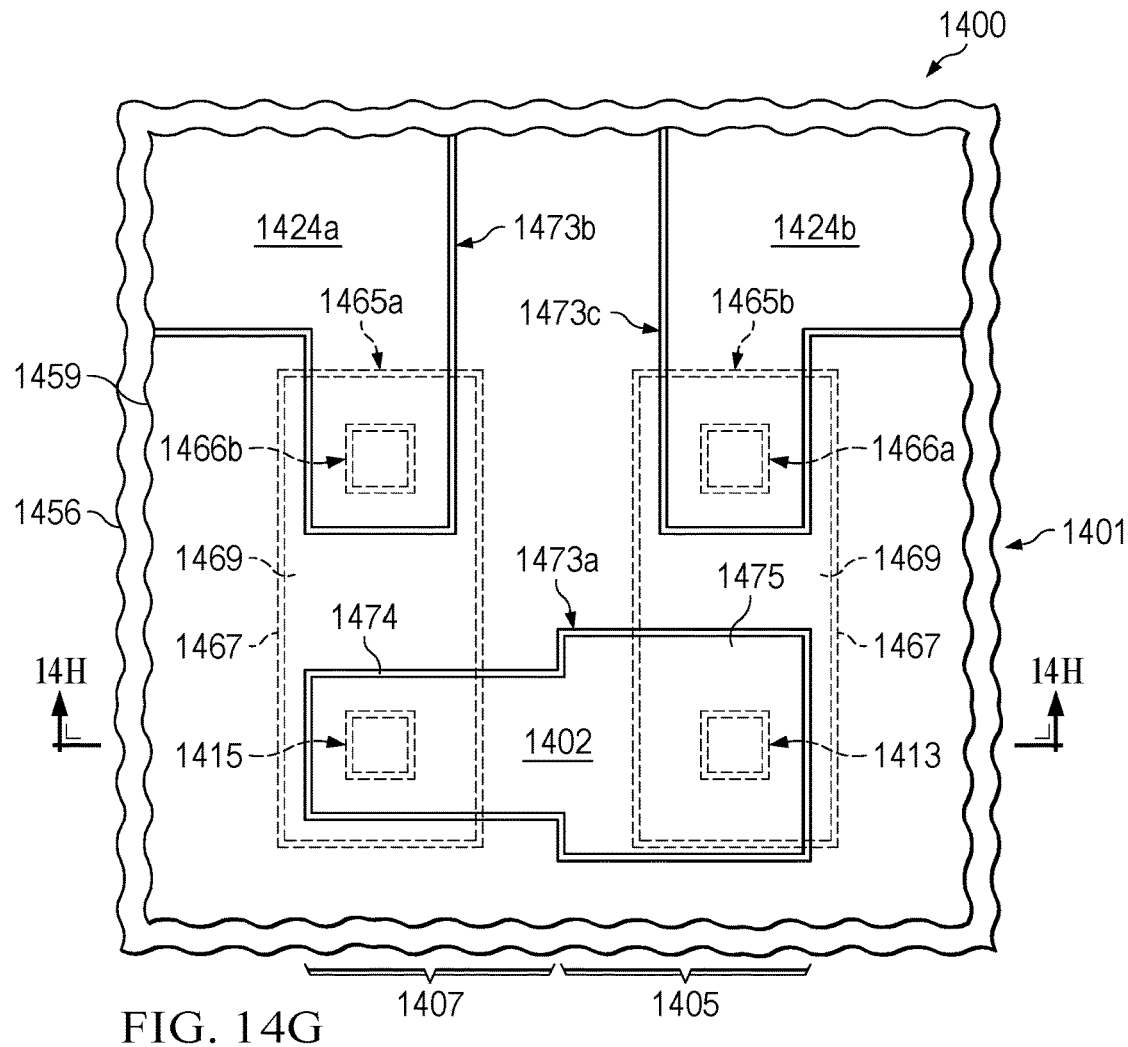
Figure 14H:
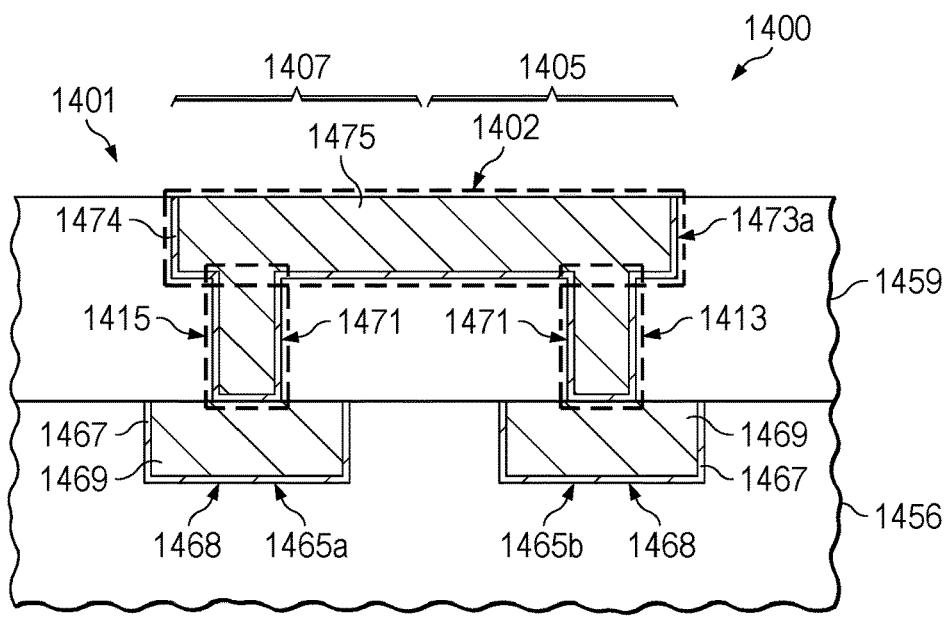

Referring to FIG. 14E, a top view, and FIG. 14F, a cross section, a trench etch mask 1472 is formed over the second dielectric layer 1459, exposing the second dielectric layer 1459 in an area over the lateral connectors 1465a and 1465b for a first resistor 1402, a first test terminal 1424a, and a second test terminal 1424b of the RDAM 1401, as well as interconnects, not shown, of the microelectronic device 1400. The first resistor 1402 and the test terminals 1424a and 1424b are shown in FIG. 14G and FIG. 14H. The trench etch mask 1472 may include photoresist, formed by a photolithographic process, and may include anti-reflection material and hard mask material.

A trench etch process is performed which removes dielectric material from the second dielectric layer 1459 where exposed by the trench etch mask 1472, to form a resistor trench 1473a, a first test terminal trench 1473b, and a second test terminal trench 1473c in the second dielectric layer 1459 for the first resistor 1402, the first test terminal 1424a, and the second test terminal 1424b, respectively, shown in FIG. 14G and FIG. 14H, and to form interconnect trenches, not shown, for the interconnects of the microelectronic device 1400. The trenches 1473a, 1473b, and 1473c extend partway to the lateral connectors 1465a and 1465b and the first dielectric layer 1456.

The trench etch process also removes additional dielectric material from the second dielectric layer 1459 under the via holes 1471, so that the via holes 1471 extend to the lateral connectors 1465a and 1465b when the trench etch process is completed. The trench etch process may include an etch stop removal operation to clear an etch stop layer in the second dielectric layer 1459. The trench etch process may be implemented as a timed RIE process using fluorine radicals. After the trench etch process is completed, the trench etch mask 1472 is removed.

Referring to FIG. 14G, a top view, and FIG. 14H, a cross section, a second barrier liner 1474 is formed in the trenches 1473a, 1473b, and 1473c and the via holes 1471. The second barrier liner 1474 may include tantalum and tantalum nitride, and may be formed by sputtering tantalum onto the second dielectric layer 1459, and onto the lateral connectors 1465a and 1465b where exposed by the via holes 1471, followed by forming tantalum nitride by an atomic layer deposition (ALD) process on the tantalum. The second barrier liner 1474 extends onto a top surface of the second dielectric layer 1459.

A second copper core metal 1475 is formed on the second barrier liner 1474, filling the trenches 1473a, 1473b, and 1473c and the via holes 1471, and extending over the top surface of the second dielectric layer 1459. The second copper core metal 1475 may be formed by sputtering a seed layer of copper on the second barrier liner 1474, followed by electroplating copper on the seed layer. Additives such as inhibitors and levelers may be added to a plating bath used for electroplating the copper, to reduce voids in the via holes 1471 and to reduce an amount of the copper 1475 extending over the top surface of the second dielectric layer 1459. Subsequently, the second copper core metal 1475 and the second barrier liner 1474 over the top surface of the second dielectric layer 1459, outside of the trenches 1473a, 1473b, and 1473c, are removed by a copper CMP process, leaving the second copper core metal 1475 and the second barrier liner 1474 in the trenches 1473a, 1473b, and 1473c and the via holes 1471, to provide the first resistor 1402, the first test terminal 1424a, the second test terminal 1424b, the first vertical connector 1413, the second vertical connector 1415, the first test terminal connector 1466a, and the second test terminal connector 1466b. The first resistor 1402, with the first vertical connector 1413 and the second vertical connector 1415 are referred to as a copper dual damascene structure. The first resistor 1402 has a first wide portion 1405 and a first narrow portion 1407. The first vertical connector 1413 contacts the first resistor 1402 in the first wide portion 1405, and the second vertical connector 1415 contacts the first resistor 1402 in the first narrow portion 1407.

The test terminals 1424a and 1424b are coupled to the first resistor 1402 through the test terminal connectors 1466a and 1466b, the lateral connectors 1465a and 1465b, the vertical connectors 1413 and 1415. Concurrently with these conductive elements, additional lateral connectors, a second resistor, additional vertical connectors, additional test terminals, and additional test terminal connectors, not shown, are formed as part of the RDAM 1401. The second resistor is a duplicate of the first resistor 1402, reversed in direction. The RDAM 1401 may be used to estimate a misalignment distance between an interconnect the first resistor 1402 and the vertical connectors 1413 and 1415.

Figure 15A:
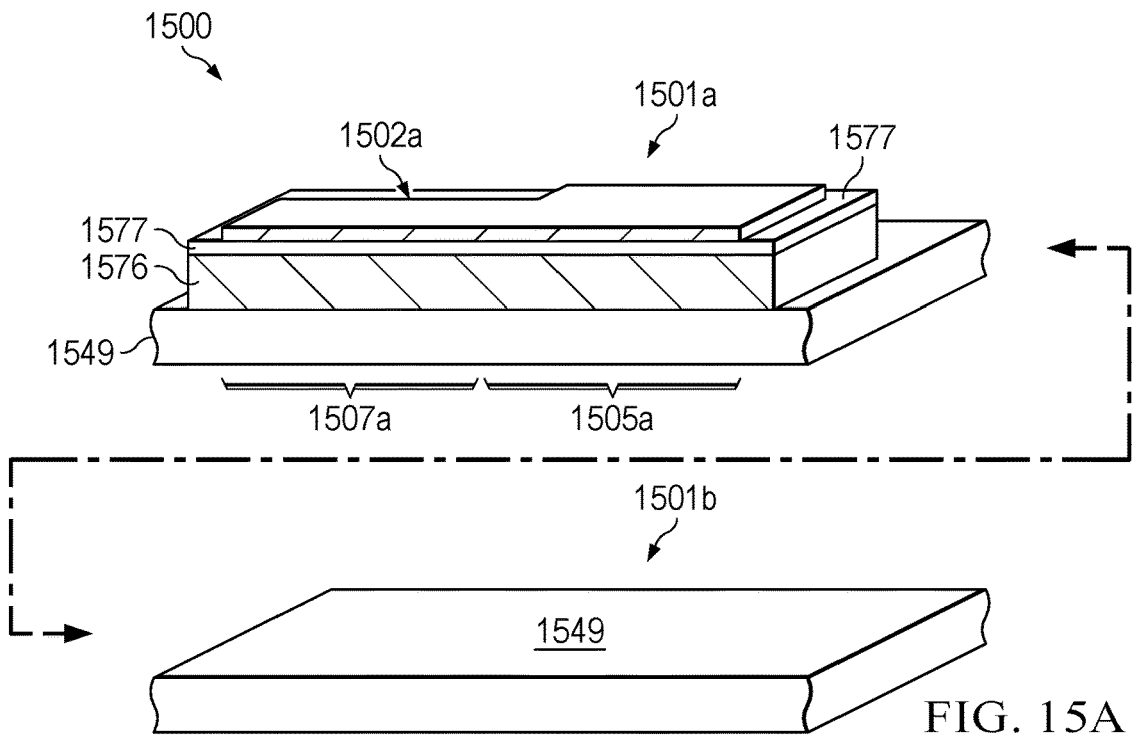
FIG. 15A through FIG. 15D are cross sections of a microelectronic device that includes two additional example RDAMs involving a resistor and a capacitor, depicted in stages of an example method of formation.

FIG. 15A through FIG. 15D are cross sections of a microelectronic device that includes two additional example RDAMs involving a resistor and a capacitor, depicted in stages of an example method of formation. Referring to FIG. 15A, the microelectronic device 1500 may be manifested as any of the microelectronic device types disclosed in reference to the microelectronic device 100 of FIG. 1A and FIG. 1B. The microelectronic device 1500 of this example is formed in and on a substrate 1549. The substrate 1549 includes a first area for a first RDAM 1501a and a second area for a second RDAM 1501b. In some versions of this example, the substrate 1549 may be implemented as a dielectric layer, such as a PMD layer or an ILD layer, in the first area for a first RDAM 1501a and in the second area for a second RDAM 1501b. In other versions of this example, the substrate 1549 may be implemented as a semiconductor material or a dielectric material in the first area for a first RDAM 1501a, and may be implemented as the same material or a different semiconductor material or a dielectric material in the second area for a second RDAM 1501b.

In the first area for a first RDAM 1501a, a lower conductor 1576 is formed over the substrate 1549, and a capacitor dielectric layer 1577 is formed over the lower conductor 1576. A first upper plate resistor 1502a of the first RDAM 1501a is formed over the capacitor dielectric layer 1577. The lower conductor 1576 may be an element of a first interconnect level of the microelectronic device 1500. The capacitor dielectric layer 1577 may be part of an anti-reflection layer used to pattern the first interconnect level, including the lower conductor 1576. The first upper plate resistor 1502a may be an element of an upper capacitor plate level of the microelectronic device 1500. The lower conductor 1576, the capacitor dielectric layer 1577, and the first upper plate resistor 1502a may be formed by a process sequence that includes forming an interconnect metal layer for the first interconnect level on the substrate 1549. The interconnect metal layer may include an adhesion layer, not specifically shown, of titanium nitride or titanium tungsten, on the substrate 1549, an aluminum layer, not specifically shown, with a few atomic percent of silicon, titanium, or copper, on the adhesion layer, and a barrier layer, not specifically shown, of titanium nitride on the aluminum layer, similar to the first interconnect level 1258 disclosed in reference to FIG. 12D. The process sequence is continued by forming an anti-reflection layer over the interconnect metal layer, before the interconnect metal layer is patterned. The anti-reflection layer may include a lower sub-layer, not specifically shown, of silicon dioxide immediately over the interconnect metal layer, a middle sub-layer, not specifically shown, of silicon nitride over the lower sub-layer, and an upper sub-layer, not specifically shown, of silicon dioxide over the middle sub-layer. The process sequence is continued by forming a capacitor upper plate layer over the anti-reflection layer, before the interconnect metal layer is patterned. The capacitor upper plate layer may include an adhesion sub-layer of titanium and a main sub-layer of titanium nitride. The capacitor upper plate layer is then patterned to form the first upper plate resistor 1502a concurrently with upper plates of capacitors of the microelectronic device 1500, by an RIE process using halogen radicals. Patterning of the capacitor upper plate layer is performed so as to leave a sufficient thickness of the anti-reflection layer over the interconnect metal layer to provide an anti-reflection functionality. The interconnect metal layer is patterned, using a photolithographic process that is facilitated by the anti-reflection layer, and an RIE process using chlorine radicals, to form the lower conductor 1576, lower capacitor plates for the capacitors, and interconnects of the first interconnect level. The anti-reflection layer may be left over the lower conductor 1576, lower capacitor plates, and interconnects, as indicated in FIG. 15A.

The first upper plate resistor 1502a includes a first wide portion 1505a and a first narrow portion 1507a. The first upper plate resistor 1502a may have any of the configurations disclosed in reference to FIG. 6 through FIG. 11. A second upper plate resistor, not shown, of the first RDAM 1501a is formed concurrently with the first upper plate resistor 1502a. The second upper plate resistor is a duplicate of the first upper plate resistor 1502a, reversed in direction.

In this example, the second area for a second RDAM 1501b may be left free of the interconnect metal layer, the anti-reflection layer, and the capacitor upper plate layer. Alternatively, one or more interconnects of the first interconnect level, with accompanying overlayers of the anti-reflection layer, may be formed in the second area for a second RDAM 1501b.

Figure 15B:
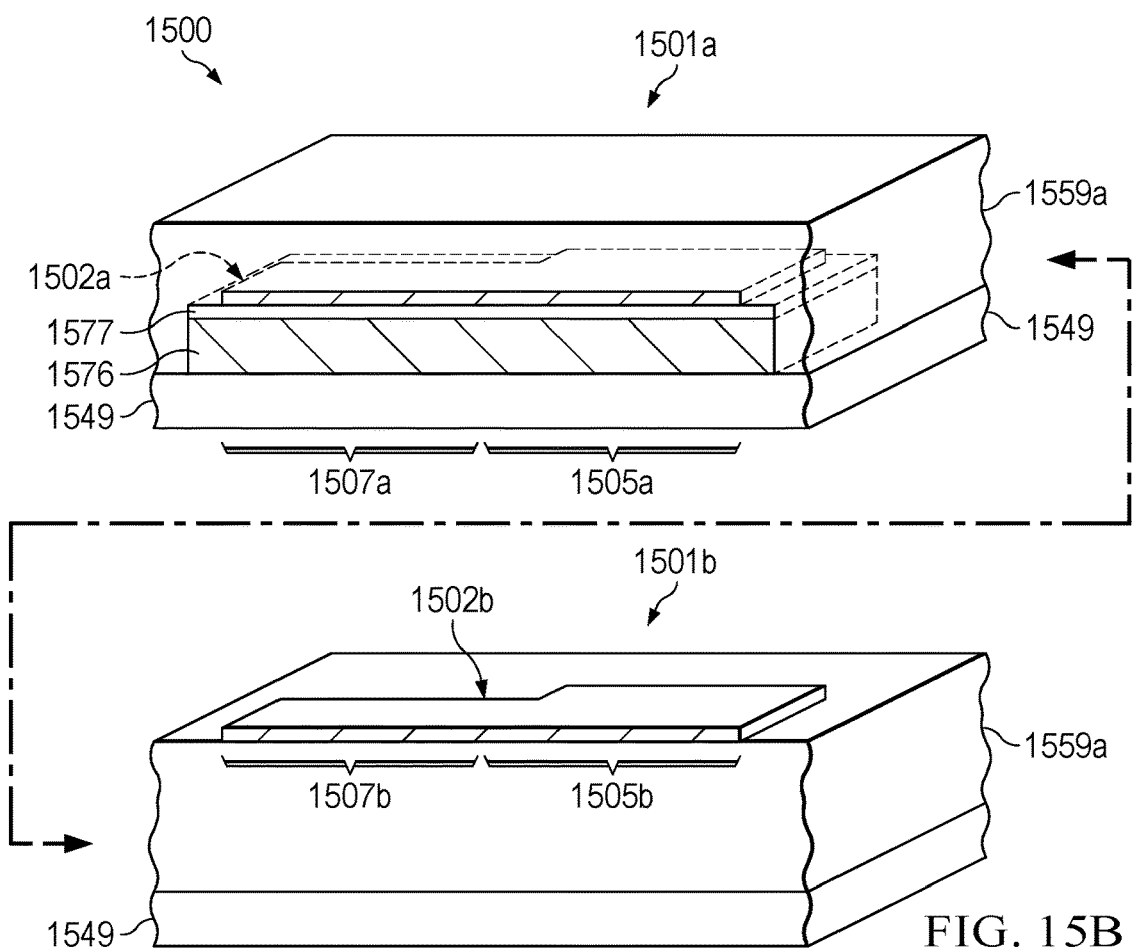

Referring to FIG. 15B, a first ILD sub-layer 1559a is formed over the existing microelectronic device 1500. The first ILD sub-layer 1559a may include an etch stop layer, not specifically shown, of silicon nitride and a planarized main layer, not specifically shown, of a silicon dioxide-based dielectric material on the etch stop layer. The first ILD sub-layer 1559a may include a cap layer, not specifically shown, of silicon nitride, over the planarized main layer.

A first thin film resistor 1502b of the second RDAM 1501b is formed over the first ILD sub-layer 1559a. The first thin film resistor 1502b may be part of a resistor level that includes additional thin film resistors used in circuits of the microelectronic device 1500. By way of example, the first thin film resistor 1502b may include alloys of nickel, chromium, titanium, tantalum, molybdenum, silicon, and any metals of the platinum group (ruthenium, rhodium, palladium, osmium, iridium, and platinum). The first thin film resistor 1502b may include other elements, such as aluminum, copper, oxygen, nitrogen, or carbon, to impart desired properties to the first thin film resistor 1502b. Other compositions for the first thin film resistor 1502b are within the scope of this example.

The first thin film resistor 1502b includes a second wide portion 1505b and a second narrow portion 1507b. The first thin film resistor 1502b may have any of the configurations disclosed in reference to FIG. 6 through FIG. 11. A second thin film resistor, not shown, of the second RDAM 1501b is formed concurrently with the first thin film resistor 1502b. The second thin film resistor is a duplicate of the first thin film resistor 1502b, reversed in direction.

Figure 15C:
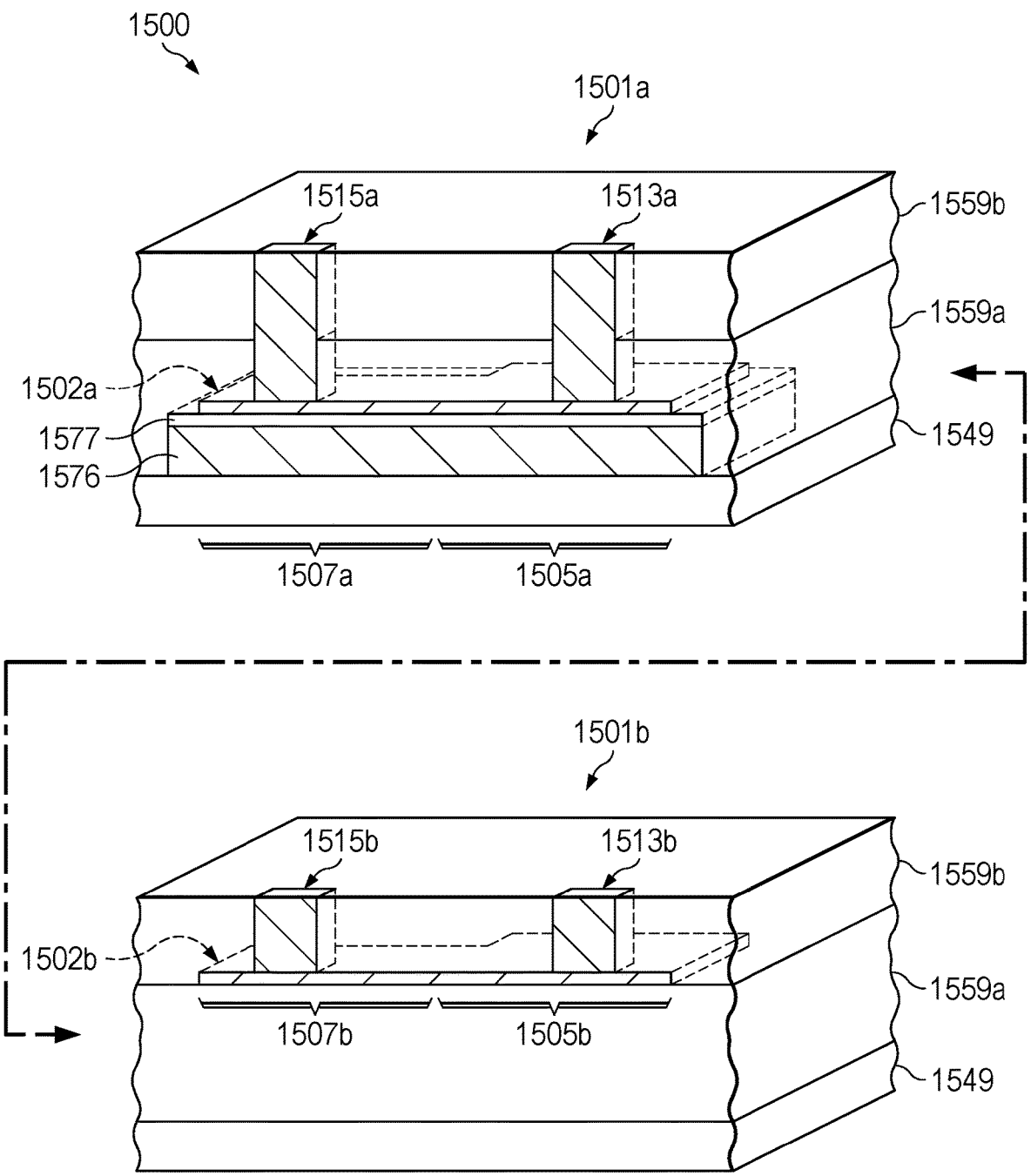

Referring to FIG. 15C, a second ILD sub-layer 1559b is formed over the existing microelectronic device 1500. The second ILD sub-layer 1559b may include an etch stop layer, not specifically shown, of silicon nitride and a planarized main layer, not specifically shown, of a silicon dioxide-based dielectric material on the etch stop layer. The second ILD sub-layer 1559b may include a CMP stop layer, not specifically shown, of silicon nitride or silicon carbonitride, over the planarized main layer.

A first deep vertical connector 1513a and a second deep vertical connector 1515a are formed through the second ILD sub-layer 1559b and the first ILD sub-layer 1559a to make contact to the first upper plate resistor 1502a in the first wide portion 1505a and the first narrow portion 1507a, respectively. Concurrently, a third deep vertical connector, not shown, and a fourth deep vertical connector, not shown, are formed through the second ILD sub-layer 1559b and the first ILD sub-layer 1559a to make contact to the second upper plate resistor.

A first shallow vertical connector 1513b and a second shallow vertical connector 1515b are formed through the second ILD sub-layer 1559b to make contact to the first thin film resistor 1502b in the second wide portion 1505b and the second narrow portion 1507b, respectively. Concurrently, a third shallow vertical connector, not shown, and a fourth shallow vertical connector, not shown, are formed through the second ILD sub-layer 1559b to make contact to the second thin film resistor.

The shallow vertical connectors 1513b and 1515b may be formed concurrently with the deep vertical connectors 1513a and 1515a, or may be formed separately. The deep vertical connectors 1513a and 1515a may be part of a deep via level of the microelectronic device 1500, and may be formed by any of the processes disclosed in reference to vias herein. Similarly, the shallow vertical connectors 1513b and 1515b may be part of a shallow via level of the microelectronic device 1500, and may be formed by any of the processes disclosed in reference to vias herein.

Figure 15D:
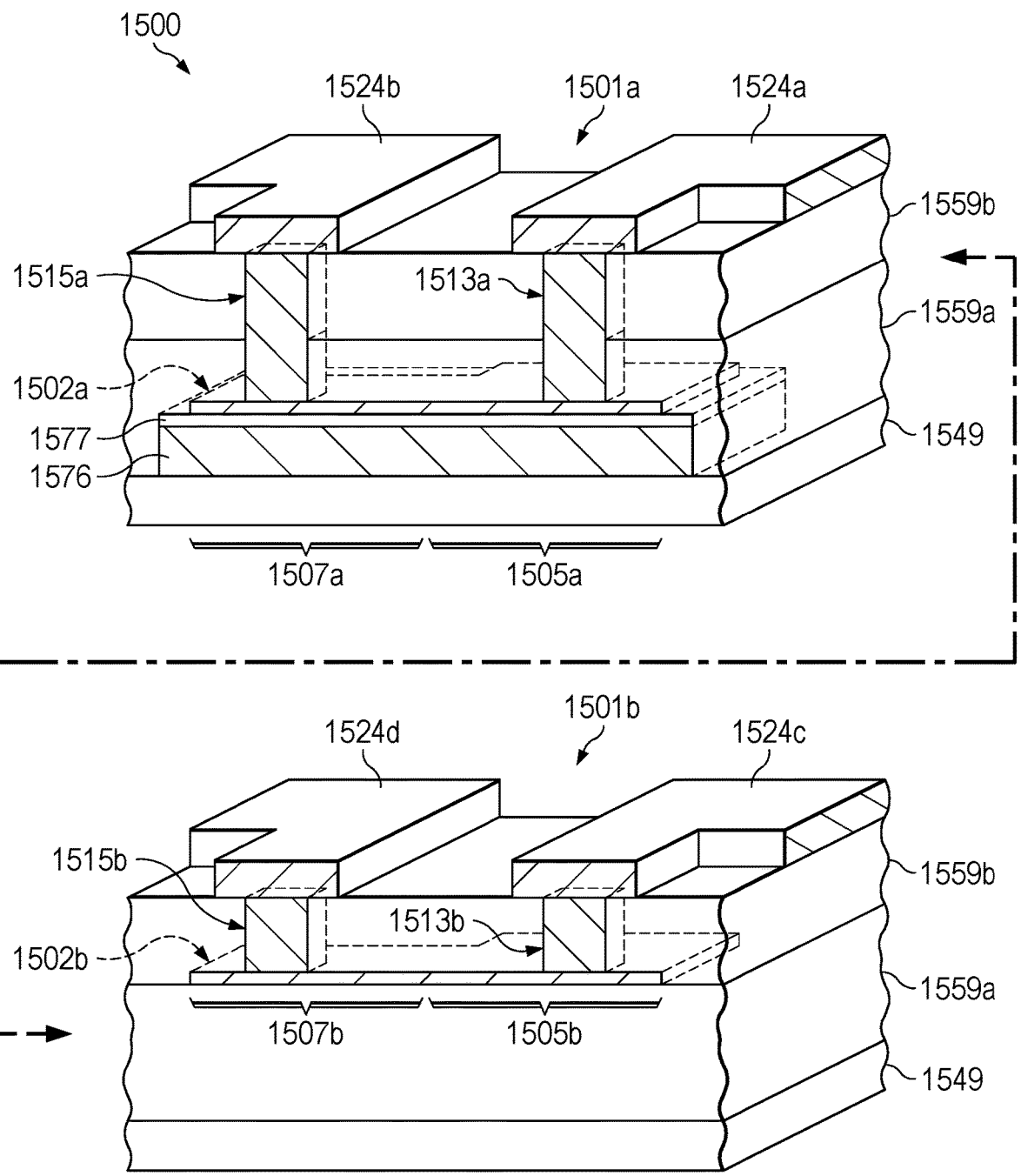

Referring to FIG. 15D, a first wide portion test terminal 1524a is formed on the second ILD sub-layer 1559b to make contact to the first deep vertical connector 1513a, and a first narrow portion test terminal 1524b is formed on the second ILD sub-layer 1559b to make contact to the second deep vertical connector 1515a. A second wide portion test terminal 1524c is formed on the second ILD sub-layer 1559b to make contact to the first shallow vertical connector 1513b, and a second narrow portion test terminal 1524d is formed on the second ILD sub-layer 1559b to make contact to the second shallow vertical connector 1515b. Additional test terminals are formed on the second ILD sub-layer 1559b to make contact to the vertical connectors on the second upper plate resistor and the second thin film resistor. The test terminals 1524a through 1524d and the additional test terminals may be part of an interconnect level of the microelectronic device 1500. The test terminals 1524a through 1524d may have an etched aluminum structure or may have a copper damascene structure. Other structures for the test terminals 1524a through 1524d are within the scope of this example.

The first RDAM 1501a enables estimation of a first misalignment distance between members of the deep via level with respect to members of the upper capacitor plate level of the microelectronic device 1500. The second RDAM 1501b enables estimation of a second misalignment distance between members of the shallow via level with respect to members of the thin film resistive level of the microelectronic device 1500.

Figure 16A:
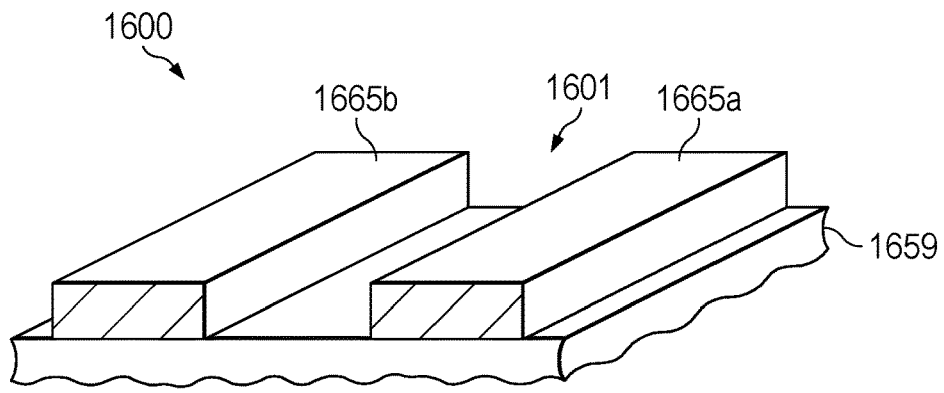
FIG. 16A through FIG. 16C are cross sections of a microelectronic device with an example RDAM involving bond pads, depicted in stages of an example method of formation.
Figure 16B:
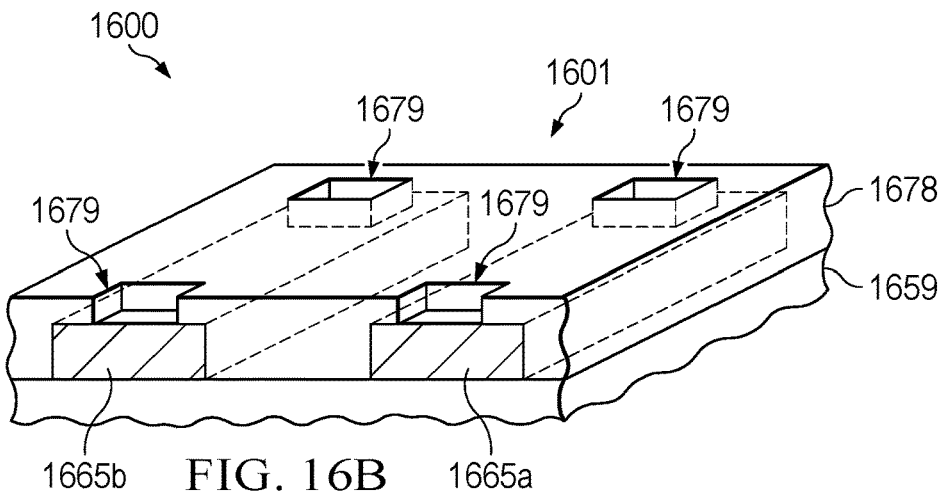
Figure 16C:
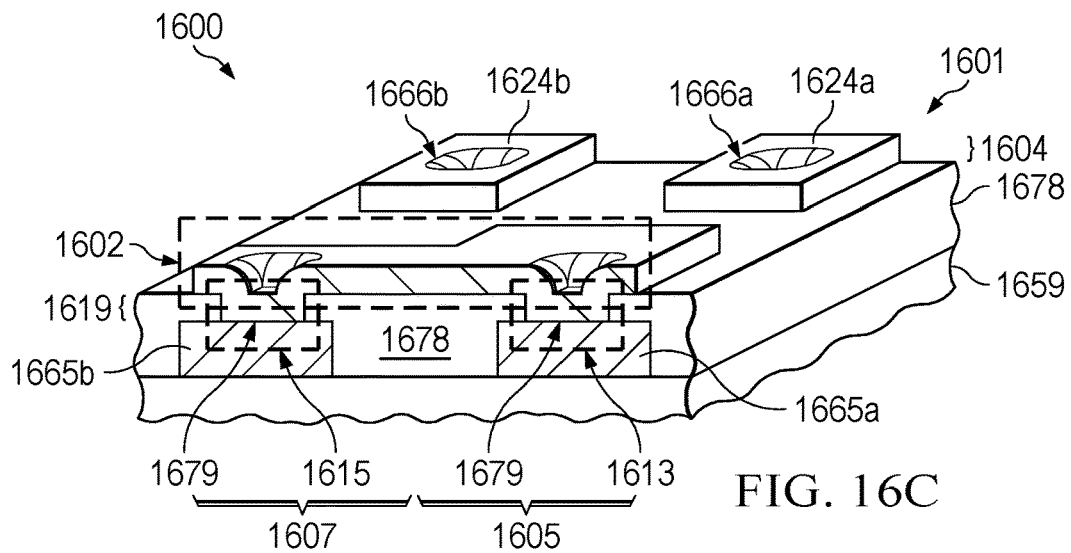

FIG. 16A through FIG. 16C are cross sections of a microelectronic device with an example RDAM involving bond pads, depicted in stages of an example method of formation. Referring to FIG. 16A, the microelectronic device 1600 may be manifested as any of the microelectronic device types disclosed in reference to the microelectronic device 100 of FIG. 1A and FIG. 1B. The microelectronic device 1600 of this example includes a top dielectric layer 1659. In one version of this example, the top dielectric layer 1659 may be implemented as an ILD layer, and may have the structure and composition disclosed in reference to the ILD layer 1259 of FIG. 12E, for example. In another version of this example, the top dielectric layer 1659 may be implemented as a cap layer over a top interconnect level, and may include silicon dioxide, silicon nitride, silicon oxynitride, or polyimide, by way of example. Other compositions and structures for the top dielectric layer 1659 are within the scope of this example.

A first lateral connector 1665a and a second lateral connector 1665b are formed on the top dielectric layer 1659 in an area for the RDAM 1601. The lateral connectors 1665a and 1665b are electrically conductive, and are part of a conductor level of the microelectronic device 1600. A third lateral connector, not shown, and a fourth lateral connector, not shown, of the RDAM 1601 are formed concurrently with the lateral connectors 1665a and 1665b. In one version of this example, the conductor level, including the lateral connectors 1665a and 1665b, may be part of a top interconnect level of the microelectronic device 1600, and may have an etched aluminum structure, a copper damascene structure, or a plated structure, by way of example. Interconnects having a plated structure may include an adhesion layer, not shown, on the top dielectric layer 1659, with copper interconnects on the adhesion layer. The plated interconnects may be formed by sputtering the adhesion layer, containing titanium, on the top dielectric layer 1659, followed by sputtering a seed layer, not shown, of copper on the adhesion layer. A plating mask is formed on the seed layer that exposes areas for the interconnects and the lateral connectors 1665a and 1665b. The plated interconnects are formed by electroplating copper on the seed layer where exposed by the plating mask. The plating mask is removed, and the seed layer and the adhesion layer between the interconnects are removed by wet etching. In another version of this example, the conductor level, including the lateral connectors 1665a and 1665b, may be part of an input/output (I/O) pad level of the microelectronic device 1600, to be connected to an RDL. The input/output pad level may have a plated structure.

Referring to FIG. 16B, a protective overcoat (PO) layer 1678 is formed over the top dielectric layer 1659 and the lateral connectors 1665a and 1665b. The PO layer 1678 is non-conductive, and may include one or more layers of dielectric material, such as silicon dioxide, silicon nitride, silicon oxynitride, aluminum oxide, polyimide, benzocyclobutene (BCB), or polybenzoxazole (PBO), by way of example. I/O pad openings 1679 extend through the PO layer 1678, exposing the lateral connectors 1665a and 1665b. The I/O pad openings 1679 may be formed by an etch process after the one or more layers of dielectric material of the PO layer 1678 are formed. Alternatively, the I/O pad openings 1679 may be formed as parts of the one or more layers of dielectric material, by a photolithographic process for photosensitive dielectric material, such as photosensitive polyimide.

Referring to FIG. 16C, a top conductor level 1604 is formed on the existing microelectronic device 1600, with top conductor metal extending over the PO layer 1678 and into the I/O pad openings 1679 to make connections to the conductor level, including the lateral connectors 1665a and 1665b. In one version of this example, the top conductor level 1604 may be implemented as a bond pad level, and may include an adhesion sublayer of titanium or titanium tungsten, may include a pad sublayer of nickel or palladium, and may include a bonding surface metal of aluminum, gold, or platinum, by way of example. In another version of this example, the top conductor level 1604 may be implemented as an RDL, and may have a plated structure.

The top conductor level 1604 includes a first resistor 1602 of the top conductor level 1604. The first resistor 1602 has a first wide portion 1605 and a first narrow portion 1607. The first wide portion 1605 extends around one of the I/O pad openings 1679, and the top conductor level metal extending into that I/O pad opening 1679 provides a first vertical connector 1613 from the first wide portion 1605 to the first lateral connector 1665*a*. The first narrow portion 1607 extends around another of the I/O pad openings 1679, and the top conductor level metal extending into that I/O pad opening 1679 provides a second vertical connector 1615 from the first narrow portion 1607 to the second lateral connector 1665*b*.

The top conductor level 1604 also includes a first test terminal 1624*a* and a second test terminal 1624*b* of the top conductor level 1604. The first test terminal 1624*a* extends around a third of the I/O pad openings 1679, and the top conductor level metal extending into that I/O pad opening 1679 provides a first test terminal connector 1666*a* from the first test terminal 1624*a* to the first lateral connector 1665*a*. Thus, the first test terminal 1624*a* is coupled to the first wide portion 1605 through the first test terminal connector 1666*a*, the first lateral connector 1665*a*, and the first vertical connector 1613. Similarly, the second test terminal 1624*b* extends around a fourth of the I/O pad openings 1679, and the top conductor level metal extending into that I/O pad opening 1679 provides a second test terminal connector 1666*b* from the second test terminal 1624*b* to the second lateral connector 1665*b*. Thus, the second test terminal 1624*b* is coupled to the first narrow portion 1607 through the second test terminal connector 1666*b*, the second lateral connector 1665*b*, and the second vertical connector 1615. The first vertical connector 1613, the second vertical connector 1615, the first test terminal connector 1666*a*, and the second test terminal connector 1666*b* are members of a vertical connector level 1619 of the microelectronic device 1600 that connects members of the top conductor level 1604 to members of the conductor level that includes the lateral connectors 1665*a* and 1665*b*. The vertical connector level 1619 may be a bond pad via level or an RDL via level, conforming to the implementations for the top conductor level 1604 disclosed in this example.

A second resistor, not shown, of the RDAM 1601 and additional test terminals, also not shown, of the RDAM 1601 are formed concurrently with the first resistor 1602 and the test terminals 1624*a* and 1624*b*, and are coupled to the third and fourth lateral connectors in a similar configuration. The second resistor is a duplicate of the first resistor 1602, reversed in direction. The RDAM 1601 enables estimation of a misalignment distance between the I/O pad openings 1679 and the bond pads of the microelectronic device 1600.

Figure 17:
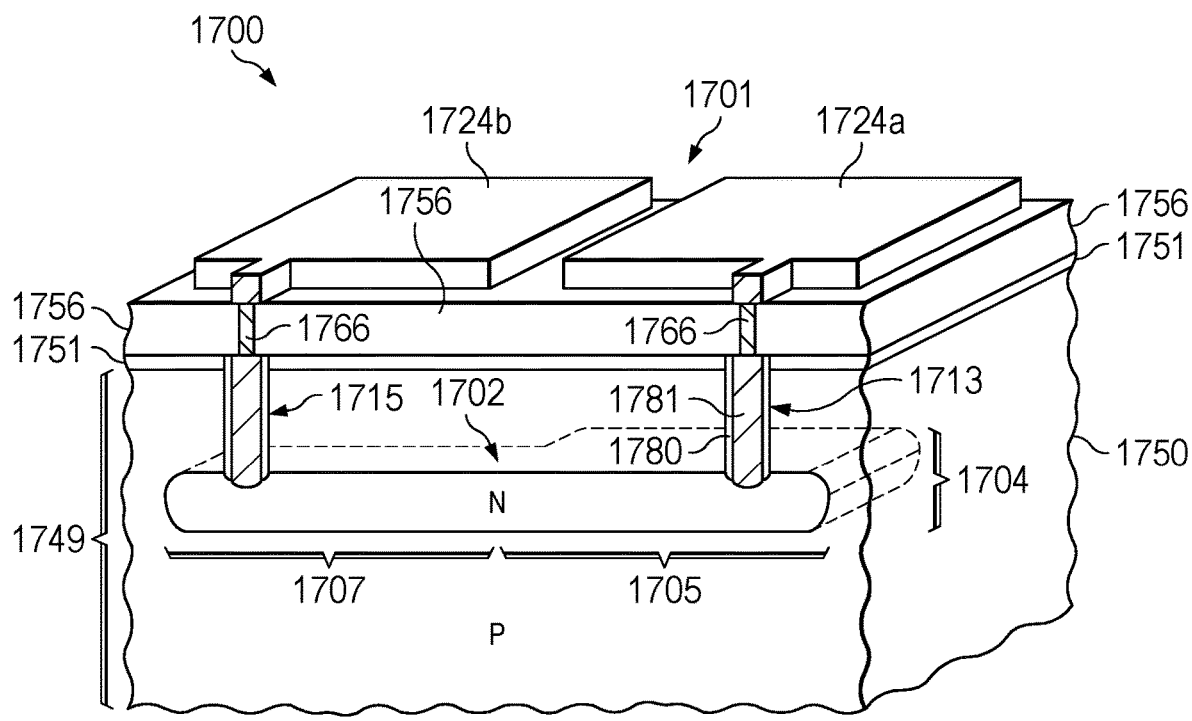
FIG. 17 is a cross section of a microelectronic device with an example RDAM involving a buried layer.

FIG. 17 is a cross section of a microelectronic device with an example RDAM involving a buried layer. The microelectronic device 1700 may be manifested as any of the microelectronic device types disclosed in reference to the microelectronic device 100 of FIG. 1A and FIG. 1B. The microelectronic device 1700 of this example is formed in and on a substrate 1749 that includes a semiconductor material 1750 having a first conductivity type. In this example, the first conductivity type may be p-type, as indicated in FIG. 17.

A first resistor 1702 of the RDAM 1701 is formed in a buried layer level 1704 of the substrate 1749. The first resistor 1702 has semiconductor material with a second conductivity type, opposite from the first conductivity type. In this example, in which the first conductivity type may be p-type, the second conductivity type may be n-type, as indicated in FIG. 17. The buried layer level 1704 may include buried layers, not shown, also having the second conductivity type, in the substrate 1749. The buried layers may provide isolation for components, buried collector for bipolar junction transistors, and source regions for junction field effect transistors, by way of example. The semiconductor material 1750 having the first conductivity type extends above the first resistor 1702, as depicted in FIG. 17. The first resistor 1702 includes a first wide portion 1705 and a first narrow portion 1707. A second resistor, not shown, of the RDAM 1701 is formed in the buried layer level 1704. The second resistor is a duplicate of the first resistor 1702, having a second wide portion and a second narrow portion, reversed in direction. A field relief dielectric layer 1751 may be formed in and on the substrate 1749.

A first vertical connector 1713 is formed through the field relief dielectric layer 1751 and through the semiconductor material 1750 over the first resistor 1702, making contact to the first wide portion 1705. A second vertical connector 1715 is formed through the field relief dielectric layer 1751 and the semiconductor material 1750 over the first resistor 1702, making contact to the first narrow portion 1707. The vertical connectors 1713 and 1715 are parts of a buried layer connector level of the microelectronic device 1700, and may be implemented as deep trenches, having conductive cores 1780 laterally surrounded by insulating liners 1781. The conductive cores 1780 may include polysilicon having the second conductivity type. The insulating liners 1781 may include silicon dioxide formed by thermal oxidation of silicon. A third vertical connector, not shown, is formed through the field relief dielectric layer 1751 and through the semiconductor material 1750 over the second resistor, making contact to the second wide portion. A fourth vertical connector, not shown, is formed through the field relief dielectric layer 1751 and through the semiconductor material 1750 over the second resistor, making contact to the second narrow portion. Additional deep trenches, not shown, may be formed concurrently with the first and second vertical connectors 1713 and 1715, and the third and fourth vertical connectors, to provide electrical connections to the buried layers in the substrate 1749.

A PMD layer 1756 may be formed over existing microelectronic device 1700. Contacts 1766 are formed through the PMD layer 1756 to make electrical connections to the first and second vertical connectors 1713 and 1715, and the third and fourth vertical connectors. The contacts 1766 may be formed as disclosed in reference to the vertical connector level 1219 of FIG. 12C. The contacts 1766 are part of a vertical interconnect level that includes additional contacts, which make connections to components of the microelectronic device 1700.

A first test terminal 1724*a* is formed over the PMD layer 1756 to make an electrical connection to the first vertical connector 1713 through one of the contacts 1766. A second test terminal 1724*b* is formed over the PMD layer 1756 to make an electrical connection to the second vertical connector 1715 through another of the contacts 1766. A third test terminal, not shown, is formed over the PMD layer 1756 to make an electrical connection to the third vertical connector through a third instance of the contacts, and a fourth test terminal, not shown, is formed over the PMD layer 1756 to make an electrical connection to the third vertical connector through a fourth instance of the contacts. The RDAM 1701 enables estimation of a misalignment distance between buried layer connectors of the buried layer connector level and the buried layers in the microelectronic device 1700.

Figure 18:
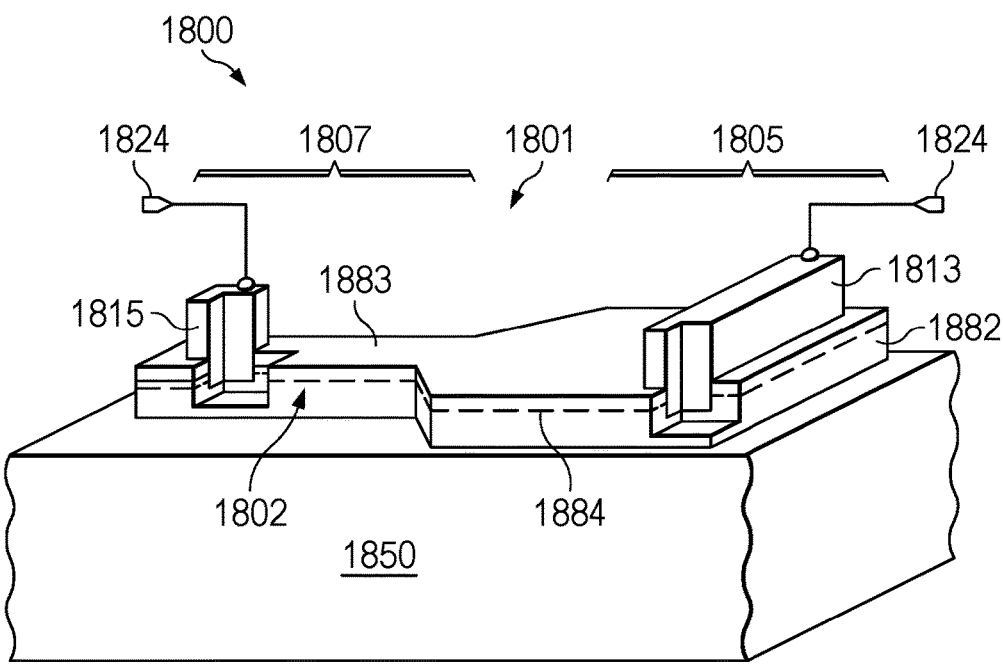
FIG. 18 is a cross section of a microelectronic device with an example RDAM involving a two-dimensional electron gas (2DEG) in a III-V semiconductor device.

FIG. 18 is a cross section of a microelectronic device with an example RDAM involving a two-dimensional electron gas (2DEG) in a III-V semiconductor device. For the purposes of this description, the term "III-V" is understood to refer to semiconductor materials in which group III elements, that is, aluminum, gallium, and indium, and possibly boron, provide a portion of the atoms in the semiconductor material and group V elements, that is, nitrogen, phosphorus, arsenic, and antimony provide another portion of the atoms in the semiconductor material. Examples of III-V semiconductor materials are gallium nitride, gallium arsenide, aluminum nitride, aluminum gallium nitride, indium phosphide, and indium antimonide. Terms describing elemental formulas of III-V materials do not imply a particular stoichiometry of the elements.

The microelectronic device 1800 of this example includes a base layer 1850 of III-V semiconductor material. The base layer 1850 is commonly referred to as an unintentionally doped (UID) layer. For gallium nitride devices, the base layer 1850 may be essentially gallium nitride. A carrier layer 1882 of III-V semiconductor material is formed on the base layer 1850. The carrier layer 1882 may have a stoichiometry that is similar to, or the same as, a stoichiometry of an upper sub-layer of the base layer 1850. A barrier layer 1883 is formed over the carrier layer 1882. The barrier layer has a higher bandgap energy than the carrier layer 1882, and has different composition than the carrier layer 1882. For gallium nitride devices, the barrier layer 1883 may include aluminum nitride or aluminum gallium nitride. By way of example. The barrier layer 1883 exerts stress on the carrier layer 1882, resulting in a 2DEG 1884 being formed in the carrier layer 1882 under the barrier layer 1883. The 2DEG 1884 is electrically conductive, and is present even when the microelectronic device 1800 is unpowered. The 2DEG 1884 is a member of a 2DEG level which provides 2DEGs in field effect transistors of the microelectronic device 1800

The barrier layer 1883 is patterned, for example by an RIE process using chlorine radicals. The carrier layer 1882 may also be patterned with the barrier layer 1883, as depicted in FIG. 18, or may be left unpatterned. Patterning the barrier layer 1883 results in the 2DEG 1884 having the same shape as the patterned barrier layer 1883. The barrier layer 1883 is patterned so that the 2DEG 1884 provides a first resistor 1802 of the RDAM 1801. The first resistor 1802 has a first wide portion 1805 and a first narrow portion 1807. The barrier layer 1883 is concurrently patterned in other areas of the microelectronic device 1800 to form components such as transistors. The 2DEG 1884 is thus a part of a conductor level of 2DEGs in the microelectronic device. A second resistor, not shown, of the RDAM 1801 is formed concurrently with the first resistor 1802. The second resistor is a duplicate of the first resistor 1802, reversed in direction.

A first vertical connector 1813 is formed through the barrier layer 1883 to make an electrical connection to the first resistor 1802, that is, to the 2DEG 1884, in the first wide portion 1805. A second vertical connector 1815 is formed through the barrier layer 1883 to make an electrical connection to the first resistor 1802 in the first narrow portion 1807. The vertical connectors 1813 and 1815 are parts of a vertical connector level of the microelectronic device 1800 that includes source/drain contacts to field effect transistors (FETs). A third vertical connector, not shown, is formed through the barrier layer 1883 over the second resistor, making contact to the second wide portion. A fourth vertical connector, not shown, is formed through the barrier layer 1883 over the second resistor, making contact to the second narrow portion. Additional contacts, not shown, may be formed concurrently with the first and second vertical connectors 1813 and 1815, and the third and fourth vertical connectors, to provide electrical connections to the 2DEGs in the carrier layer 1882.

Test terminals 1824 are formed to make electrical connections to the first and second vertical connectors 1813 and 1815, and the third and fourth vertical connectors. The test terminals 1824 may be formed concurrently with interconnects to the source/drain contacts in the microelectronic device 1800. The test terminals 1824 may include an adhesion layer containing titanium and a bonding layer containing aluminum, by way of example. The RDAM 1801 enables estimation of a misalignment distance between source/drain contacts of the vertical connector level and the barrier layers in the microelectronic device 1800.

Figure 19:
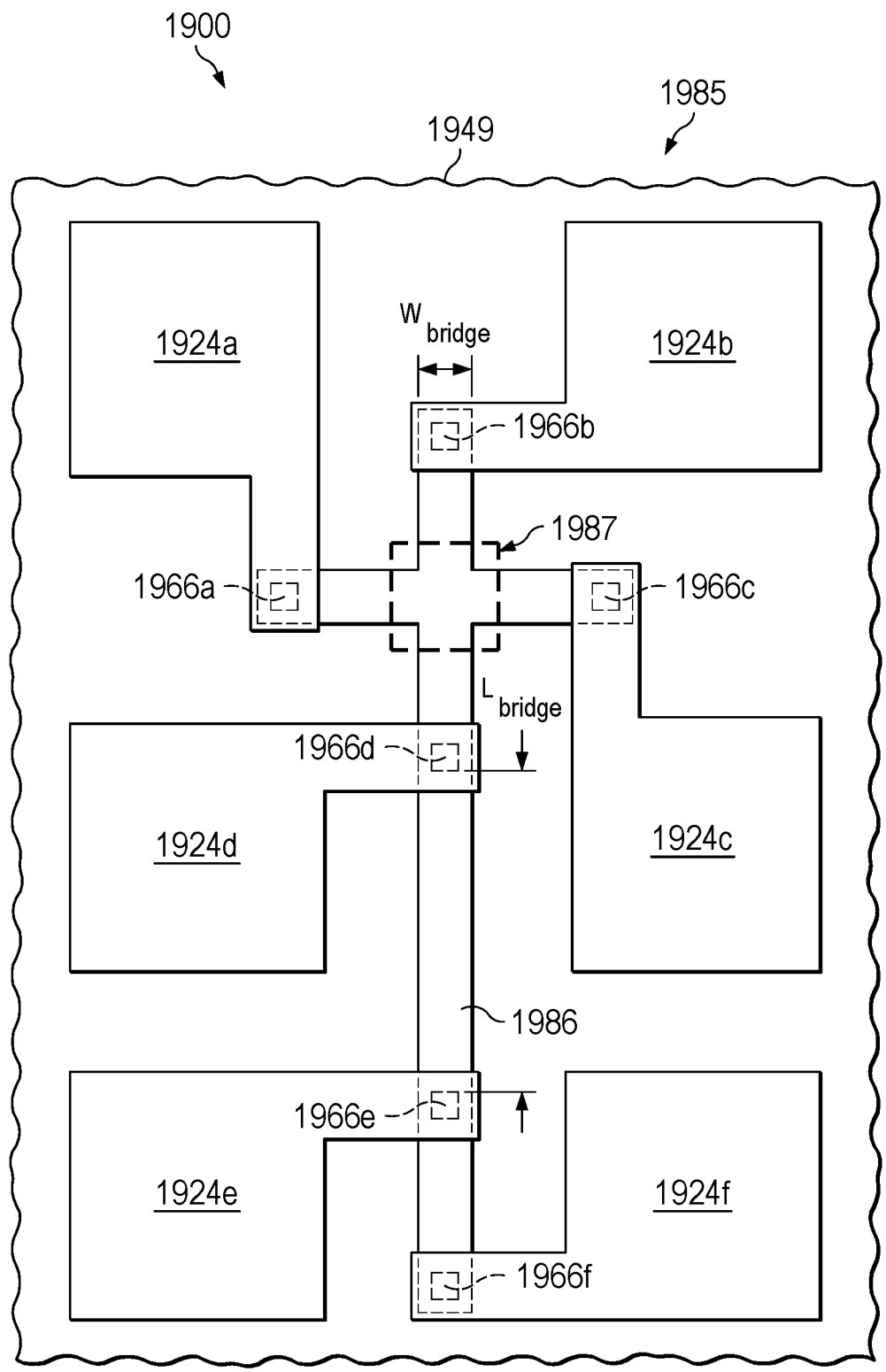
FIG. 19 is a top view of a cross bridge test structure used to estimate sheet resistance and line width correction.

FIG. 19 is a top view of a cross bridge test structure used to estimate sheet resistance and to estimate a line width correction. The estimated sheet resistance and line width correction may be applied to the method disclosed in reference to FIG. 2 to obtain a more accurate estimate of the misalignment distance. A microelectronic device 1900 includes at least one RDAM, not shown, having a first resistor and a second resistor of a conductor level, with vertical connectors which are members of a vertical connector level. The microelectronic device 1900 of this example includes the cross bridge test structure 1985 formed on a substrate 1949. The cross bridge test structure 1985 includes a cross resistor 1986 formed in the conductor level that contains the first resistor and the second resistor of the RDAM. The cross bridge test structure 1985 also includes six test terminal connectors 1966a, 1966b, 1966c, 1966d, 1966e, and 1966f that make electrical connections to the cross resistor 1986. Test terminal connectors 1966a through 1966d contact the cross resistor 1986 on four branches around an intersection 1987 of the cross resistor 1986. Test terminal connectors 1966d, 1966e, and 1966f contact the cross resistor 1986 along a linear branch, in the order listed. Test terminal connectors 1966d and 1966e are separated by a bridge length $L_{bridge}$, as shown in FIG. 19. The cross resistor 1986 has a design bridge width $W_{bridge}$ along the bridge length $L_{bridge}$, as shown in FIG. 19. The bridge length $L_{bridge}$ is at least 4 times the design bridge length $L_{bridge}$, to obtain an accurate estimate of the line width of the cross resistor 1986. Test terminals 1924a, 1924b, 1924c, 1924d, 1924e, and 1924f are coupled to the test terminal connectors 1966a through 1966f, respectively.

The sheet resistance of the cross resistor 1986 may be estimated by forcing currents through adjacent pairs of the test terminals 1924a through 1924d and measuring potential differences across remaining pairs of the test terminals 1924a through 1924d, dividing the potential differences by the corresponding currents to obtain resistances, and averaging the resistances to obtain an average resistance $R_{avg}$. The sheet resistance $R_{sheet}$ may be estimated as $R_{sheet} = \pi R_{avg}/\ln(2)$, where $\pi$ is approximately 3.14159, and $\ln(2)$ is the natural logarithm of 2, approximately 0.693147. More complex methods of estimating the sheet resistance using the potential differences and the corresponding currents are within the scope of this example. The sheet resistance $R_{sheet}$ may be used in the method disclosed in reference to FIG. 2 to obtain a more accurate estimate of the misalignment distance.

The line width of the cross resistor 1986 along the bridge length $L_{bridge}$ may be estimated by forcing a current through the test terminals 1924c and 1924f and measuring a potential difference across the test terminals 1924d through 1924e, dividing the potential difference by the current to obtain a bridge resistance $R_{bridge}$. A corrected line width $W_{corr}$ may be estimated as $W_{corr}=[L_{bridge}(R_{sheet}/R_{bridge})]$. The values for $W_{wide}$ and $W_{narr}$ as used in the method disclosed in reference to FIG. 2 may be corrected by adding a line width correction $\Delta W = W_{corr} - W_{bridge}$ to obtain a more accurate estimate of the misalignment distance.

Figure 20:
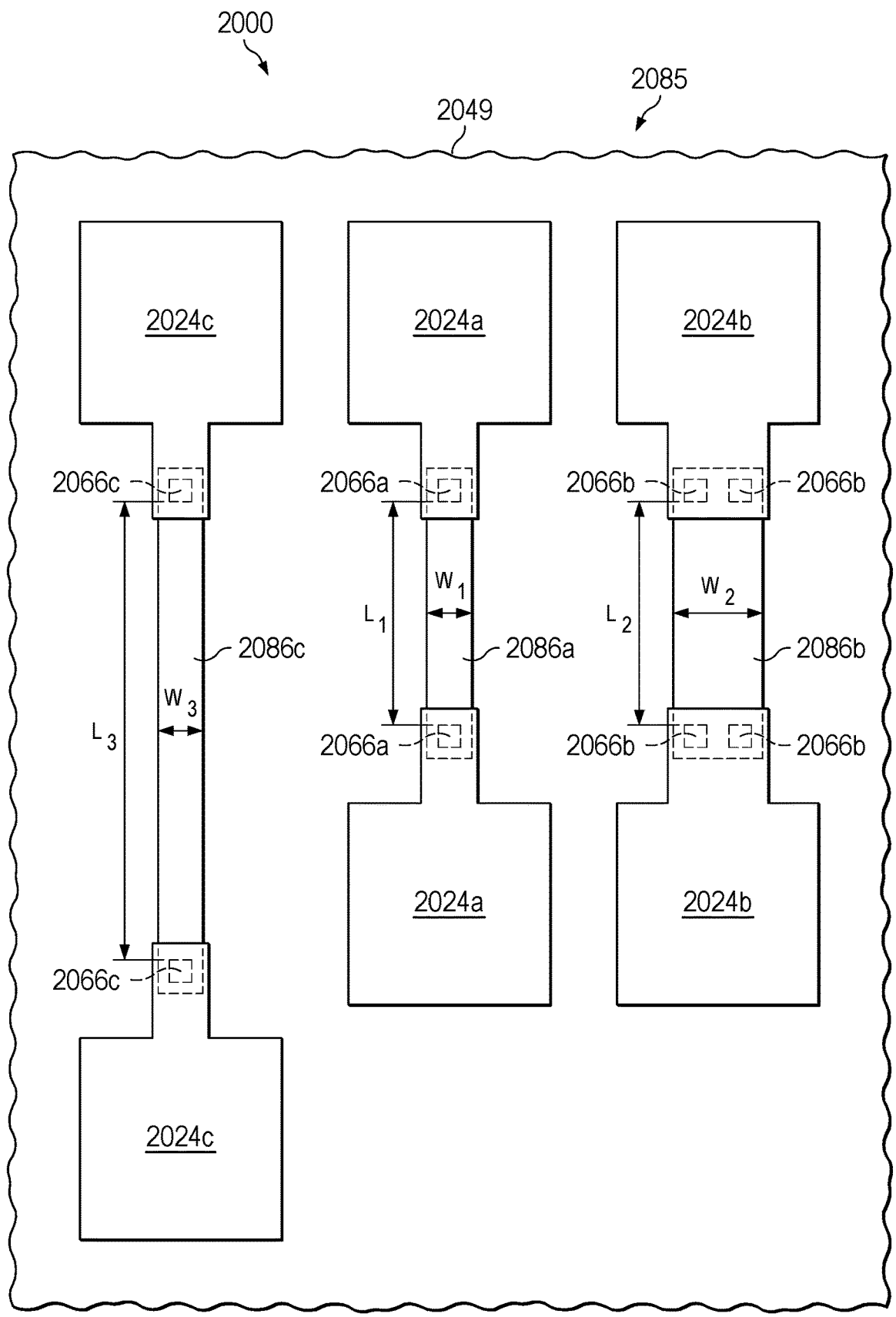
FIG. 20 is a top view of a three-resistor test structure used to estimate sheet resistance and line width correction.

FIG. 20 is a top view of a three-resistor test structure used to estimate sheet resistance and to estimate a line width correction. The estimated sheet resistance and line width correction may be applied to the method disclosed in reference to FIG. 2 to obtain a more accurate estimate of the misalignment distance. A microelectronic device 2000 includes at least one RDAM, not shown, having a first resistor and a second resistor of a conductor level, with vertical connectors which are members of a vertical connector level. The microelectronic device 2000 of this example includes the three-resistor test structure 2085 formed on a substrate 2049. The three-resistor test structure 2085 includes a first resistor 2086a, a second resistor 2086b, and a third resistor 2086c. The three resistors 2086a, 2086b, and 2086c are formed in the conductor level that contains the first resistor and the second resistor of the RDAM.

The three-resistor test structure 2085 includes first test terminal connectors 2066a on each end of the first resistor 2086a. The first resistor 2086a has a first body length $L_1$ between the first test terminal connectors 2066a, with a first design body width $W_{1,des}$. The three-resistor test structure 2085 includes second test terminal connectors 2066b on each end of the second resistor 2086b. The second resistor 2086b has a second body length $L_2$ between the second test terminal connectors 2066b, with a second design body width $W_{2,des}$. The three-resistor test structure 2085 includes third test terminal connectors 2066c on each end of the third resistor 2086c. The third resistor 2086c has a third body length $L_3$ between the third test terminal connectors 2066c, with a third design body width $W_{3,des}$. The design body widths $W_{1,des}$, $W_{2,des}$, and $W_{3,des}$ are the designed widths of the three resistors 2086a, 2086b, and 2086c. A line width correction $\Delta W$ to the design body widths $W_{1,des}$, $W_{2,des}$, and $W_{3,des}$ is defined as a difference between physical body widths of the three resistors 2086a, 2086b, and 2086c and the design body widths $W_{1,des}$, $W_{2,des}$, and $W_{3,des}$, and may be estimated using the three-resistor test structure 2085. The body lengths $L_1$, $L_2$, and $L_3$ are not all equal, and the design body widths $W_{1,des}$, $W_{2,des}$, and $W_{3,des}$ are not all equal. No two of the three resistors 2086a, 2086b, and 2086c have equal body lengths and equal design body widths, that is, no two of the three resistors 2086a, 2086b, and 2086c are duplicates of each other. In one version of this example, the first body length $L_1$ may equal the second body length $L_2$, and the third body length $L_3$ may be 2 times the first body length $L_1$. In the same version of this example, the first body length $L_1$ may equal the second body length $L_2$, and the third body length $L_3$ may be 2 times the first body length $L_1$.

First test terminals 2024a are coupled to the test terminal connectors 2066a to enable measuring a first total resistance $R_{1,tot}$ of the first resistor 2086a and the first test terminal connectors 2066a. Second test terminals 2024b are coupled to the test terminal connectors 2066b to enable measuring a second total resistance $R_{2,tot}$ of the second resistor 2086b and the second test terminal connectors 2066b. Third test terminals 2024c are coupled to the test terminal connectors 2066c to enable measuring a third total resistance $R_{3,tot}$ of the third resistor 2086c and the third test terminal connectors 2066c. The total resistance $R_{n,tot}$ of each of the three resistors 2086a, 2086b, and 2086c is a sum of a head resistance $R_{n,head}$ and a body resistance $R_{n,body}$, where index n=1, 2, 3 corresponds to the three resistors 2086a, 2086b, and 2086c.

The head resistance $R_{n,head}$ includes the resistance of the test terminal connectors 2066a, 2066b, and 2066c, an interface resistance between the test terminal connectors 2066a, 2066b, and 2066c and the corresponding resistors 2086a, 2086b, and 2086c, and a resistance of the resistors 2086a, 2086b, and 2086c outside of the body lengths $L_1$, $L_2$, and $L_3$. The head resistance $R_{n,head}$ is taken to be inversely proportional to the corresponding design body width $W_{n,des}$. The head resistance $R_{n,head}$ may be expressed as $R_{n,head}=R'_{head}/W_{n,des}$, where $R'_{head}$ is a head resistivity, and is a constant that is characteristic of the head resistance $R_{n,head}$.

The body resistance $R_{n,body}$ is proportional to the corresponding body length $L_n$ and the sheet resistance $R_{sheet}$ of the resistors 2086a, 2086b, and 2086c, and inversely proportional to the corresponding corrected design body width $W_{n,des}-\Delta W$. The body resistance $R_{n,body}$ may be expressed as $R_{n,body}=L_n \times R_{sheet}/(W_{n,des}-\Delta W)$.

Thus, the total resistance $R_{n,tot}$ of each of the three resistors 2086a, 2086b, and 2086c, which may be measured using the corresponding test terminals 2024a through 2024c, may be expressed in terms of three unknown variables: the head resistivity $R'_{head}$, the sheet resistance $R_{sheet}$, and the line width correction $\Delta W$, and known parameters: the body length $L_n$ and the design body width $W_{n,des}$. That is, $R_{n,tot}=(R'_{head}/W_{n,des})\ [L_n \times R_{sheet}/(W_{n,des}-\Delta W)]$. Measuring the three resistors 2086a, 2086b, and 2086c provides three independent equations for $R_{n,tot}$, which may be solved for the three unknown variables. The sheet resistance $R_{sheet}$, may be used in the method disclosed in reference to FIG. 2 to obtain a more accurate estimate of the misalignment distance. The values for $W_{wide}$ and $W_{narr}$ as used in the method disclosed in reference to FIG. 2 may be corrected by subtracting the line width correction $\Delta W$ to obtain a more accurate estimate of the misalignment distance.

Figure 21A:
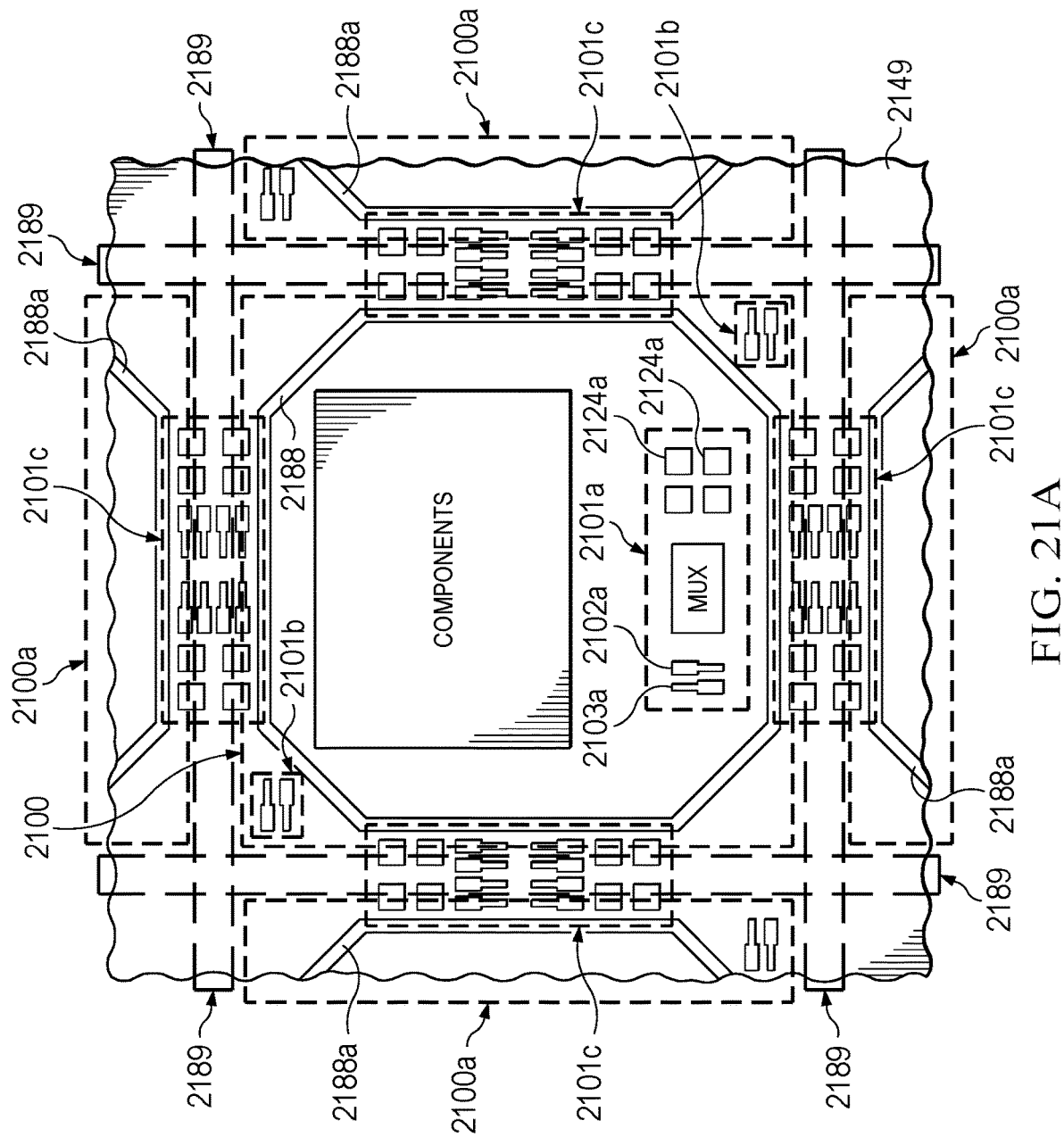
FIG. 21A and FIG. 21B are top views of an example microelectronic device including RDAMs, depicted in stages of formation.
Figure 21B:
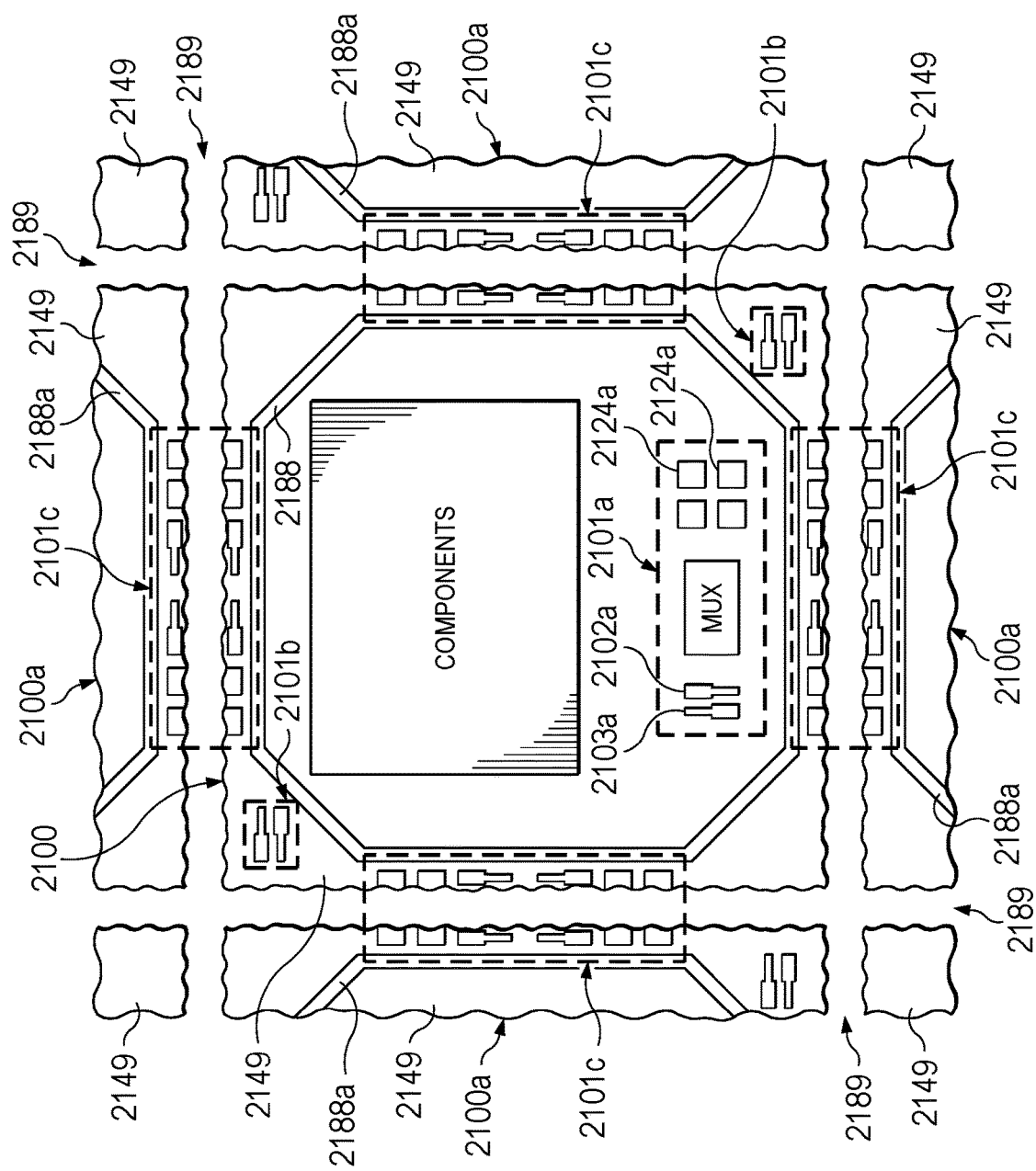

FIG. 21A and FIG. 21B are top views of an example microelectronic device including RDAMs, depicted in stages of formation. Referring to FIG. 21A, the microelectronic device 2100 is formed in and on a substrate 2149 concurrently with additional microelectronic devices 2100a. The microelectronic device 2100 and the additional microelectronic devices 2100a may be manifested as any of the microelectronic device types disclosed in reference to the microelectronic device 100 of FIG. 1A and FIG. 1B. The substrate 2149 may be implemented as a semiconductor wafer, a glass, sapphire, or polymer substrate for MEMS or microfluidic devices, or a composite substrate including both semiconductor material and dielectric material, by way of example. The microelectronic device 2100 contains components, labeled "COMPONENTS" in FIG. 21A and FIG. 21B.

The microelectronic device 2100 and the additional microelectronic devices 2100a may have scribe seals 2188 and 2188a, respectively, surrounding the components. The scribe seals 2188 and 2188a may include continuous interconnects and continuous vias or dense discrete vias, to reduce crack propagation and impurity infiltration into the components. Singulation lanes 2189, commonly referred to as scribe lanes or streets, saw lanes or streets, dicing lanes or streets, extend between the microelectronic device 2100 and the additional microelectronic devices 2100a. The singulation lanes 2189 may extend to the scribe seals 2188 and 2188a, or may extend partway to the scribe seals 2188 and 2188a.

The microelectronic device 2100 of this example includes an internal RDAM 2101a located inside the scribe seal 2188. The internal RDAM 2101a includes a first internal resistor 2102a and a second internal resistor 2103a, and vertical connectors, not shown, formed according to any of the examples disclosed herein. The internal RDAM 2101a includes internal test terminals 2124a coupled to the vertical connectors. The internal test terminals 2124a may extend to probe pads at a top surface of the microelectronic device 2100, to enable probing after fabrication of the microelectronic device 2100 is completed, or may extend to bond pads to enable wire bonding the internal test terminals 2124a during assembly of the microelectronic device 2100 to allow testing the internal RDAM 2101a after packaging the microelectronic device 2100. The internal test terminals 2124a may be coupled to the vertical connectors through a multiplexer, labeled "MUX" in FIG. 21A and FIG. 21B. The multiplexer may advantageously enable testing a plurality of test structures using a relatively small number of probe/bond pads. The internal RDAM 2101a may be referred to as an on-chip parametric (OCP) test structure.

The microelectronic device 2100 of this example also includes external RDAMs 2101b located outside of the scribe seal 2188, in corner regions. The external RDAMs 2101b may be located in areas of the microelectronic device 2100 that experience high stress, such as corners of the microelectronic device 2100, and thus do not contain components. The external RDAMs 2101b may be formed according to any of the examples disclosed herein. The external RDAMs 2101b may also be referred to as OCP test structures.

The microelectronic device 2100 of this example further includes singulation lane RDAMs 2101c located outside the scribe seals 2188 and 2188a, on sides of the microelectronic device 2100. The singulation lane RDAMs 2101c may extend into the singulation lanes 2189, as depicted in FIG. 21A and FIG. 21B. The singulation lane RDAMs 2101c may be formed according to any of the examples disclosed herein. The singulation lane RDAMs 2101c may be tested during and after fabrication of the microelectronic device 2100, before the microelectronic device 2100 is singulated from the additional microelectronic devices 2100a.

Referring to FIG. 21B, at least a portion of the substrate 2149 is removed from the singulation lanes 2189, singulating the microelectronic device 2100 from the additional microelectronic devices 2100a. The internal RDAM 2101a remains in place in the microelectronic device 2100 after the microelectronic device 2100 is singulated. Similarly, the external RDAMs 2101b remain in place in the microelectronic device 2100 after the microelectronic device 2100 is singulated. One or more portions, or all, of one or more of the singulation lane RDAMs 2101c may remain in the singulated microelectronic device 2100. The portions of the singulation lane RDAMs 2101c may be present in the microelectronic device 2100 after packaging, that is, connection to external leads and encapsulation, for example, is completed.

Various features of the examples disclosed herein may be combined in other manifestations of example microelectronic devices. For example, any of the RDAMs disclosed herein may have single resistors, as disclosed in reference to FIG. 1A, or may have a plurality of resistors connected serially, as depicted disclosed in reference to FIG. 4. Any of the RDAMs disclosed herein may include a reference resistor pair, as disclosed in reference to FIG. 3. Any of the RDAMs disclosed herein may have resistors and vertical connectors configured as disclosed in reference to FIG. 6 through FIG. 11. Any of the RDAMs disclosed herein may have resistors formed in an interconnect level, a gate level, a diffused layer level in a semiconductor substrate, a resistor level, a capacitor plate level, a bond pad level, an RDL level, a buried layer level in a semiconductor substrate, or a 2DEG level in a III-V semiconductor material. Any of the microelectronic devices disclosed herein may include one or more RDAMs configured to measure a misalignment distance in one direction or in two orthogonal directions. Any of the microelectronic devices disclosed herein may include a cross bridge test structure, as disclosed in reference to FIG. 19. Any of the microelectronic devices disclosed herein may include a three-resistor test structure, as disclosed in reference to FIG. 20.

While various embodiments of the present disclosure have been described above, it should be understood that they have been presented by way of example only and not limitation. Numerous changes to the disclosed embodiments can be made in accordance with the disclosure herein without departing from the spirit or scope of the disclosure. Thus, the breadth and scope of the present invention should not be limited by any of the above described embodiments. Rather, the scope of the disclosure should be defined in accordance with the following claims and their equivalents.

What is claimed is:

1. A microelectronic device, comprising:
   a resistive differential alignment monitor (RDAM), including:
   a first resistor, including a first wide portion and a first narrow portion;
   a first connector contacting the first wide portion;
   a second connector contacting the first narrow portion;
   a second resistor, including a second wide portion and a second narrow portion;
   a third connector contacting the second wide portion; and
   a fourth connector contacting the second narrow portion;
   wherein:
   a first width of the first wide portion adjacent to the first connector is greater than a second width of the first narrow portion adjacent to the second connector;
   the first connector is separated from the second connector in a first direction by a first length;
   the second wide portion adjacent to the third connector has the first width;
   the second narrow portion adjacent to the fourth connector has the second width; and
   the third connector is separated from the fourth connector in a second direction, anti-parallel to the first direction, by the first length.

2. The microelectronic device of claim 1, wherein the first resistor and the second resistor are members of a resistor level.

3. The microelectronic device of claim 1, wherein the first connector, the second connector, the third connector, and the fourth connector are members of a via level.

4. The microelectronic device of claim 1, further including a second RDAM, including:
   a third resistor, including a third wide portion and a third narrow portion;

a fifth connector contacting the third wide portion;
a sixth connector contacting the third narrow portion;
a fourth resistor, including a fourth wide portion and a fourth narrow portion;
a seventh connector contacting the fourth wide portion; and
an eighth connector contacting the fourth narrow portion; wherein:
the third wide portion adjacent to the fifth connector has the first width;
the third narrow portion adjacent to the sixth connector has the second width;
the fifth connector is separated from the sixth connector in a third direction, perpendicular to the first direction, by the first length;
the fourth wide portion adjacent to the seventh connector has the first width;
the fourth narrow portion adjacent to the eighth connector has the second width; and
the seventh connector is separated from the eighth connector in a fourth direction, anti-parallel to the third direction, by the first length.

5. The microelectronic device of claim 1, wherein the RDAM further includes:
a third resistor, the third resistor being a duplicate of the first resistor and oriented parallel to the first resistor;
a fifth connector contacting a third wide portion of the third resistor;
a sixth connector contacting a third narrow portion of the third resistor, the sixth connector being directly connected to the first connector through a first conductive link;
a fourth resistor, the fourth resistor being a duplicate of the second resistor and oriented parallel to the second resistor;
a seventh connector contacting a fourth wide portion of the fourth resistor; and
an eighth connector contacting a fourth narrow portion of the fourth resistor, the eighth connector being directly connected to the third connector through a second conductive link.

6. The microelectronic device of claim 1, wherein the RDAM further includes:
a third resistor, the third resistor being a duplicate of the first resistor and oriented parallel to the first resistor;
a fifth connector contacting a third wide portion of the third resistor;
a sixth connector contacting a third narrow portion of the third resistor;
a fourth resistor, the fourth resistor being a duplicate of the second resistor and oriented parallel to the second resistor;
a seventh connector contacting a fourth wide portion of the fourth resistor; and
an eighth connector contacting a fourth narrow portion of the fourth resistor;
wherein the third resistor is connected in series to the fourth resistor through a conductive link.

7. The microelectronic device of claim 1, wherein the first wide portion has a constant width along the first direction, the first narrow portion has a constant width along the first direction, the second wide portion has a constant width along the second direction, and the second narrow portion has a constant width along the second direction.

8. The microelectronic device of claim 1, wherein the RDAM further includes test terminals coupled to the first connector, the second connector, the third connector, and the fourth connector.

9. The microelectronic device of claim 1, further including a test structure configured to provide an estimate of sheet resistance of the first resistor and the second resistor and configured to provide a line width correction for the first resistor and the second resistor.

10. The microelectronic device of claim 1, further including a second RDAM, including:
a third resistor, including a third wide portion and a third narrow portion;
a fifth connector contacting the third wide portion;
a sixth connector contacting the third narrow portion;
a fourth resistor, including a fourth wide portion and a fourth narrow portion;
a seventh connector contacting the fourth wide portion; and
an eighth connector contacting the fourth narrow portion; wherein:
a third width of the third wide portion adjacent to the fifth connector is greater than a fourth width of the third narrow portion adjacent to the sixth connector;
the fifth connector is separated from the sixth connector in a third direction, parallel to the first direction, by a second length;
the fourth wide portion adjacent to the seventh connector has the third width;
the fourth narrow portion adjacent to the eighth connector has the fourth width;
the seventh connector is separated from the eighth connector in a fourth direction, anti-parallel to the third direction, by the second length;
the third resistor and the fourth resistor are members of a different conductor level than the first resistor and the second resistor; and
the first connector and the fifth connector are members of a same connector level.

11. The microelectronic device of claim 1, wherein:
the first wide portion has a first wide length along the first direction that is 2 to 5 times a minimum lateral dimension of the first connector at the first resistor;
the first narrow portion has a first narrow length along the first direction that is 2 to 5 times a minimum lateral dimension of the second connector at the first resistor;
the second wide portion has a second wide length along the second direction that is equal to the first wide length; and
the second narrow portion has a second narrow length along the second direction that is equal to the first narrow length.

12. The microelectronic device of claim 1, wherein the first width is 2 to 4 times the second width.

13. The microelectronic device of claim 1, wherein the RDAM is located on a side of the microelectronic device, outside a scribe seal.

14. A method of forming a microelectronic device, comprising:
concurrently forming a first resistor including a first wide portion and a first narrow portion and forming a second resistor including a second wide portion and a second narrow portion; and
concurrently forming a first connector contacting the first wide portion, forming a second connector contacting the first narrow portion, forming a third connector contacting the second wide portion, and forming a fourth connector contacting the second narrow portion; wherein:

a first width of the first wide portion adjacent to the first connector is greater than a second width of the first narrow portion adjacent to the second connector;

the first connector is separated from the second connector in a first direction by a first length;

the second wide portion adjacent to the third connector has the first width;

the second narrow portion adjacent to the fourth connector has the second width; and the third connector is separated from the fourth connector in a second direction, anti-parallel to the first direction, by the first length.

15. The method of claim 14, wherein the first resistor and the second resistor are formed concurrently with members of a resistor level.

16. The method of claim 14, wherein the first connector, the second connector, the third connector, and the fourth connector are formed concurrently with members of a via level.

17. The method of claim 14, wherein the first resistor and the second resistor are formed prior to forming the first connector, the second connector, the third connector, and the fourth connector.

18. The method of claim 14, wherein the first resistor and the second resistor are formed after forming the first connector, the second connector, the third connector, and the fourth connector.

19. The method of claim 14, further including:

forming a fifth connector, a sixth connector, a seventh connector, and an eighth connector, concurrently with the first connector; and subsequently forming a third resistor and a fourth resistor concurrently, separately from the first resistor, wherein the third resistor includes a third wide portion contacting the fifth connector and includes a third narrow portion contacting the sixth connector, and the fourth resistor includes a fourth wide portion contacting the seventh connector and includes a fourth narrow portion contacting the eighth connector; wherein:

a third width of the third wide portion adjacent to the fifth connector is greater than a fourth width of the third narrow portion adjacent to the sixth connector;

the fifth connector is separated from the sixth connector in the first direction by a second length;

the fourth wide portion adjacent to the seventh connector has the third width;

the fourth narrow portion adjacent to the eighth connector has the fourth width; and the seventh connector is separated from the eighth connector in the second direction by the second length.

20. The method of claim 14, wherein the first resistor and the second resistor are formed on a side of the microelectronic device, outside a scribe seal.

21. The microelectronic device of claim 1, wherein the first resistor further includes a first transition region between the first wide portion and the first narrow portion, and wherein the first transition region has a curved profile.

22. The microelectronic device of claim 21, wherein the second resistor further includes a second transition region between the second wide portion and the second narrow portion, and wherein the second transition region has the curved profile.

23. The microelectronic device of claim 1, wherein the first resistor further includes a first transition region between the first wide portion and the first narrow portion, and wherein the first transition region has a stepped profile.

24. The microelectronic device of claim 23, wherein the second resistor further includes a second transition region between the second wide portion and the second narrow portion, and wherein the second transition region has the stepped profile.

25. The method of claim 14, wherein the first resistor further includes a first transition region between the first wide portion and the first narrow portion, and wherein the first transition region has a curved profile.

26. The method of claim 25, wherein the second resistor further includes a second transition region between the second wide portion and the second narrow portion, and wherein the second transition region has the curved profile.

27. The method of claim 14, wherein the first resistor further includes a first transition region between the first wide portion and the first narrow portion, and wherein the first transition region has a stepped profile.

28. The method of claim 27, wherein the second resistor further includes a second transition region between the second wide portion and the second narrow portion, and wherein the second transition region has the stepped profile.

* * * * *